(12) United States Patent
Terao et al.

(10) Patent No.: US 6,806,030 B2
(45) Date of Patent: Oct. 19, 2004

(54) INFORMATION RECORDING MEDIUM AND METHOD FOR MANUFACTURING INFORMATION RECORDING MEDIUM

(75) Inventors: Motoyasu Terao, Hinode (JP); Makoto Miyamoto, Ome (JP); Yasushi Miyauchi, Akishima (JP); Keikichi Ando, Musashino (JP); Yumiko Anzai, Ome (JP); Junko Ushiyama, Kokubunji (JP); Reiji Tamura, Moriya (JP); Yoshihiro Ikari, Moriya (JP); Tamotsu Fuchioka, Moriya (JP)

(73) Assignees: Hitachi, Ltd., Tokyo (JP); Hitachi Maxell, Ltd., Osaka (JP)

(*) Notice: Subject to any disclaimer, the term of this patent is extended or adjusted under 35 U.S.C. 154(b) by 258 days.

(21) Appl. No.: 09/810,474

(22) Filed: Mar. 19, 2001

(65) Prior Publication Data

US 2002/0006684 A1 Jan. 17, 2002

(30) Foreign Application Priority Data

Mar. 30, 2000 (JP) .................................... 2000-097814

(51) Int. Cl.$^7$ .............................................. G11B 7/24
(52) U.S. Cl. ............. 430/270.13; 430/945; 204/192.27; 204/298.07; 428/64.8; 428/64.5; 369/275.2; 369/275.5
(58) Field of Search ........................... 430/270.13, 945; 204/298.07, 192.27; 428/64.5, 64.8; 369/205.2, 275.5

(56) References Cited

U.S. PATENT DOCUMENTS

| | | | | |
|---|---|---|---|---|
| 4,670,332 A | * | 6/1987 | Werner et al. | 430/945 |
| 5,368,986 A | * | 11/1994 | Terao et al. | 430/945 |
| 5,912,104 A | * | 6/1999 | Hirotsune et al. | 430/270.13 |
| 6,103,330 A | * | 8/2000 | Kosuda et al. | 430/270.13 |
| 6,132,932 A | * | 10/2000 | Miyamoto et al. | 430/270.13 |
| 6,146,733 A | * | 11/2000 | Inoue et al. | 428/64.1 |
| 6,153,063 A | * | 11/2000 | Yamada et al. | 204/192.22 |
| 6,159,573 A | * | 12/2000 | Zhou | 430/270.13 |
| 6,177,166 B1 | * | 1/2001 | Ohno et al. | 430/270.13 |
| 6,300,039 B1 | * | 10/2001 | Ohbayashi et al. | 430/270.13 |
| 6,355,326 B1 | * | 3/2002 | Lee et al. | 430/270.13 |
| 6,416,837 B1 | * | 7/2002 | Kojima et al. | 428/64.1 |
| 6,703,098 B2 | * | 3/2004 | Hirotsune et al. | 428/64.1 |

FOREIGN PATENT DOCUMENTS

| | | | |
|---|---|---|---|
| EP | 0359114 | * | 3/1990 |
| JP | 04-305837 | * | 10/1992 |
| JP | 05-159360 | * | 6/1993 |
| JP | 05-325261 | * | 12/1993 |
| JP | 2000-293893 | * | 10/2000 |

OTHER PUBLICATIONS

Preliminary Report of affiliate of Japan Society of Applied Physics, Mar., 1998, p. 1127, Riyanchi et al., "Suppression of Mutual diffusion between . . .".

(List continued on next page.)

*Primary Examiner*—Martin J. Angebranndt
(74) *Attorney, Agent, or Firm*—Mattingly, Stanger & Malur, P.C.

(57) ABSTRACT

In an optical disk for high density recording, for preventing the deformation of recording tracks caused by stress which may develop between the substrate and the recording stacked film formed thereon, a stress-compensation layer having a metal element such as Ti or Cr as a main component is provided. The stress-compensation layer undergoes contraction (tensile stress) to compensate for compression stress which develops in the stacked film during cooling after the thermal expansion of the substrate surface that occurs at the end of film formation. The stress-compensation layer has a pillar-like structure which, starting from the lower face, reaches the upper face of the film.

9 Claims, 30 Drawing Sheets

ARGON FLOW RATE: LARGE
INTERNAL STRESS COMPENSATABLE CONDITION

OTHER PUBLICATIONS

Preliminary report of affiliate of Japan Society of Applied Physics, Mar., 1998, p. 1228, Otoba et al., "Phase Change Optical disk having Nitride . . .".

Technical report of IEICE, MR92–71, CPM92–148 (Dec. 1992), pp 37–42, Yamada et al., "Phase Change Optical . . .".

Technical Report of IEICE. MR97–96, CPM97–96 (Sep. 1997), Miyamoto et al., "Analysis of Mark Shpaing process . . .". pp 21–2.

ITE'96: 1996 ITE Annual Convention, pp. 526–529; Terao, "High Density recording media for rewritable DVD.".

Japan Journal of Applied Physics, vol. 37, 1998, pp. 2104–2110, Yamada et al., "Phase Change Optical disk . . .".

Ferao et al, "High Performance phase Change . . ." SPIE vol. 3109 pp 60–67. (1997).

* cited by examiner

ARGON FLOW RATE: SMALL

ARGON FLOW RATE: LARGE
INTERNAL STRESS COMPENSATABLE CONDITION

Ws : BEAM SPOT DIAMETER
Wm : MARK-LENGTH
d : RESOLUTION

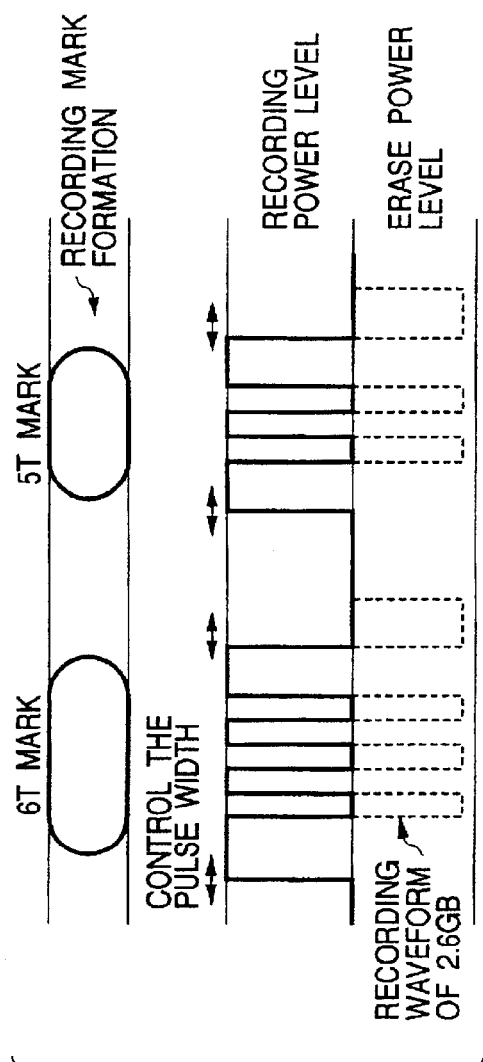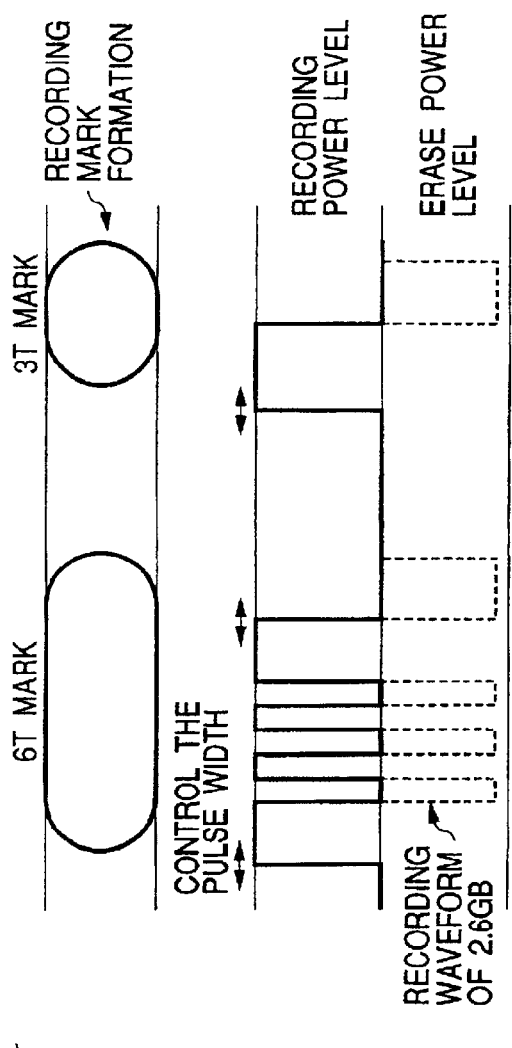

FIG. 14
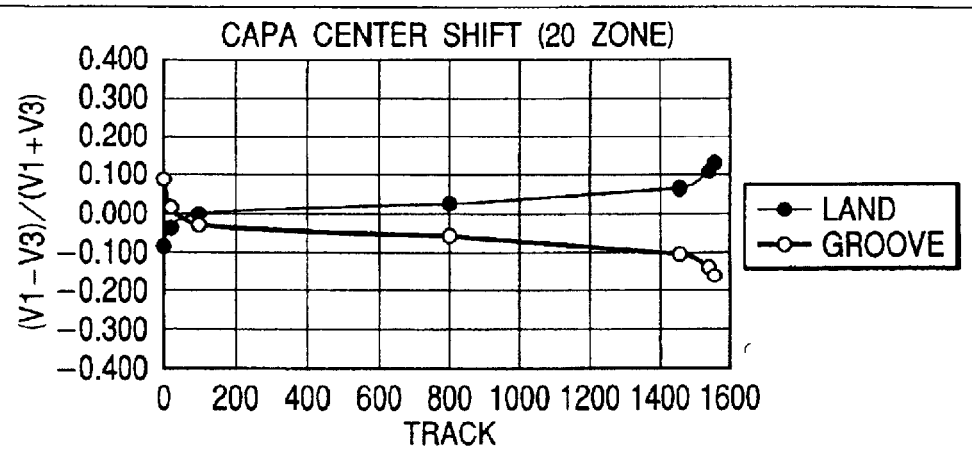
COMPARISON EXAMPLE 1
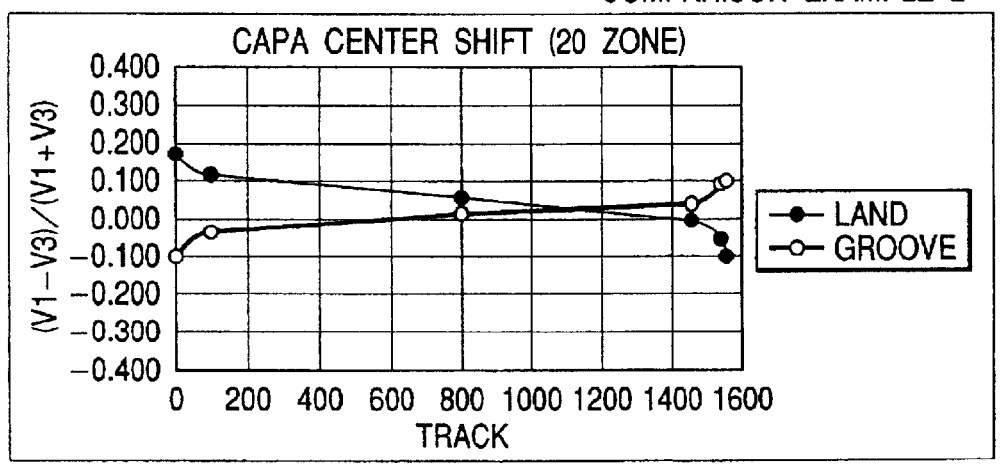
COMPARISON EXAMPLE 2
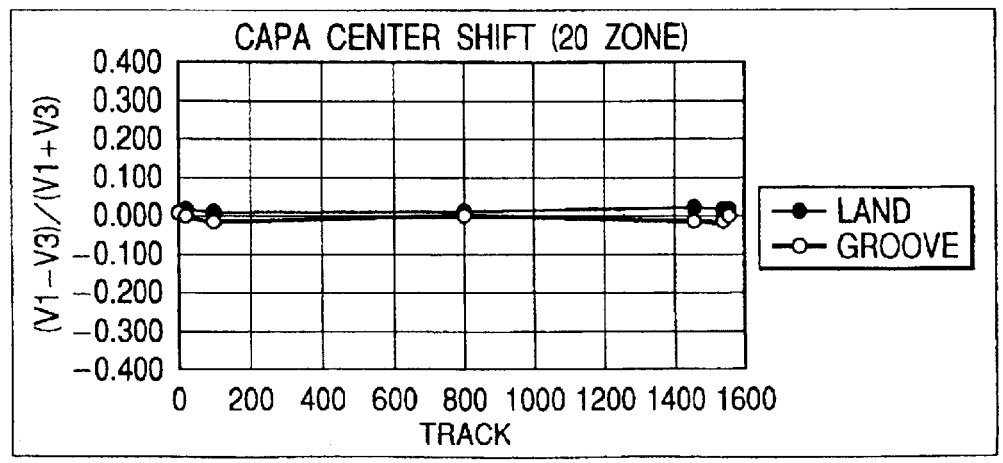
INVENTION

ARGON FLOW RATE: SMALL

ARGON FLOW RATE: LARGE
INTERNAL STRESS COMPENSATABLE CONDITION

INFORMATION RECORDING MEDIUM AND METHOD FOR MANUFACTURING INFORMATION RECORDING MEDIUM

BACKGROUND OF THE INVENTION

This invention relates to an information storage medium used as an optical disk.

Various principles have already been known which are used for recording information on thin film (recording film) by irradiation of laser light. Among them, those which utilize the change of atomic arrangement, for example the phase change (also called phase transition or phase transformation), of the film material caused by laser light irradiation have an advantage in that since such changes are accompanied by virtually no deformation of the film, information storage media of double-side disk structure two disk members.

These information storage media are usually of a structure comprising a substrate and, thereon, a protective layer, a recording film of, for example, the GeSbTe type, a protective layer and a reflecting layer.

In this specification, the term "phase change" is used not only to represent the phase change between a crystalline state and an amorphous state but also to include the phase changes of melting (change to liquid phase) and recrystallization and phase change between a crystalline state and another crystalline state.

In rewritable optical disks, such as DVD-RAM, the recording tracks comprise a pre-formatted part provided with address pits, etc. serve for confirming the address, detecting the clock and synchronizing signal and a user data part which has grooves for tracking and conducts writing and reading information.

However, such optical disks have the following problem. Since the deformation caused by a stress acting between the stacked film and the substrate differs between the pre-formatted part and the user data part, the recording tracks are in a bent state relative to the pre-formatted part; resultantly, in a case where the light spot diameter represented by $\lambda/NA$ is 1.0–1.1 $\mu$m and a high recording track density of a recording track width of not more than 0.8 $\mu$m is used, when a push-pull tracking is applied to the grooves for tracking, the address data of the pre-formatted part cannot be read and, if the tracking offset is corrected so that the track of the light spot may come to the right position relative to the pre-formatted part, offset will occur in the recording region to cause erasion of a part of the data of the adjacent track. The reason for the difference in deformation between the pre-formatted part provided with address pits etc. and the user data part which conducts recording is considered that since the user data part has grooves for tracking, it is more apt to deform at the inclined part of the groove by applied force.

Another problem caused by the stress which acts between the stacked film and the substrate is that when many tracks are subjected to many times of rewriting by overwriting, the substrate surface is apt to expand and deform owing to heat evolved at the time of recording and the relaxation of the expansion takes long time and resultantly, the surface expansion is accumulated to become soft. Thus, owing to the stress exerted by the stacked film on the substrate, the grooves for tracking bend towards the direction of applied force by the stress. The bend is the larger as the position of the groove is the nearer to the center of the many-times recording region.

SUMMARY OF THE INVENTION

The object of this invention is to provide, overcoming the problems mentioned above, an information storage medium which can retain good and highly reliable write & read characteristics even when subjected to overwriting in a high recording density.

To solve the above-mentioned problems, two fundamental solving means are used for the information storage medium of this invention; that is, to reduce the stress acting between the stacked film and the substrate as much as possible and to reduce the increase of the substrate surface temperature during deposition of films as much as possible. Reducing the stress acting between the stacked film and the substrate is conducted by providing a stress-compensation layer. However, the substrate surface temperature rises during film formation and film attaches thereto in an expanded state; then when the substrate is cooled, the stress exerted by the substrate on the film is compression stress and the stress differs depending on the increase of the substrate temperature, so that the stress may possibly differ between at the start of production of the storage medium and during the continuous production. In such a case, the influence of the change of the substrate surface temperature can be made to be absorbed by controlling the film thickness of the stress-compensation layer.

According to this invention, there are provided an information recording medium and a method for manufacture thereof described below.

(1) An information storage medium which effects writing and reading by laser light which has a film containing 70 atomic % or more of at least one element selected from the group consisting of Cr, Ti, V Mn, Fe, Co, Ni, Cu, Zn, Zr, Nb and Mo, said film having a thickness of 30 nm or more and having a pillar-like structure continuing from the lower face to the upper face of the film in at least 80% of the section of the film.

(2) An information storage medium which has at least two layers each containing 60 atomic % or more of metal at the more back side than the recording film when seen from the light incident side, one of the said layers containing 60 atomic % or more of at least one metal element having an atomic number of not less than 22 and not more than 47 and having a film thickness of 30 nm or more.

(3) The information storage medium described in (2) wherein the layer containing 60 atomic % or more of metal contain 60 atomic % or more of at least one metal element having an atomic number of not less than 22 and not more than 28 and have a film thickness of 30 nm or more.

(4) The information storage medium described in (2) above which have three above-mentioned layers containing 60 atomic % or more of at least one metal element.

(5) The information storage medium described in (2) above wherein the metal element having an atomic number of not less than 22 and not more than 47 is at least one of Ti and Cr.

(6) The information storage medium described in (2) above wherein, among the above-mentioned at least two layers each comprising metal as the main component, the layer nearest to the light incident side comprises Cr or Mo as the main component.

(7) The information storage medium described in (2) above wherein the layer comprising metal as the main component which contains 60 atomic % or more of at least one metal element having an atomic number of not less than 22 and not more than 47 and has a thickness of 30 nm or more is present on the more front side when seen from the light incident side, than the other layer(s) comprising metal as the main component.

(8) The information storage medium described in (2) above wherein the layer comprising metal as the main component which contains 60 atomic % or more of at least one metal element having an atomic number of not less than 22 and not more than 47 and has a film thickness of 30 nm or more is present on the more back side, when seen from the light incident side, than the other layer(s) comprising metal as the main component.

(9) The information storage medium described in (8) above wherein the layer(s) comprising metal as the main component other than the above-mentioned layer comprising metal as the main component which contains 60 atomic % or more of at least one metal element having an atomic number of not less than 22 and not more than 47 and has a film thickness of 30 nm or more contain(s) 70 atomic % or more of Al or Ag.

(10) The information storage medium described in (2) above wherein the layer between the at least two metal layers and recording film is at least one dielectric material layer and the whole thickness of the at least one dielectric material layer is not less than 10 nm and not more than 50 nm.

(11) The information storage medium described in (2) above wherein the layer containing 60 atomic % or more of at least one metal element having an atomic number of not less than 22 and not more than 47 has a film thickness of not less than 50 nm and not more than 150 nm.

(12) An information storage medium which comprises a substrate and, stacked thereon in the following successive order, at least a dielectric material layer having a thickness of not less than 100 nm and not more than 140 nm, a recording film having a thickness of not less than 5 nm and not more than 20 nm, a dielectric material layer having a thickness of not less than 10 nm and not more than 50 nm, a layer comprising at least one metal element as the main component and having a thickness of not less than 20 nm and not more than 70 nm, a layer containing 60 atomic % or more of at least one metal element having an atomic number of not less than 22 and not more than 47 and having a film thickness of not less than 50 nm and not more than 150 nm, and layer comprising at least one metal element as the main component and having a thickness of not less than 20 nm and not more than 200 nm.

(13) An information storage medium which comprises a substrate and, stacked thereon in the following successive order, at least a dielectric material layer having a thickness of not less than 100 nm and not more than 140 nm, a recording film having a thickness of not less than 5 nm and not more than 20 nm, a dielectric material layer having a thickness of not less than 10 nm and not more than 50 nm, a layer comprising at least one metal element as the main component and having a thickness of not less than 20 nm and not more than 70 nm, a layer comprising at least one metal element as the main component and having a thickness of not less than 20 nm and not more than 200 nm, and a layer containing 60 atomic % or more of at least one metal element having an atomic number of not less than 22 and not more than 47 and having a film thickness of not less than 50 nm and not more than 150 nm.

(14) The information storage medium described in (12) or (13) above wherein, among the at least two above-mentioned layers comprising at least one metal element as the main component, the layer of the side nearest to the light incident side comprises Cr or Mo as the main component.

(15) The information storage medium described in (12) or (13) above wherein the layer comprising at least one metal element as the main component and having a thickness of not less than 20 nm and not more than 200 nm contains 70 atomic % more of Al or Ag.

(16) The information storage medium described in (2) above wherein the recording film effects recording by phase exchange.

(17) The information storage medium described in (2) above wherein the substrate has a recording track pitch of not less than 0.3 µm and not more than 0.7 µm and has pit trains which represent address information, etc. at positions shifted from the track center.

(18) The information storage medium described in (8) above wherein the above-mentioned other layer(s) comprising metal as the main component comprise(s) Ag as the main component and the number of layers of the recording stacked film is 6.

(19) An information storage medium which effects writing and reading by laser light which has a layer containing 60 atomic % or more of at least one metal element having an atomic number of not less than 22 and not more than 47, said layer being a layer formed at an Ar flow rate of 120 SCCM or more.

(20) A method of manufacturing an information storage medium which effects writing and reading by laser light which method comprises forming a layer containing 60 atomic % or more of at least one metal element having an atomic number of not less than 22 and not more than 47 at an Ar flow rate of 120 SCCM or more.

(21). An information storage medium which has at least one layer containing 60 atomic % or more of at least one metal element having an atomic number of not less than 22 and not more than 47 and having a film thickness of 30 nm or more.

(22) The information storage medium described in (21) above wherein the above-mentioned layer containing 60 atomic % or more of a metal element having an atomic number of not less than 22 and not more than 47 is a layer of a Ti—Cr or V—Cr alloy which contain not less than 30 atomic % and not more than 85 atomic % of Cr, and not less-than 15 atomic % and not more than 70 atomic % of Ti or V.

BRIEF DESCRIPTION OF THE DRAWINGS

FIG. 10 is a diagram showing the recording waveform of 4.7 GB DVD-RAM.

FIG. 11 is a diagram showing the recording waveform of 4.7 GB DVD-RAM.

FIG. 14 shows the results of determination of track bend of the information storage medium of this invention.

DETAILED DESCRIPTION OF THE INVENTION

Figure 1:
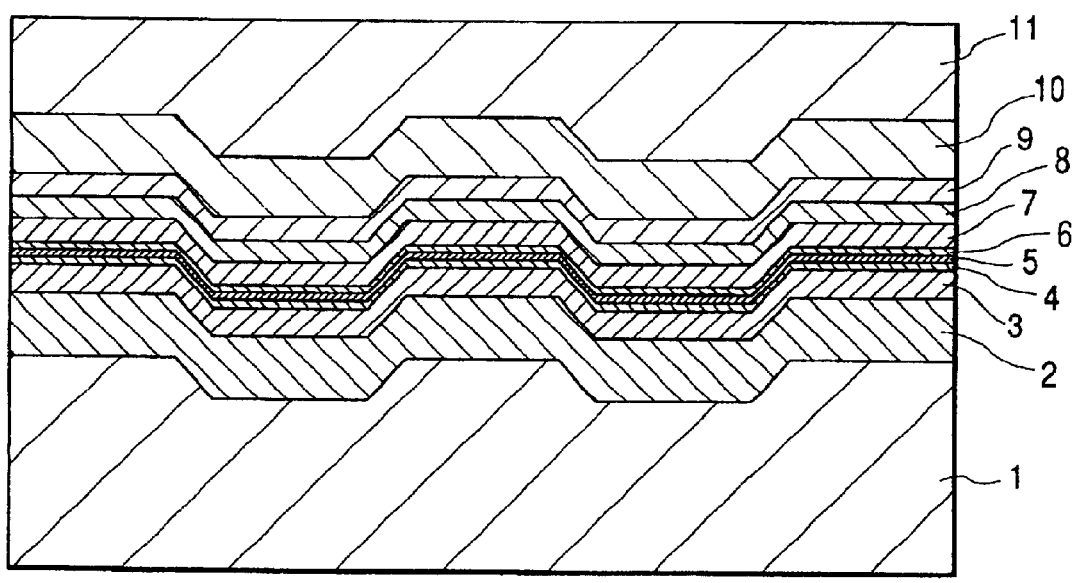
FIG. 1 is a sectional view showing the structure of the information storage medium of this invention, wherein numeral 9 indicates a stress-compensation layer.

The materials of the above-mentioned other layer comprising metal as the main component are preferably those which comprise as the main component Al alloys, such as Al—Cr, Al—Ti, Al—Ag and Al—Cu, because the target is inexpensive and, since the alloys have a high thermal conductivity, heat is readily released from the absorption compensation layer and the recording film, so that the disk can be quenched easily, and moreover, a good rewrite characteristic can be obtained. Pure Al may also be used. The materials of the reflecting layer are preferably those comprising as the main component Ag alloys, such as Ag—Pd, Ag—Cr, Ag—Ti, Ag—Pt, Ag—Cu and Ag—Pd—Cu, and in the next place those comprising as the main component Au alloys, such as Au—Cr, Au—Ti, Au—Ag, Au—Cu and Au—Nd. Since Ag and Au have a higher thermal conductivity than Al, they are still more excellent in the function of rapidly releasing the heat evolved in the film. Further, alloys which have a high reflectivity as Ag alloys, Cu alloys and Au alloys give a high degree of modulation and hence a good reading characteristic. However, Ag and Au are noble metals and hence expensive, and in some cases cause an increase in cost depending on the film thickness. Ag and Au can also be used as a simple substance.

When the content of elements other than Al, Cu, Au and Ag is selected so as to fall in the range of not less than 0.5 atomic % and not more than 4 atomic %, characteristic property in many times of rewriting and bit error rate are improved, which are still more improved when the content is in the range of not less than 1 atomic % and not more than 2 atomic %.

It is also preferable that the absorption compensation layer situated in the front side of the above-mentioned film containing 70 atomic % or more of at least one element selected from the group consisting of Cr, Ti, V, Mn, Fe, Co, Ni, Cu, Zn, Zr, Nb and Mo comprises at least the nitride or oxide of Mo, Si, Ta, Ge, Cr, Al or W, or a mixed composition with these compounds.

In the case wherein the absorption compensation layer comprises Cr-($Cr_2O_3$), the proportion of Cr relative to the whole components (sum of Cr and $Cr_2O_3$) is preferably not less than 42 mol %, and more preferably not less than 61 mol % and not more than 90 mol %. When Al, Mo, W, Ta, Ti, Fe, Co, Ni, Pd or Pt is used in place of the Cr in the Cr-($Cr_2O_3$) film used as the absorption compensation layer, similar results can be obtained. Among them, Mo and Cr are preferable in point of their high melting point. Pd and Pt are preferable in that they show a low reactivity with other layers and can give a still larger number of times of rewriting. The use of Ni, Co or Ti makes it possible to use a more inexpensive target as compared with other meals and hence to reduce the entire manufacturing cost. Ti is particularly preferable because it has a high corrosion resistance and gives better results in life test as compared with other metals.

As a material which can replace the $Cr_2O_3$ in the Cr—($Cr_2O_3$) film used in the absorption compensation layer, there may be used various light-permeable compounds, for example oxides and nitrides. Such compounds include oxides, such as SiO, $Al_2O_3$, BeO, $Bi_2O_3$, CoO, CaO, $Cr_2O_3$, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $Moo_3$, NbO, $NbO_2$, NiO, PbO, PdO, SnO, $SnO_2$, $Sc_2O_3$, SrO, $ThO_2$, $TiO_2$, $Ti_2O_3$, TiO, $Ta_2O_5$, $TeO_2$, VO, $V_2O_3$, $VO_2$, $WO_2$, $WO_3$, $Y_2O_3$ and $ZrO_2$; nitrides, such as Al—N, B—N, Cr—N, Ge—N, Hf—N, Si—N, Al—Si—N type materials (e.g. $AlSN_2$), Si—O—N type materials, Ta—N, Ti—N and Zr—N; sulfides, such as ZnS, $Sb_2S_3$, CdS, $In_2S_3$, $Ga_2S_3$, GeS, $SnS_2$, PbS, $BieS_3$, SrS, MgS, CrS, CeS and $TsS_4$; selenides, such as $SnSe_2$, $Sb_2Se_3$, CdSe, ZnSe, $In_2Se_3$, $Ga_2Se_3$, GeSe, $GeSe_2$, SnSe, PbSe and $Bi_2Se_3$; fluorides, such as $CeF_3$, $MgF_2$, $CaF_2$, $FiF_3$, $NiF_3$, $FeF_2$ and $FeF_3$; borides, such as Si, Ge, $TiB_2$, $B_4C$, B, CrB, $HfB_2$, $TiB_2$ and WB; carbides, such as C, $Cr_3C_2$, $Cr_{23}C_6$, $Cr_7C_3$, $Fe_3C$, $Mo_2C$, WC $W_2C$, HfC, TaC and $CaC_2$; materials near in composition to the above-mentioned materials; and the mixtures of the materials. There may also be used In—Sb, Ga—As, In—P, Ga—Sb, In—As and the like.

Among the above-mentioned materials, the use of oxides makes it possible to use less expensive targets than in the use of other materials and hence to reduce the entire manufacturing cost. Particularly preferable among oxides are $SiO_2$, $Ta_2O_5$ and $Y_2O_3$—$ZrO_2$ because they are low in reactivity and can increase the number of rewritable times further. $Al_2O_3$ has a high thermal conductivity, so that when worked up into a disk having no, or thin reflecting layer, the disk tends less to deteriorate in rewriting characteristic than when other materials are used. The use of the oxide or nitride of Ge, Ge—Cr or Ge—Ti for the absorption compensation layer is preferable in that Ge permits a high sputtering rate and hence can decrease the tact time at the time of mass production.

Ge—Cr—N, Si—Ti, nitrides, such as Al—N, B—N, Cr—N, Ge—N, Hf—N, Si—N, Al—Si—N (e.g., $AlSiN_2$), Si—N, Si—O—N, Ta—N, Ti—N and Zr—N type(system) materials, and further, materials near in compositions to the above-mentioned materials may also be used. The mixture of these materials may also be used.

When a nitride is used, the adhesive force of the absorption compensation layer to the layer contacting thereto is increased to improve the resistance to external impact. When a sulfide or selenide is used, the sputtering rate can be increased and the time necessary for film formation can be shortened. When a carbide is used, the hardness of the absorption compensation layer is increased; this acts also to suppress the flow of recording film in many times of rewriting.

Information storage media wherein the absorption compensation layer comprises at least the nitride or the oxide of Mo, Si, Ta, Ge, Cr, Al or W, or the compound or the alloy thereof with at least one metallic element, for example, at least one of group consisting of Cr, Ti, V, Mn, Fe, Co, Ni, Cu, Zn, Zr, Nb or Mo are also preferable.

The melting point of the absorption compensation layer is preferably not lower than 600° C. When a material having a melting point lower than 600° C. is used as an absorption compensation layer, in some cases the layer deteriorates owing to heat evolved in the recording layer at the time of recording and heat evolved by the absorption compensation layer itself, to cause change in optical properties and decrease in S/N. With respect to the film thickness and materials of the above-mentioned respective layers, though the write & read characteristics are improved even by merely selecting their respective, individual preferable ranges, further improvements can be attained by adequately combining the respective preferable ranges.

The materials for the layer (interfacial layer) which is in contact with the recording film are preferably Cr2O3, Cr—N, Ge—N, Ge—O, SiO2, Al2O3 or the mixtures thereof. Particularly when the oxides or the nitrides of Cr and Ge are contained in a proportion of not less than 60 mol %, the storage life is improved, and a storage medium which retains excellent performance characteristics even in a high temperature, high humidity environment can be obtained. The use of Ge-containing compositions as GeN and GeO is preferable in that since they permit a higher sputtering rate in forming a film than other materials, the tact time in production can be shortened. Preferred in the next place are $Ta_2O_5$ and the mixtures of $Ta_2O_5$ with $Cr_2O_3$, Cr—N, Ge—N or GeO, and in the further next place are $ZrO_2$—$Y_2O_3$, $Cr_2O_3$ or the mixtures thereof with Cr—N, Ge—N or $Ta_2O$. More preferred of these is $Cr_2O_3$ because it makes it possible to suppress the fluctuation of the reflectivity level to 5% or less in many times of rewriting and resultantly to reduce jitter. The use of CoO, $Cr_2O$ or NiO is more preferable in that they give a uniform crystal grain diameter at the initial crystallization time and decrease the jitter increase in the initial period of rewriting. The use of nitrides, for example, Al—N, B—N, Cr—N, $Cr_2N$, Ge—N, Hf—N, $Si_3N_4$, Al—Si—N type materials (e.g., $AlSiN_2$), Si—N type materials, Si—O—N type materials, TaN, TiN and ZrN is also more preferable because the adhesive force of the resulting layer is increased, and the deterioration of the information storage medium caused by external impact is reduced.

The material of the thermal diffusion controlling layer which is in contact with the recording film mentioned above preferably constituted at least 90% of the total number of the atoms of each interfacial layer. When the content of impurities other than the above-mentioned materials is 10 atomic % or more, the deterioration of rewrite characteristic is observed, for example, the number of rewritable times decreases 20% or more.

The recording film is preferably formed so as to increase its thickness from the inner periphery towards the outer periphery such that the film thickness at the place 5 mm inside from the outermost periphery may be 1–5 nm thicker than the thickness at the place 5 mm outside from the innermost periphery. In this way, a larger increase in error rate, due to the flow of recording film caused by many times of repeated rewriting, which would occur on the inner periphery side if the thickness is the same through-out the recording film, can be prevented. This method is effective in attaining may times of successful rewriting also for a storage medium having a different stack structure from that of this invention so long as it is an optical disk which has a similar relation between the light spot diameter and the recording density.

This invention exhibits its effect when the recording density (track pitch, bit pitch) is not lower than the specification of 2.6 GB DVD-RAM, particularly when the density is not lower than the specification of 4.7 GB DVD-RAM. When the wave length of the light source is not in the neighborhood of 660 nm or when the numerical aperture (NA) of the condenser lens is not 0.6, the invention exhibits its effect at the recording density converted therefrom by using the wavelength ratio and the NA ratio both in radial direction and in peripheral direction.

Basic technologies for the recording apparatus (optical disk drive) which uses the phase change storage medium of this invention are as follows.

(1) One Beam Overwrite

Figure 3:
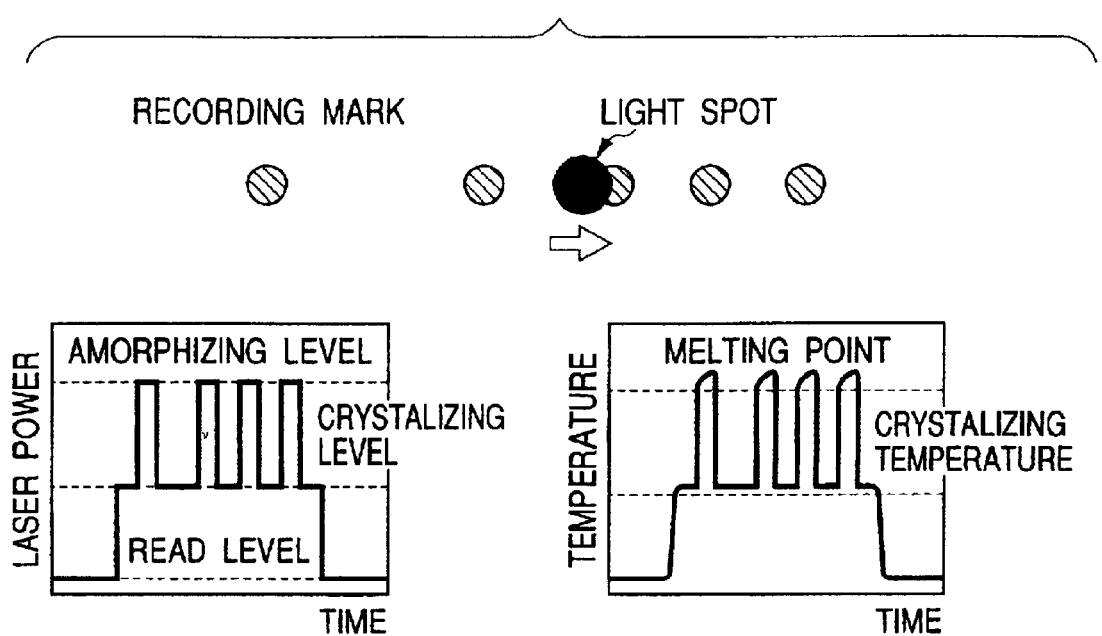
FIG. 3 is a diagram showing the principle of one-beam overwriting.

The phase-change storage medium usually effects rewriting by overwrite (to rewrite information by overwriting without previous erasing). FIG. 3 shows the principle thereof. When the recording film is molten with a high laser power and then quenched after irradiation, the film forms recording marks of amorphous state irrespective of whether the original film is in the crystalline state or in the amorphous state; when the film is heated with an intermediate laser power to a temperature not higher than the melting point at which temperature the crystallization speed is high, the part which was originally amorphous changes to crystalline, and the part which was originally crystalline stays unchanged in the crystalline state. Since it is considered that DVD-RAM is more frequently used for recording dynamic images, lengthy information is to be recorded at a time. In such a case, if the information is wholly erased previously and then new information is recorded, it will take twice the time, and moreover an enormous buffer memory will possibly become necessary. Therefore, it is an essential condition for the medium that it can be overwritten.

(2) Mark Edge Recording

Figure 4:
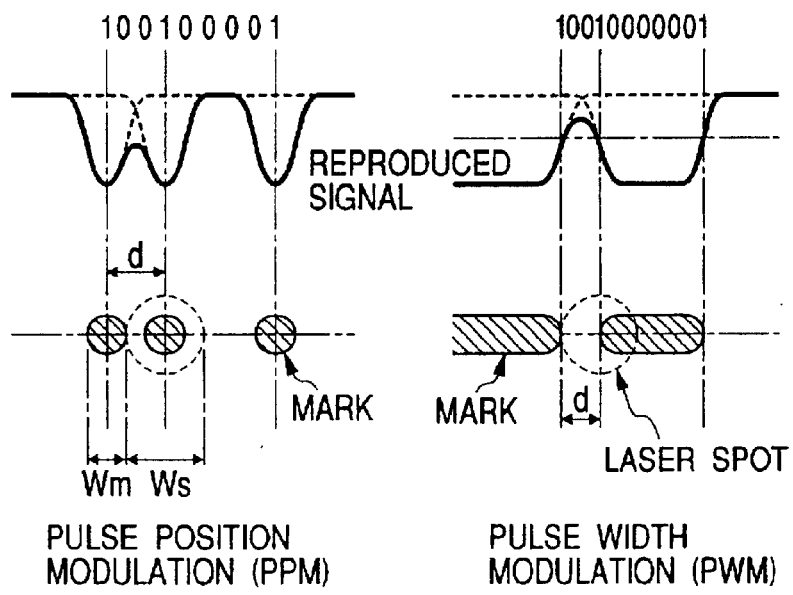
FIG. 4 is a diagram showing the comparison of density between mark position recording and mark edge recording.

In DVD-RAM and DVD-RW, the mark edge recording system, which enables high density recording, is adopted. The term "mark edge recording" means to make the positions of the both ends of the recording mark formed on the recording film correspond to 1 of the digital data, whereby it is also possible to make the length of the shortest recording mark correspond not to one but to two or three reference clocks to attain high recording density. In DVD-RAM, the 8-16 modulation system is adopted, and the above-mentioned length is made to correspond to 3 reference clocks. As indicated by the comparison shown in FIG. 4, it has the advantage of capable of high density recording even when the recording mark is made extremely small, as compared with the mark position recording in which the central position of the circular recording mark is made to correspond to 1 of the digital data. However, the storage medium requires that the distortion of the shape of the recording mark should be very small.

(3) Format

Figure 5:
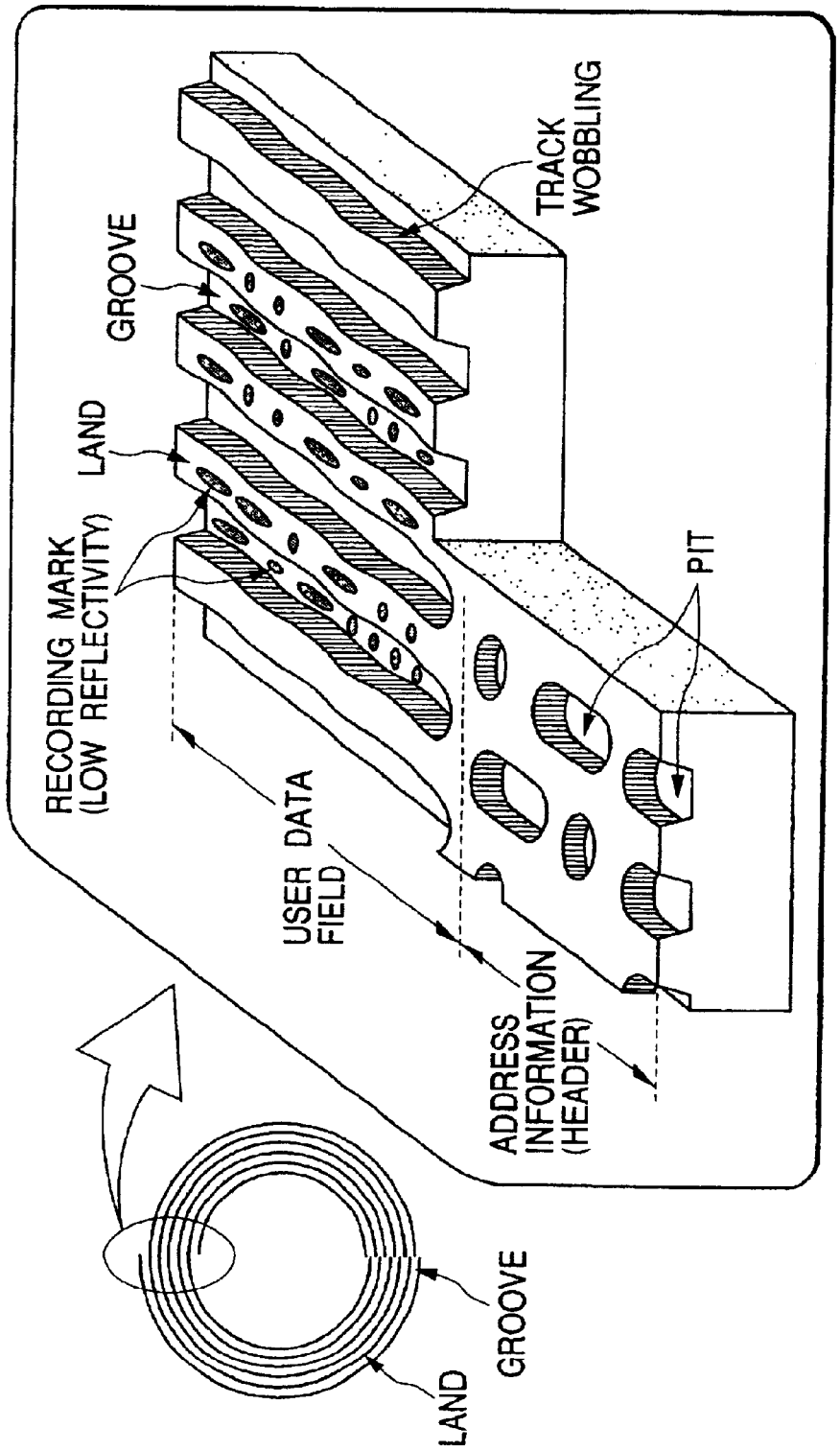
FIG. 5 is a diagram showing the relative position of the header part by format pit of DVD-RAM to the groove of user data region.

As shown by the arrangement of the header part of the beginning of each sector in FIG. 5, DVD is a format wherein one round is divided into 24 sectors and hence is capable of random access recording. Accordingly, it can be used in wide uses ranging from a built-in memory storage of a personal computer to a DVD video camera and DVD video recorder.

(4) Land-Groove Recording

Figure 6:
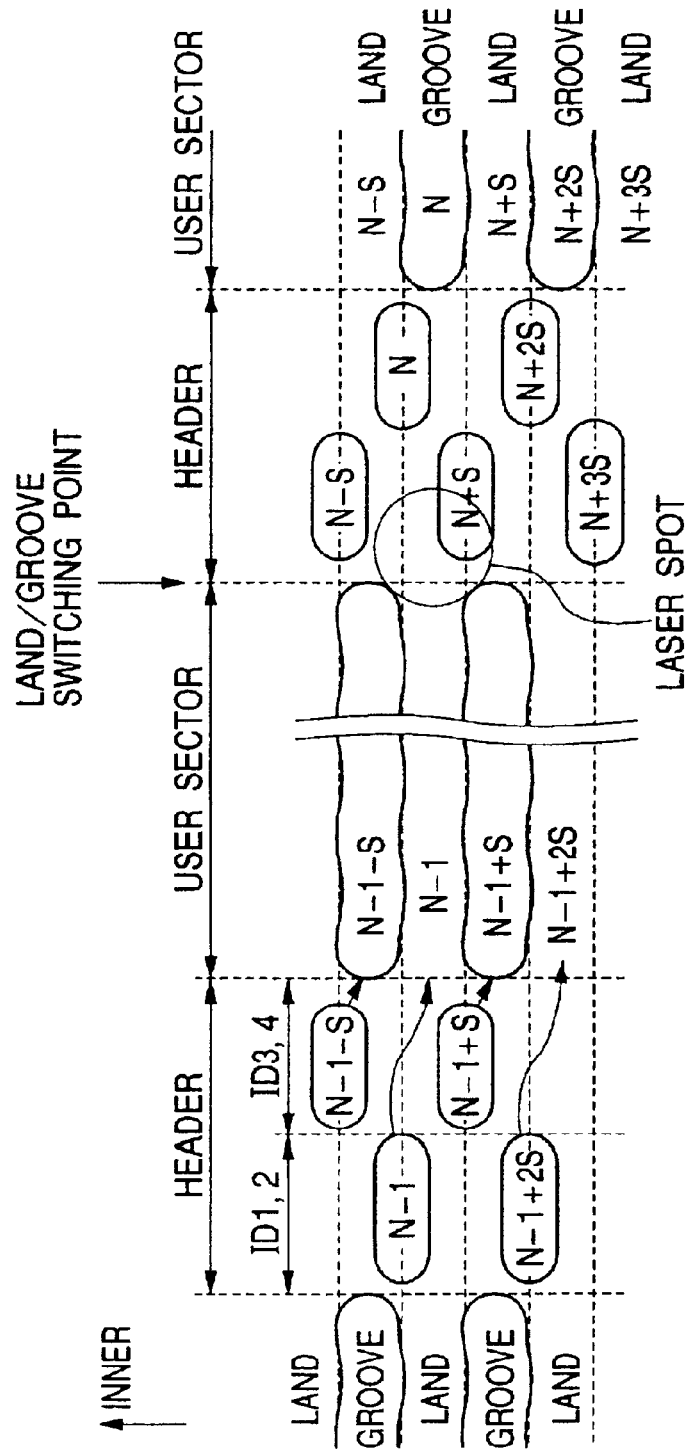
FIG. 6 is a diagram showing land-groove recording.

In DVD-RAM, as shown in FIG. 6, the crosstalk is made small by means of land-groove recording, wherein recording is conducted both in the groove for tracking and in the convex part (land) between two grooves. In the land-groove recording, a phenomenon wherein, when the groove depth is made in the vicinity of $\lambda/6$ n ($\lambda$ is the laser wavelength, n is the refractive index of the substrate) for the recording mark of light and darkness (light and shade), the recording mark of the adjacent track comes to be hardly recognizable both in the land and in the groove, is utilized; accordingly, in 4.7 GB DVD-RAM, for example, a narrow track pitch of 0.615 $\mu$m is adopted. The medium is required to be designed such that the phase difference between the recording mark and other part than that, in other words the phase difference component of the regeneration signal, may work in the direction of facilitating the development of crosstalk and become sufficiently small. Since the phase difference component of the regeneration signal is summed up with the light and shade regeneration signal of the land and the groove in the opposite phase, it may cause imbalance between the regeneration signal levels of the land and the groove.

(5) ZCLV Recording System

Figure 7:
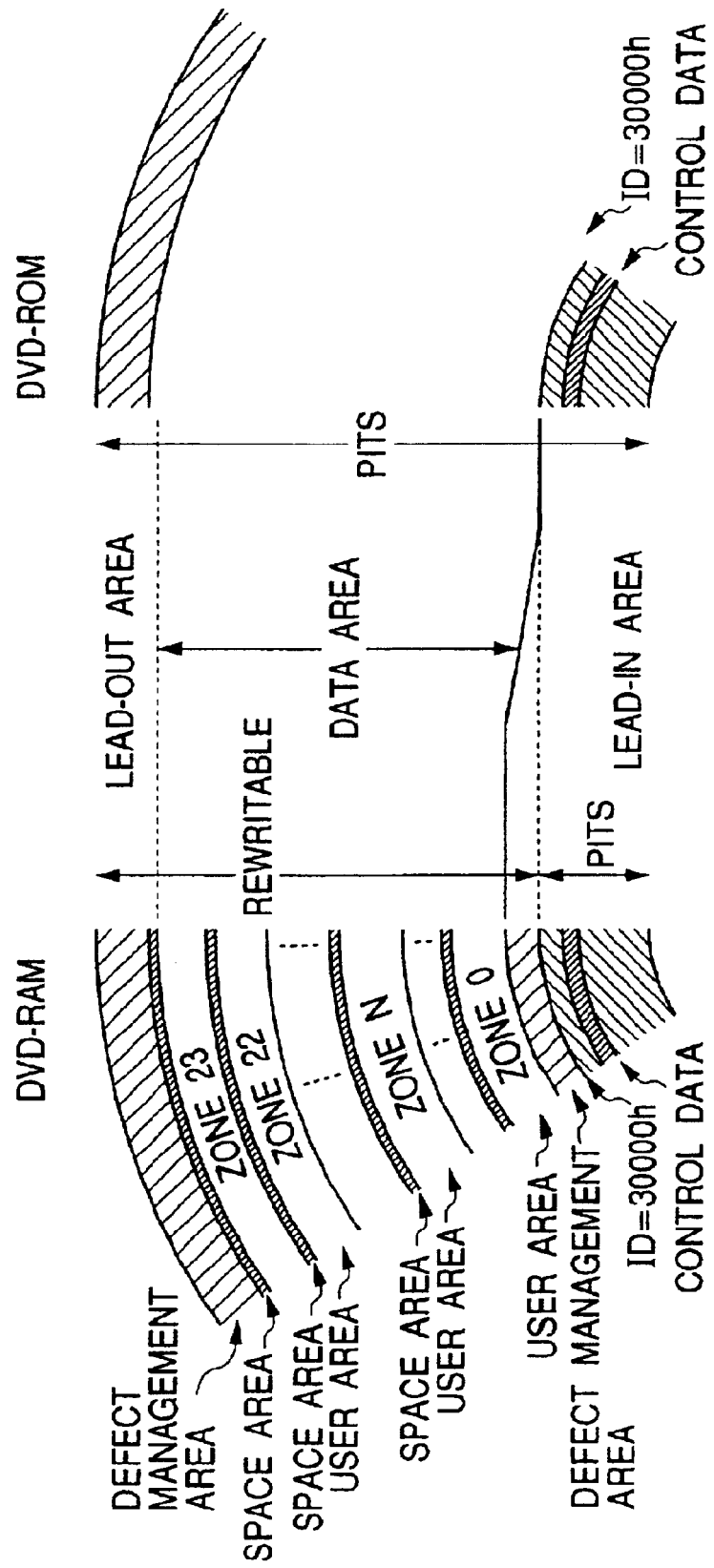
FIG. 7 is a diagram showing the Z one CLV recording system.

In a phase-change storage medium, when the recording waveform is not changed, it is desirable for obtaining a good write & read characteristic to record in an optimum linear velocity corresponding to the crystallization velocity. However, when access is done between recording tracks different in radius on the disk, it takes time to change the number of rotation in order to obtain the same linear velocity. In DVD-DAM, therefore, as shown in FIG. 7, the ZCLV (Zone Constant Linear Velocity) system is adopted, wherein, in order that the access velocity may not become small, the radial direction of the disk is divided into 24 zones, the number of rotation is kept constant in a zone, and only when access is to be done to another zone the number of rotation is changed. In this system, between the innermost periphery track and the outermost periphery track in a zone, the linear velocity is slightly different and hence the recording density is slightly different but recording can be effected at approximately the maximum density over the whole region of the disk.

The roles of the other layers than the stress-compensation layer of this invention are as follows.

(i) Absorption Compensation Layer

Figure 8:
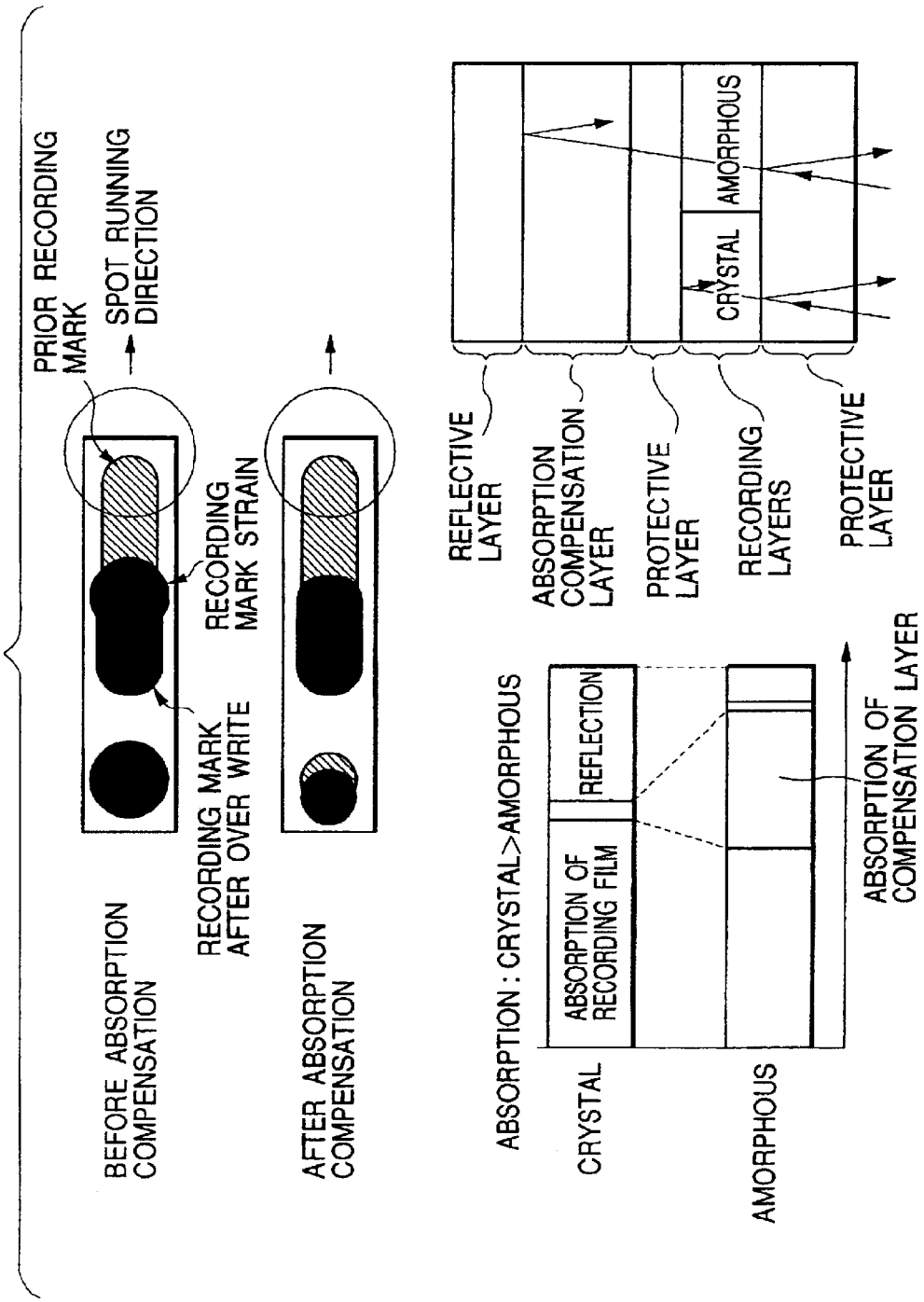
FIG. 8 is a diagram showing the role of the absorption compensation layer.

In a high linear velocity (8.2 m/sec) medium as 4.7 GB/face medium, the advanced erase (a phenomenon wherein the recording mark is erased in advance in a band-formed region of a temperature range of 300° C.–550° C. more forward than the region where the recording film is molten by light spot irradiation), which can be expected in a low linear velocity medium as 2.6 GB/face (6 m/s) of DVD-RAM, cannot be expected sufficiently, so that it is essential to keep the light absorption ratio Ac/Aa of the inside and the outside of the recording mark at a value not less than 1. For absorption compensation, there is also known a method wherein the reflecting layer is made thin and light is transmitted so that the light absorption of the recording film may not become too much as the recording mark part of low reflectivity (N. Yamade, N. Akahira, K. Nishiuchi, S. Furukawa: High Speed Overwrite Phase-change Optical Disk: Inst. of Electronic Information & Communication Engineers, Japan, Technical Research Report MR 92-71, CPM 92-148 (1992) 37). Though Au, which has a high transmittance, is used for the reflecting layer, yet the film thickness needs to be made thin to about 10 nm, and hence thermal diffusion by the metal layer is insufficient. The insufficiency of thermal diffusion causes the distortion of the shape of recording mark due to recrystallization subsequent to melting and thermal deterioration due to many times of rewriting. In another method wherein, as its principle is shown in FIG. 8, an absorption compensation layer (for example, a layer comprising Cr as the main component) which is another layer that absorbs light is provided, owing to the light absorption by this layer, the light which has transmitted the recording film at a recording mark part having a low reflectivity is reflected by the reflecting layer and is again absorbed by the recording film, whereby the excessive increase of temperature can be prevented and an Ac/Aa value of not less than 1 can be attained (Motoyasu Terao: High-density Storage Medium for Rewritable DVD: Annual Convention of Inst. of Television Engineers of Japan, Collection of Preliminary Papers, Si-3 (1996) 526–529). Further, this method can prevent the distortion of the shape of overwritten recording mask caused by the absorption difference between the crystalline state and the amorphous state. Further, the thermal conductivity of this layer can be selected fairly as desired. Accordingly when an intermediate value between the thermal conductivity of the metal reflecting layer positioned upon this layer and that of the upper protective layer positioned under this layer is adopted, the direction in which the temperature gradient becomes minimum, that is, the direction of thermal diffusion vector, is more upward and heat diffuses in longitudinal direction as compared with a case wherein only a metal reflecting layer is present. From the above-mentioned reason, the absorption compensation layer is also called heat buffer layer. In a high density phase-change optical disk, since its track pitch is narrow, consideration must be given to a phenomenon, called cross-erase, wherein a part of the recording mark already written on the adjacent track is erased. To prevent this cross-erase, the above-mentioned longitudinal diffusion of heat is important. One of the reasons is that heat goes hardly toward the adjacent track owing to its longitudinal diffusion. When Ac/Aa is larger than 1, the temperature rise in the recording mark part of the adjacent track is small; this exerts a favorable effect also in preventing cross-erase.

Figure 9:
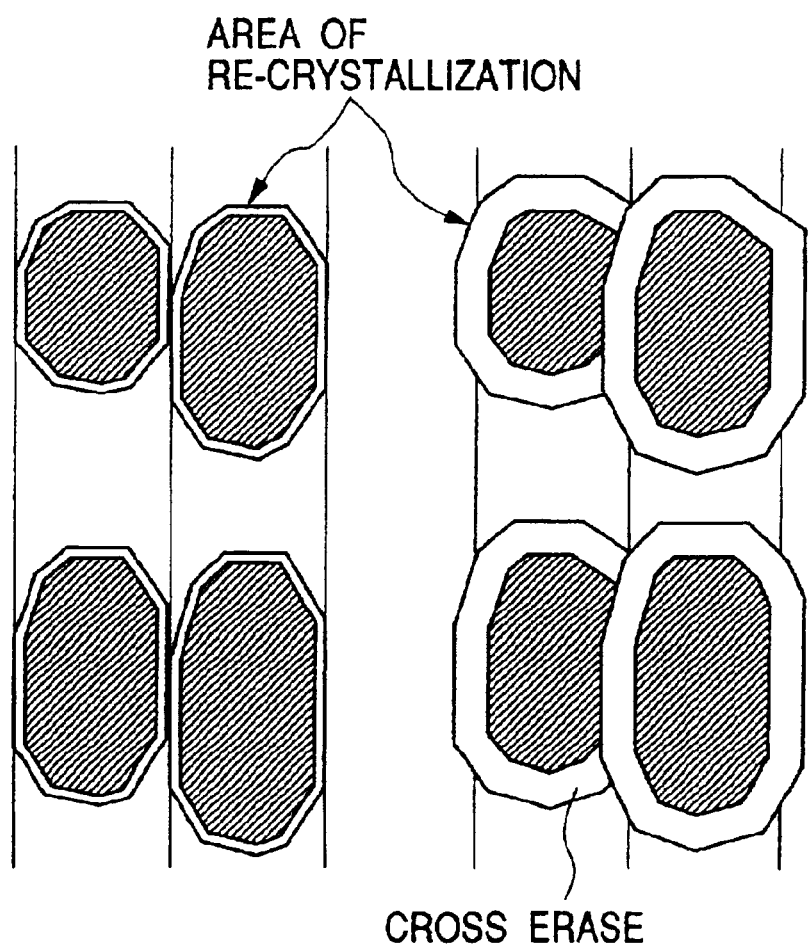
FIG. 9 is a diagram showing the increase of cross erase caused by recrystallization.

For preventing cross-erase, the prevention of recrystallization is also important. This is because, as shown in FIG. 9, when the part which remains as an amorphous recording mark is narrowed owing to recrystallization occurring from the peripheral part after the melting of the recording film at the recording, time, it is necessary for forming a recording mask of predetermined size to melt a wider range, which tends to increase the temperature of the adjacent track. When heat diffuses in the longitudinal direction, recrystallization can also be prevented, because it can prevent the transversal diffusion of heat of the central part at the time of recording mark formation which diffusion will slow the cooling of the molten peripheral region and facilitate crystallization.

(ii) Reflectivity Improving (Contrast Intensifying) Layer

When an absorption compensation layer is used, the high reflectivity of the reflecting layer is suppressed and resultantly the reflectivity as a whole tends to decrease. Accordingly, when, besides the layer of $(ZnS)_{80}·(SiO_2)_{20}$ usually employed as the lower protective layer, another layer (3) having a different refractive index is provided as a contrast-intensifying layer, the design of other parts is facilitated. Further, since the layer has a higher thermal conductivity than the protective layer, the symmetry of upward and downward thermal diffusion from the recording film increases, to increase the symmetry of the characteristics of lands and grooves; thus an effect of preventing cross-erase which is apt to occur particularly in grooves is also obtained. The layer is also effective in preventing the thermal expansion of the recording film side of the $(ZnS)_{80}·(SiO_2)_{20}$ protective layer at the time of rewriting which expansion will push the molten recording film to cause the flow of recording film and limit the number of rewritable times.

(iii) Interfacial Layer

In 4.7 GB DVD-RAM, interfacial layers of oxides or nitrides are provided on the both sides of the recording film Yasushi Miyauchi, Motoyasu Terao, Akemi Hirosue, Makoto Miyamoto, Nobuhiro Tokushuku: Prevention of mutual diffusion between protective layer and recording layer of phase-change optical disk by oxide interfacial layer: a Jpn. Soc. Appl. Phys., Collection of preliminary papers, third separate volume, 29p-ZK-12, (1998 spring) 1127)). As compared with a case wherein the $(ZnS)_{80}·(SiO_2)_{20}$ protective layers are present on the both sides, both the crystal nucleation velocity and the crystal growth velocity increase and thereby the crystallization velocity increases. In 4.7 GB DVD-RAM, for example, since a recording waveform which will not lower power than the erasing power level in used and since the difference between the positions on the recording track of recording pulses adjacent in front and rear has been made small in order to attain high density, before one recording pulse solidifies after irradiation the next recording pulse comes, so that the mass transfer flow) of recording film is apt to occur. For improving this point, it is effective to make the recording film thin and thereby relatively to strengthen the influence of the adhesive force to the both side layers; however, then these is a likelihood both the crystal nucleation velocity and the crystal growth velocity being decreased to develop partial incomplete erasing of amorphous recording marks. However, by using double interfacial layers of, for example, oxides, the likelihood of developing incomplete erasing can be eliminated. Nitrides may also be used (M. Otoba, N. Yamada, H. Ohta, and K. Kawahara, Phase-change optical disk having nitride layers on both sides of recording film: Jpn. Soc. Appl. Phys., Collection of preliminary papers, third separate volume, 29p-ZK-13 (spring, 1998), 1128, and N. Yamada, M. Otoba, K. Kawahara, N. Miyagawa, H. Ohta, N. Akahira and T. Matsunaga: Phase-change optical disk having a nitride interface layer, Jpn. G. Appl. Phys. Part 1, 37 (1988) 2104). Though reflectivity decreases when the recording film is thinned, it can be remedied by the reflectivity improving layer. However, if the recording film is thinned still more, the reflectivity difference between the crystal state and the amorphous state will decrease and resultantly the regeneration signal intensity itself will decrease; therefore, the recording film cannot be made thin further.

In a storage medium, the jitter, namely fluctuation of the recording mark at the edge position, increases about 2% in the first rewriting and then slightly increases or decreases until $10^5$ times of rewriting, but no problem occurs at all in data error. The results of accelerated life test have revealed that the storage life of recorded data is at least 10 years even in conservative estimation.

Figure 12:
FIG. 12 is a diagram showing the shortest 83T mark form of 2.6 GB DVD-RAM.
Figure 13:
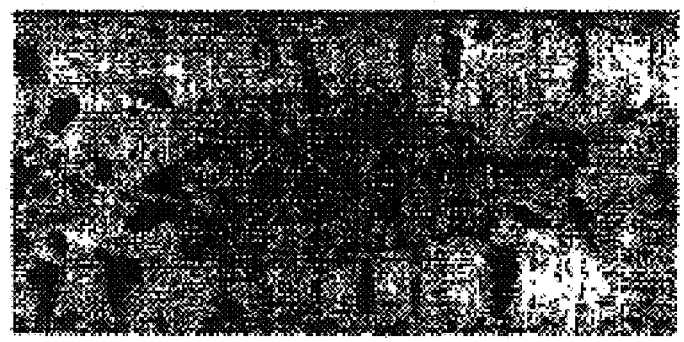
FIG. 13 is a diagram showing the 3T mark form of 2.6 GB DVD-RAM in the absence of cooling after recording pulse.

The recording waveform and the recording mark form are related as follows. For example, in 4.7 GB DVD-RAM, since the shortest mark length is 0.42 μm and the linear velocity is 8.2 m/s, a recording pulse which farms one recording mark is divided into plurality but, to form a recording mark accurately, importance is given on accurate heating than on prevention of heat accumulation and, as shown in FIG. 10 and FIG. 11, a recording waveform is adopted which contains no or quite little portion that is lower than the erasing power level. Further, as described already, the adaptive control of the width of the first and the last pulse which form the recording mark is also necessary ("adaptive control" means to control, according to the length of the space in question and the length of the precedent mark, the end position of the last pulse which forms the precedent mark and the start position of the first pulse which forms the succeeding mark). The difference appears particularly in the 3T mark, which is the shortest mark. The 3T mark of 2.6 GB DVD-RAM assumes, as shown in FIG. 12, a form like the feather of an arrow as the result of crystallization of its end part (M. Terao, A. Hirotsune, Y. Miyauchi, M. Miyamoto, T. Nishida, K. Andoh, N. Tokusyuku, S. Fukui: High Performance Phase Change Media for DVD-RAM: Proc. SPIE Vol. 3109 (1997) 60 and M. Miyamoto, A. Hirotsune, Y. Miyauchi, K. Ando, M. Terao, N. Tokusyuku, R. Tamura, Analysis of recording mark forming process in DVD-RAM media, Inst. Electronic Information and Engineers of Japan Communication Technical Research Report, CPM97-96 (1997)); whereas the 3T mark of 4.7 GB DVD-RAM is in the form of ellipse having an ratio of major axis to minor axis near to 1. In the case of 2.6 GB, the crystallization of the end part occurs, after the recording pulse, after the part called "cooling pulse" of decreased power, as the result of a large number of crystal nucleation and crystal grain growth which take place by the influence of increasing the power to the erasing power level. Though the presence of the above-mentioned recurrent erasing region is preferable because then the incomplete erasing of the precedent recording mark on the outside of the melt region hardly occurs, care must be taken to avoid the occurrence of pseudo recurrent erasing caused by incomplete crystallization of the recurrent erasing region. The pseudo recurrent erasing tends to occur the more hardly as the crystallization velocity of the recording film is the higher. At the recording density and the linear velocity of 2.6 GB DVD-RAM and under the situation of no adaptive control of the recording waveform being conducted, when the cooling pulse is eliminated, as shown in FIG. 13, recrystallization regions develop on the both sides of the end part of the 3T mark to cause the distortion of mark shape and additionally the fluctuation of the shape also tends more to occur, to result in the increase of regeneration signal jitter. In the power modulation pattern of the recording laser light in the case of 2.6 GB DVD-RAM, as shown in FIG. 10 and FIG. 11, by a dotted line the laser power is lowered approximately to the level of reading laser power even at the last of the pulse trans and between pulses. This is for preventing the heat generated by the precedent pulse from being transferred by thermal conduction in the proceeding direction of the light spot to increase temperature excessively or to lower the cooling velocity. Increasing the cooling velocity is effective in preventing the inside of the region of molten recording film form returning again to the crystalline state during cooling, and in suppressing the flow of recording film which may be caused by many times of repeated rewriting. In 4.7 GB DVD-RAM, since no cooling pulse is present, recurrent erasing does not occur; and since its individual pulse is short and linear velocity is high, recrystallization from both sides of the recording mark end part, which might occur when no cooling pulse is present, also hardly takes place. The problem of the flow of recording film being at to occur is dealt with by making the recording film thickness rather thin. Techniques for attaining high performance characteristic are summarized below.

1. Techniques which contribute to attaining narrow track pitch land-groove recording, absorption compensation layer, reflectivity improving layer (contrast intensifying layer)

2. Techniques which contribute to attaining narrow bit pitch mark edge recording, ZCLV recording system, absorption compensation layer, interfacial layer, reflectivity improving layer, adaptive control recording waveform 3. Technique which contribute to attaining high velocity One-beam overwrite, recording film composition, absorption compensation layer, interfacial layer, reflectivity improving layer As described above, a single layer has a plurality of roles and the functions of respective layers are intertwined complicatedly. The stress-compensation layer also contributes to attaining a narrow track pitch by preventing the deformation of grooves and, at the same time, has a role of compensating thermal diffusion and absorption to contribute to attaining a narrow bit pitch and high speed. Accordingly, it is very important for attaining high performance characteristics to select optimum combination of stacked films and optimum film thickness.

DESCRIPTION OF THE PREFERRED EMBODIMENTS

This invention is described in detail below with reference to Examples.

EXAMPLE 1

[Structure, Method of Manufacture]

FIG. 1 is a sectional view showing the structure of the disk-formed information storage medium of Example 1 of this invention. This medium was manufactured as follows.

First, on a polycarbonate substrate 1 12 cm diameter and 0.6 mm in thickness which has on the surface grooves for tracking for land-groove tracking with a track pitch of 0.6 $\mu$m and pit trains for representing address information etc. at positions shifted from the track center, was formed a protective layer 2 comprising ZnS—SiO$_2$ film in a film thickness of 120 mm. Then, thereon were formed successively a reflectivity improving layer 3 comprising Al2O3 film in a thickness of 20 nm, a lower interfacial layer 4 comprising Cr$_2$O$_3$ film in a film thickness of 1 nm, a Ge—Sb—Te recording layer 5 in an average film thickness of 9 nm, an upper interfacial layer 6 comprising Cr2O3 film in a film thickness of about 5 nm, a thermal diffusion controlling layer 7 comprising ZnS—SiO$_2$ film in a film thickness of 20 nm, an absorption compensation layer 8 comprising (Cr)$_{75}$(Cr$_2$O$_3$)$_{25}$ film in a film thickness of 38 nm, a stress-compensation layer 9 comprising Cr at an Ar gas flow rate of 170 sccm in a film thickness of 60 nm and a reflecting layer 10 comprising Al$_{99}$ Ti$_1$ film in a film thickness of 30 nm. The stacked film was formed by using a magnetron sputtering apparatus. Thus the first disk member was obtained.

Though the average film thickness of the recording film was 9 nm, the film was formed so as to increase its thickness from the inner periphery towards the outer periphery such that the film thickness at a place 5 mm inward from the outermost periphery is 2 nm thickness than the film thickness at a place 5 mm outward from the innermost periphery. In this way, a larger increase in error rate, due to the flow of recording film caused by many times of repeated rewriting, which would occur on the inner periphery side if the film thickness is the same throughout the recording film, can be prevented. Thus, when the film thickness is uniformly 9 nm, the error rate increased to $2 \times 10^{-2}$ at the inner periphery and to $5 \times 10^{-4}$ at the outer periphery after 50,000 times of rewriting, whereas when a film thickness difference was provided as described above, an error rate of the order of magnitude of $10^{-4}$ was obtained at all places. The warp of the substrate underwent substantially no change before and after film formation, showing that stress compensation was achieved successfully. On the other hand, in a disk formed in exactly the same manner as above except that the Cr film was formed at an Ar flow rate of 50 sccm, the warp of the substrate changed in such a direction that when the surface having the film formed thereon is placed upward the outer peripheral part of the substrate goes downward, showing that compression stress is working from the substrate to the film. When the Cr layer was not present at all, the change of the substrate outer peripheral part going downward was still larger.

On the other hand, in exactly the same manner as above, the second disk member having the same structure as that of the first disk member was obtained. Thereafter, protective coating was applied with ultraviolet-curable resin onto the film surface of the first disk member and the second disk member, and the respective reflecting layers of the respective disk members were stuck to each other with an adhesive layer therebetween to obtain a disk-formed information storage medium shown in FIG. 1.

Figure 2A:
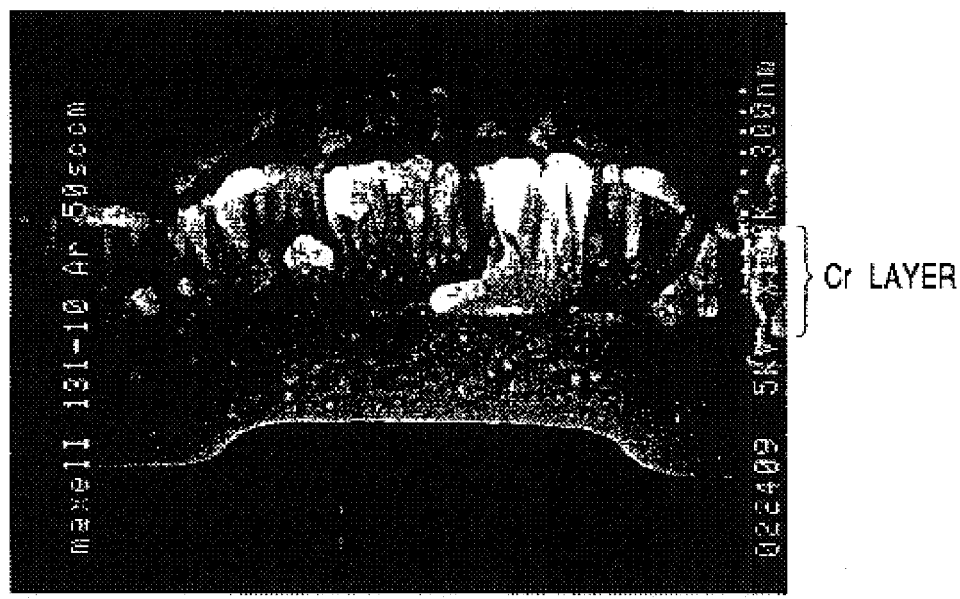
FIGS. 2A and 2B are respectively a sectional SEM photograph of the stress-compensation layer of the information storage medium of this invention.
Figure 2B:
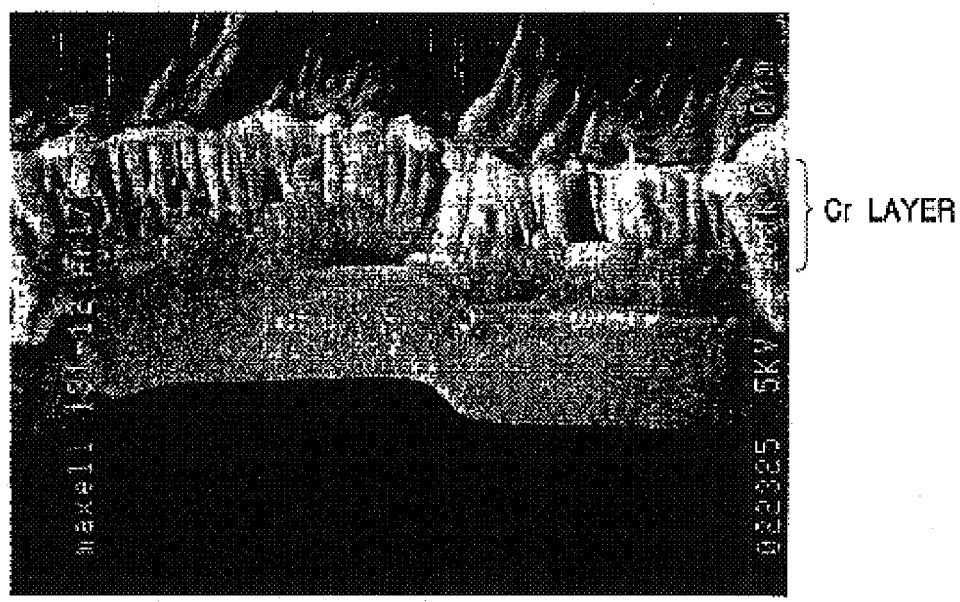

A cut was formed onto the polycarbonate substrate of the optical disk of the present Example, the substrate was folded in two, and the section was observed by SEM to find that, as shown in FIG. 2, the Cr film of the stress-compensation layer had, in 90% or more of the section, a pillar-like structure of about 15 nm thickness starting from the interface with the Cr$_{75}$(Cr$_2$O$_3$)$_{25}$ film having a granular structure situated just thereunder, from which finding it was estimated that a tensile stress had developed when, in the course of the Cr film formation, film began to deposit in the form of island, then grew in the form of pillar, and the pillars united with one another. In a film formed at an Ar gas pressure in sputtering of 50 sccm, in the observation of the section of the Cr film, in 30% or more of the section, about ¼ thereof near the interface with the $Cr_{75}(Cr_2O_3)_{25}$ film situated just thereunder was in a granular structure, from which it was estimated that for this reason the tensile stress has not developed to a necessary extent. As the Ar gas pressure is decreased, the granular structure part increased at the root of the pillar-like structure, but when the ratio Y(5) of the part which is pillar-like from the root to the film thickness X(nm) of the Cr layer satisfies the following equation, a groove bend amount of not more than 0.02 μm could be attained to make it possible to cope with the problem. When the film thickness was not more than 30 nm, a bend of not more than 0.02 μm could not be obtained, and when the proportion of the part which is pillar-like from the root was not more than 80%, a bend of not more than 0.02 μm could not be obtained. When the Cr content was not more than 70 atomic % and the content of elements having an atomic number outside the range of not less than 22 and not more than 47 was not less than 30%, a satisfactory tensile stress could hardly be obtained even when the Ar gas pressure was varied.

[Initial Crystallization]

The recording layer of the disk prepared as described above was subjected to initial crystallization in the following manner. The disk was rotated so that the linear velocity of a point on the recording track was 5 m/s, and a laser light of a semiconductor laser (wavelength: about 810 nm) having an elliptic spot shape whose major axis is in the radial direction of the medium was irradiated at a power of 800 mW to the recording layer 4 through the substrate 1. The movement of the spot was conducted by shifting, at a time, ¼ each of the spot length of the radial direction of the medium. Thus, initial crystallization was conducted. Though the initial crystallization may be conducted only once, when it was repeated twice the increase of noise due to initial crystallization could be slightly reduced.

[Recording, Erasing and Regeneration]

Recording and regeneration of information were conducted with the storage medium mentioned above by using an information recording and regeneration evaluation apparatus. The operation of this information recording and regeneration apparatus is described below. The control of the motor in the recording and regeneration was conducted by using the ZCAV (Zoned Constant Linear Velocity) system, wherein the revolution number of the disk is changed from zone to zone where recording and regeneration are conducted. The disk linear velocity is about 8.2 m/s.

Information from the outside of the recording apparatus is transmitted in a unit of 8 bits to an 8-16 modulator. In recording information on the disk, recording was conducted by using a recording system wherein 8 bits of information is converted to 16 bits, so called 8-16 modulation system. In this modulation system, information of a mark length of 3T–4T made to correspond to information of 8 bits is recorded on the medium. The "T" herein indicates the cycle of the clock in information recording, and was taken here at 17.1 ns. The digital signal of 3T–14T converted by the 8-16 modulator is transferred to a recording waveform generating waveform generating circuit; with the width of high power pulse being selected at about T/2, laser irradiation of low power level of a width of about T/2 is conducted between the laser pulses of high power level, and thus a multi-pulse recording waveform, wherein laser irradiation of intermediate power level is conducted between the above-mentioned series of high power pulse trains and the next high power pulse trains, is formed. At this time, the high power level used for forming the recording mark was selected at 112 mW, the intermediate power level capable of erasing the recording mark at 4.2 mW and the low power level lower than the intermediate power level at 2.5 mW. In the above-mentioned recording waveform generating circuit, the 3T–14T signal has been made to correspond, in time series and alternately, to [0] and [1]. In this instance, the region on the optical disk irradiated by an intermediate power level laser beam turns crystalline (space part) and the region of high power level pulse changes to amorphous (mark part). The above-mentioned recording waveform generation circuit is provided therein with a multi-pulse waveform table corresponding to a system adaptive recording waveform control) wherein, in forming a series of high power pulse trains for forming the mark part, the top end pulse width and the last end pulse width of the multi-pulse waveform are changed according to the length of space part of the front and back of the mark part, and thereby generates a multi-pulse recording waveform which enables eliminating as much as possible the influence of thermal interference between marks which develops between pulse trains. Further, the reflectivity of the medium is higher when it is in the crystalline state, and the reflectivity of the region which has been applied recording and has turned amorphous is low. The recording waveform generated by the recording waveform generating circuit is transferred to a laser drive circuit. The laser drive circuit makes the semiconductor laser in the optical head emit light on the basis of the waveform. The optical head mounted on the present recording apparatus was irradiated by a laser beam of a wavelength of 660 nm as an energy beam for information recording, to effect information recording.

This recording apparatus corresponds to a system wherein information is recorded both in the groove and in the land (region between grooves) (so-called land-groove (L/G) recording system). In this recording apparatus, tracking into the land or into the groove can be selected as desired by an L/G servo circuit.

Regeneration of recorded information was also conducted by using the above-mentioned optical head. A laser beam is irradiated onto the recorded mark and reflected light from the mark and from a part other than the mark are detected, to obtain regeneration signals. The amplitude of the regeneration signal is increased by a preamplifying circuit, and the signal is converted, in an 8-16 demodulator, into information of 8 bits per every 16 bits. The regeneration of the recorded mark is completed through the above-mentioned operations.

When mark edge recording is conducted under the above-mentioned conditions, the mark length of 3T mark, the shortest mark, is about 0.42 μm and the mark length of 14T mark, the longest mark, is about 1.96 μm. The recording signal contains dummy data of repetition of the 4T mark and the 4T space at the beginning end part and the last end part of the information signal. The beginning end part contains also VFO.

In such a recording method, when new information is recorded by overwriting, without conducting erasing, in a part in which information has been already recorded, the part is rewritten into new information. That is, overwriting with a single, approximately circular light spot can be achieved. However, another method may also be used wherein in initial one revolution or plural revolutions of the disk at the time of rewriting, continuous light of a power of the same level as or near the intermediate power level of the above-mentioned power-modulated recording laser light is irradiated to erase previously recorded information once, and thereafter, in the next one revolution, a laser light, power-modulated according to information signals between the low power level (1.5 mW) and the high power level or between the intermediate power level and the high power level, is irradiated to effect recording. When recording is thus conducted after information has been erased, incomplete erasing of previously written information is little. Accordingly, rewriting can be easily conducted even when the linear velocity is increased to two times or more. These method are effective not only for recording layers used in the medium of this invention but also for recording layers of other media.

Though no problem arose in the above-mentioned disk, in a disk formed in exactly the same manner as described above except that the Cr film was formed at an Ar flow rate of 50 sccm, the positional relation in the disk radium direction between the pit which represents address information of pre-formatted part and the recording mark recorded in the user data part is not in a correct relation, namely, a relation wherein they are shifted ½ track pitch from each other; instead, in the range of about ¾ of the central part of each sector, they shift, at the part near the inner periphery of the radial direction zone, toward the outer periphery and, in the part near the outer periphery, toward the inner periphery. FIG. 3 shows the results of determination of the dimension of the shift. Therefore, when tracking is corrected at the position of the pit of preformatted part, it is recorded, in the central part of the sector, shifted from the track center determined by the grooves, and resultantly cross-erasing, a phenomenon wherein a part of the recording mark of the adjacent track is erased, occurs. Further, when one zone (about 1600 tracks) was overwritten repeatedly 1000 times, a phenomenon wherein the track bends toward the outer periphery in a region which is near the center of the zone and near the center of the section occurred, which likewise caused cross-erasing.

[Composition of Stress-Compensation Layer]

Materials which can be used for the stress-compensation layer are preferably those which readily develop tensile stress. It is known that, in the case of metal elements, the flow rate or pressure of Ar gas at which the stress changes from tensile to compressive one at the time of film formation by sputtering is determined almost by the atomic number. Since a practically usable Ar gas flow rate and pressure are limited as to their ranges, materials which can produce tensile stress are naturally determined. They are elements having a usual proton/neutron ratio and having an atomic number in the range of 22–47. Preferred materials are those which contain 70 atomic % or more of, among the above-mentioned elements, at least one element selected from the group consisting of Cr, Ti, V, Mn, Fe, Co, Ni, Cu, Zn, Zr, Nb and Mo. Further, with elements having an atomic number in the range from 22 to 28, a suitable tensile stress is obtained in a wide range of Ar gas flow rate and other conditions.

[Reflectivity Improving Layer]

When the film thickness of the reflectivity improving layer is not less than 25 nm and not more than 40 nm, the optimum reflectivity and may times of rewriting of $10^5$ times or more could be achieved. As a material for replacing $Al_2O_3$, $SiO_2$ or mixed materials of $Al_2O_3$ and $SiO_2$ may be used.

[Interfacial Layer]

As to a material which can be used in place of $Cr_2O_3$ of the upper interfacial layer and the lower interfacial layer, $Al_2O_3$ or mixtures of $Al_2O_3$ and $SiO_2$ or mixtures of $Al_2O_3$ and $Cr_2O_3$ are preferably used. When 70 mol % or more of $SiO_2$ or $Al_2O_3$ is contained, the crystallization velocity increases and an erase ratio of 25 dB or more can be attained even at 18 m/s, a velocity of about twice as compared with a case where an interfacial layer is absent.

Further, nitrides, such as Al—N, B—N, Cr—N, $Cr_2$—N, Ge—N, Hf—N, Si—N, Al—Si—N type materials (e.g., $AlSiN_2$), Si—N type materials, Si—O—N type materials, Ta—N, Ti—N and Zr—N are more preferable because adhesive force increases and the deterioration of information storage media caused by external impact is small. Recording film compositions containing nitrogen or materials near in composition thereto also improve adhesive force. As to the groove deformation which occurs when a large number, not less than 100, of tracks, for example one entire zone, are overwritten many times, since it is considered that temperature increase due to laser light irradiation of recording power level causes the expansion of the substrate surface and resultant widening of intermolecular distance, it is effective, to prevent heat from going toward the substrate side, to provide between the recording film and the substrate a layer having a thickness of not less than 10 nm, preferably not less than 25 nm and not more than 40 nm, of a material as $Al_2O_3$, Si—N and GeN which has a high transmittance for reading light and has a higher thermal conductivity than ZnS type materials used for a recording film and light incident side protective layer. This layer may also double as the reflectivity improving layer. A higher effect can be obtained when the layer is provided between the recording film and the lower protective layer.

[Other Layer Comprising Metal as Main Component (Reflecting Layer)]

The metal layer (reflecting layer) having a high thermal conductivity of the side opposite to light incidence with respect to recording film is preferably of a high thermal conductivity material which, in the case of Al or Al alloy, contains not more than 4 atomic % of additive elements such as Cr and Ti and, in the case of Ag alloy, contains not more than 8% of additive elements such a Pd and Cu, because of its good effect in preventing temperature increase of the substrate surface. Materials which comprise as the main component Al alloys, such as Al—Cr, Al—Ag and Al—Cu, are preferable as the material of reflecting layer usable in place of Al—Ti employed in the reflecting layer of this Example because they make it possible to reduce jitter at the time of rewriting. When the content of other elements than Al in the Al alloy is selected in the range of not less than 2 atomic % and not more than 30 atomic %, characteristic performance in many times of rewriting is improved. Al alloys other than those described above shown similar characteristics.

Next, layers may also be used which comprise a simple element of Au, Ag, Cu, Ni, Fe, Co, Cr, Ti, Pd, Pt, W, Ta, Mo, Sb, Bi, Dy, Cd, Mn, Mg and V, or alloys comprising these elements as the main component or alloys of these elements with each other, such as Au alloys, Ag alloys, Cu alloys, Pd alloys, Pt alloys, Sb—Bi, SUS and Ni—Cr. Thus, the reflecting layer comprises a metal element, semimetal element, or the alloy or the mixture thereof. Among them, those which have a high thermal conductivity, e.g., Cu, Ag or Au simple substance, or Cu alloys, Ag alloys and Au alloys, are advantageous in that the recrystallized region formed in the neighborhood of the recording mark is narrowed to enlarge regeneration signals and to suppress cross-erasing. Simple substance of Ag or alloys of Ag have a high reflectivity and hence give a high degree of modulation and a good regeneration characteristic. In this case, when the content of other elements than the main component is selected in the range of not less than 2 atomic % and not more than 30 atomic %, the rewrite characteristic is improved further. Though the reflecting layer in this Example is a single layer, the effects of this invention do not change even when the reflecting layer comprises stacked two or more layers. Specifically, a preferred combination is Al—Ti and Al—Cr, Al—Ag and Ag, or Al—Cu and Al, but Al may also be used. Thus, it has been found that when the content of elements other than Al in Al alloy is in the range of not less than 0.5 atomic % and not more than 4 atomic %, the performance characteristic in many times of rewriting and the bit error rate are improved, and more improved when the content is in the range of not less than 1 atomic % and not more than 2 atomic %.

[Absorption Compensation Layer]

As a material which can replace the Cr—($Cr_2O_3$) film used in the absorption compensation layer in this Example, there can be used Ge—Cr, Ge incorporated with a metal element and, next, Si incorporated with a metal element. The incorporated amount is preferably not less than 5 atomic % and not more than 45 atomic %. Specific examples of such a material include $Ge_{95}Cr_5$, $Ge_{90}Gr_{10}$, $Ge_{80}Cr_{20}$, $Ge_{55}Cr_{45}$, Ge—Ti, Si—Ti, Si—Cr, and the nitrides thereof. As a material for replacing $Cr_2O_3$ in the above-mentioned layer, there may be used oxides, such as $SiO$, $Al_2O_3$, $BeO$, $Bi_2O_3$, $CoO$, $CaO$, $Cr_2O_3$, $CeO_2$, $Cu_2O$, $CuO$, $CdO$, $Dy_2O_3$, $FeO$, $Fe_2O_3$, $Fe_3O_4$, $GeO$, $GeO_2$, $HfO_2$, $In_2O_3$, $La_2O_3$, $MgO$, $MnO$, $MoO_2$, $MoO_3$, $NbO$, $NbO_2$, $NiO$, $PbO$, $PdO$, $SnO$, $SnO_2$, $Sc_2O_3$, $SrO$, $ThO_2$, $TiO_2$, $Ti_2O_3$, $TiO$, $Ta_2O_5$, $TeO_2$, $VOA$, $V_2O_3$, $VO_2$, $WO_2$, $WO_3$, $Y_2O_3$ and $ZrO_2$; nitrides, such as Al—N, B—N, Cr—N, $Cr_2N$, Ge—N, Hf—N, $Si_3N_4$, Al—Si—N type materials (e.g., $AlSiN_2$), Si—N type materials, SiO—N type materials, Ta—N, Ti—N and Zr—N; sulfides, such as $ZnS$, $Sb_2S_3$, $CdS$, $In_2S_3$, $Ga_2S_3$, $GeS$, $SnS_2$, $PbS$, $Bi_2S_3$, $SrS$, $MgS$, $CrS$, $CeS$ and $TaS_4$; selenides, such as $SnSe_2$, $Sb_2Se_3$, $CdSe$, $ZnSe$, $In_2Se_3$, $Ga_2Se_3$, $GeSe$, $GeSe_2$, $SnSe$, $PbSe$ and $Bi_2Se_3$; fluorides, such as $CeF_3$, $MgF_2$, $CaF_{21}$ $TiF_3$, $NiF_3$, $FeF_2$ and $FeF_3$; borides, such as Si, Ge and $TiB_2$, and $B_4C$, B, CrB, $HfB_2$, $TiB_2$ and WB; carbides, such as C, $Cr_3C_2$, $Cr_{23}C_6$, $Cr_7C_3$, $Fe_3C$, $Mo_2C$, WC, $W_2C$, HfC, TaC and $CaC_2$; materials near in composition to the above-mentioned materials; and the mixed materials thereof. Additionally, In—Sb, Ga—As, In—P, Ga—Sb, In—As and the like may also be used.

Among them, when oxides as $SiO_2$, $Ta2O5$, $Y_2O_3$ $ZrO_2$ etc. are used, since less expensive targets can be used than in using other materials, the entire manufacturing cast can be reduced. Particularly preferable among oxides are SiO2, $Ta_2O_5$ and $Y_2O_3$—$ZrO_2$ in that they have a low reactivity and can increase the number of rewritable times further. BeO and $Cr_2O_3$ are preferred in point of their high melting point. $Al_2O_3$ has a high thermal conductivity and hence when it is worked up into a disk having no, or of a thin structure, reflecting layer, the deterioration of rewriting characteristic is less than when other materials are used. The use of the oxides or nitrides of Ge for the absorption compensation layer is preferable in that since Ge permits a high sputtering rate, the tact time in mass production can be shortened.

When nitrides are used, the adhesive force to the layers contacting to the absorption compensation layer increases and the resistance to external impact increases. When sulfides or selenides are used, the sputtering rate can be increased and the film formation time can be shortened. When carbides are used, the hardness of the absorption compensation layer increases, which also acts to suppress the flow of recording film in many times of rewriting.

[Substrate]

In the present Example, a polycarbonate substrate 1 provided on the surface directly with grooves for tracking is used. The "substrate provided with grooves for tracking" refers to a substrate which has, on the whole or a part of its surface, grooves of a depth of not less than $\lambda/10n'$ (n': refractive index of the substrate material), $\lambda$ representing the write & read wavelength. The groove may be formed either continuously through one round or divided midway in the round. A groove depth of about $\lambda/6n$ is preferable because crosstalk is small. Both a substrate having format wherein write & read can be conducted both in the groove part and in the land part and a substrate having format wherein writing can be conducted only in one of the two parts may be used. When ultraviolet-curable resin is coated in a thickness of about 10 $\mu m$ on the respective reflecting layers of the first and the second disk member described above before the members are stuck together, then the resin is cured, and thereafter the disk members are stuck to each other, the error rate can be further decreased. Though, in the present Example, two disk members are prepared and the reflecting layers 8 of the first and the second disk member are stuck to each other with an adhesive layer therebetween, it is also allowable to coat ultraviolet-curable resin on the second reflecting layer 8 of the above-mentioned first disk member in a thickness not less than 10 $\mu m$ without conducting the above-mentioned sticking together. In the case of a disk member of a structure having no reflecting layer 8, the ultraviolet-curable resin may be coated on the uppermost stacked layer.

Even when the stacking order of the absorption compensation layer and the stress-compensation layer is reversed, though tensile stress decreases slightly, balance of stress could be achieved by regulating the thickness of the stress-compensation layer.

EXAMPLE 2

In a storage medium obtained by using the same film structure as in Example 1 but reversing the order of stacking to the substrate and, after film formation, adhering a polycarbonate sheet 0.1 mm in thickness onto the upper part, a good characteristic performance could be obtained when light was made to enter from the side of the above-mentioned sheet.

EXAMPLE 3

First, on a polycarbonate substrate 12 cm in diameter and 0.6 mm in thickness which has on the surface grooves for tracking for land-groove tracking with a track pitch of 0.6 $\mu m$ and grooves for tracking having pit trains representing address information etc. at positions shifted from the track center, was formed a protective layer comprising ZnS—$SiO_2$ film in a thickness of 10 nm. Then, thereon were formed successively a lower interfacial layer comprising $Cr_2O_3$ film in a film thickness of 20 nm, a $Ge_2Sb_2Te_4$ recording layer in a film thickness of 16 nm, an upper protective layer comprising nitrided ZnS—$SiO_2$ film in a film thickness of 18 nm, stress-compensation layer comprising Cr film in a film thickness of 55 nm and a reflecting layer comprising Al—Ti1 film in a film thickness of 35 nm. The stacked film was formed by using a magnetron sputtering apparatus. Thus, the first disk member was obtained. On the other hand, in exactly the same manner as above, the second disk member having the same structure as the first disk member was obtained. Thereafter, the respective reflecting layers of the first disk member and the second disk member were stuck to each other with an adhesive layer therebetween, to obtain a disk-formed information storage medium. The method of initialization and the method of recording, regenerating and erasing are respectively the same as in Example 1. In the present Example also, track deformation could be controlled by the stress-compensation layer to a small value free from troubles in practice.

EXAMPLE 4

[Structure, Method of Manufacture]

Figure 15:
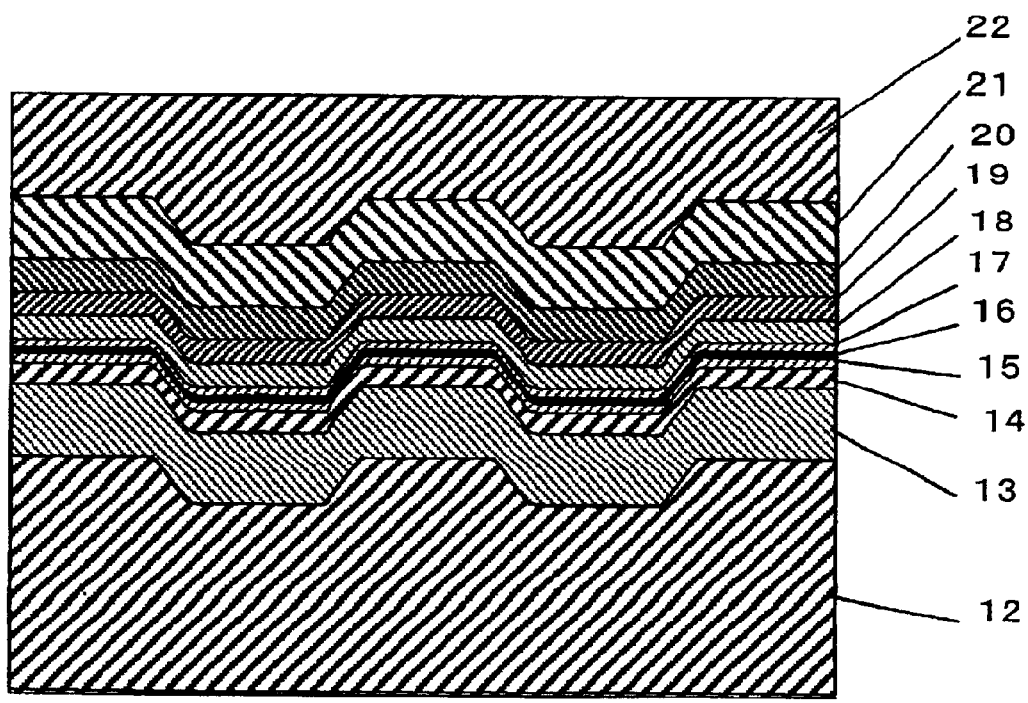
FIG. 15 shows a sectional view showing the structure of the disk-formed information storage medium of an example of this invention.

FIG. 15 is a sectional view showing the structure of the disk-formed information storage medium of an example of this invention. This medium was manufactured in the following manner.

First, on a polycarbonate substrate 12 12 cm in diameter and 0.6 mm in thickness which has on the surface grooves for tracking for land-groove recording with a track pitch of 0.6 μm and pit trains for representing address information, etc. at positions shifted from the track center, that is, approximately on the extension line of the boundary of the land and the groove, a lower protective layer 13 comprising $ZnS$—$SiO_{21}$ film was formed in a film thickness of 110 nm. Then, thereon were successively formed a reflectivity improving layer 14 comprising $Al_2O_3$ film in a thickness of 25 nm, a lower interfacial layer 15 comprising $Cr_2O_3$ film in a film thickness of 1 nm, a $Ge_7Sb_4Te_{13}$ recording film 16 in an average film thickness of 9 nm, an upper interfacial layer 17 comprising $Cr_2O_3$ film in a film thickness of about 5 nm, an upper protective (thermal diffusion controlling) layer 18 comprising $ZnS$—$SiO_2$ film in a film thickness of 20 nm, an absorption compensation layer 19 comprising $(Cr)_{75}(Cr_2O_3)_{25}$ film in a film thickness of 38 nm, a reflecting layer 20 comprising Al99Ti1 film in a film thickness of 30 nm, and a stress-compensation layer 21 comprising Ti at an Ar gas flow rate of 170 sccm in a film thickness of 120 nm. The compositions are all in atomic %. The films were formed with a magnetron sputtering apparatus. Thus, the first disk member was obtained. Additionally, there were prepared a disk of 8-layer structure wherein the $Al_{99}Ti_1$ layer, which increases thermal diffusion and directs it toward longitudinal direction, of the above-mentioned 9-layer structure had been eliminated, a disk of 8-layer structure wherein the $Al_2O_3$ layer, which is the reflectivity improving layer between the lower protective layer and the lower interfacial layer, of the above-mentioned 9-layer structure had been eliminated, a disk of 8-layer structure wherein the lower interfacial layer, which has the role of promoting crystallization and preventing the diffusion of impurities into the recording film, of the above-mentioned 9-layer structure had been eliminated, a disk of 8-layer structure wherein the upper interfacial layer, which has the role of promoting crystallization and preventing the diffusion of impurities into the recording film, of the above-mentioned 9-layer structure had been eliminated, and a disk of 8-layer structure wherein the upper protective layer, which has the role of improving the recording sensitivity and directing heat diffusion toward the longitudinal direction, of the above-mentioned 9-layer structure had been eliminated. The decrease of optical film thickness caused by elimination of these layers other than the reflecting layer was compensated by increasing the film thickness of other layers.

Though the recording film had an average film thickness of 9 nm, the film was formed so as to increase its thickness from the inner periphery toward the outer periphery such that the film thickness at a place 5 mm inside from the outermost periphery might be 2 nm larger than that at a place 5 mm outside from the innermost periphery. In this way, a larger increase in error rate, due to the flow of recording film caused by many times of repeated rewriting, which would occur on the inner periphery side if the recording film thickness was the same throughout the film, could be prevented. Thus, when the film thickness was uniformly 9 nm, the error rate increased to $2\times10^{-2}$ at the inner periphery and to $5\times10^{-4}$ at the outer periphery after 50,000 times of rewriting, whereas when a film thickness difference was provided as described above, an error rate of the order of magnitude of $10^{-1}$ was obtained at all places. The warp of the substrate underwent substantially no change before and after film formation of the above-mentioned 9-layer stacked film, showing that stress compensation was achieved successfully. On the other hand, in a disk formed in exactly the same manner as above except that the Ti film was formed at an Ar flow rate of 50 sccm, the warp of the substrate changed in such a direction that when the surface having the film formed thereon was placed upward, the outer peripheral part of the substrate went down-ward, showing that compression stress was working from the substrate to the film. When the Ti layer was not present at all, the change of the substrate outer peripheral part going downward was still larger.

On the other hand, in exactly the same manner as above, the second disk member having the same structure as that of the first disk member was obtained. Thereafter, protective coating was applied with ultraviolet-curable resin onto the film surface of the first disk member and the second disk member, and the respective stress compensating layers of the respective disk members were stuck to each other with an adhesive layer therebetween to obtain a disk-formed information storage medium shown in FIG. 15.

[Initial Crystallization Method]

The recording layer of the disk prepared as described above was subjected to initial crystallization in the following manner. The disk was rotated so that the linear velocity of a point on the recording track was 5 m/s, and a laser light of a semiconductor laser (wavelength: about 810 nm) having an elliptic spot shape whose major axis is in the radial direction of the medium was irradiated at a power of 800 mW to the recording layer 4 through the substrate 1. The movement of the spot was conducted by shifting at a time ¼ each of the spot length of the radial direction of the medium. Thus, initial crystallization was conducted. Though the initial crystallization may be conducted only once, when it was repeated twice the increase of noise due to initial crystallization could be slightly reduced.

[Recording Erasing and Regenerating Method]

Recording and regeneration of information were conducted with the storage medium mentioned above by using an information recording and regeneration evaluating apparatus. The operation of this information recording and regeneration evaluating apparatus is described below. The control of the motor in the recording and regeneration is conducted by using the ZCAV (Zoned Constant Linear Velocity) system, wherein the revolution number of the disk is changed from zone to zone wherein recording and regeneration are conducted. The disk linear velocity is about 8.2 m/s.)

Information from the outside of the recording apparatus is transmitted in a unit of 8 bits to an 8-16 modulator. In recording information on the disk, recording was conducted by using a recording system wherein 8 bits of information is converted to 16 bits, so-called 8-16 modulation system. In this modulation system, information of a mark length of 3T–14T made to correspond to information of 8 bits is recorded in the medium. The "T" herein indicates the cycle of the clock in information recording, and was taken here at 17.1 ns. The digital signal of 3T–14T converted by the 8-16 modulator is transferred to a recording waveform generating circuit; with the width of high power laser pulse being selected at about T/2, laser irradiation of low power level of a width of about T/2 is conducted during irradiation of high power level laser, and thus a multi-pulse recording waveform, wherein laser irradiation of intermediate power level is conducted during the above-mentioned series of high power pulses, is formed. At this time, the high power level used for forming the recording mark was selected at 11 mW, the intermediate power level capable of erasing the recording mask at 4.23 mW and the low power level lower than the intermediate level at 2.5 mW. In the above-mentioned recording waveform generating circuit, the 3T–14T signal has been made to correspond, in time series and alternately, to [0] and [1] such that, in the case of [0], laser power of intermediate power level is irradiated and, in the case of [1], a series of high power pulse trains including high power level pulses are irradiated. In this instance, the region on the disk irradiated by an intermediate power level laser beam turns crystalline (space part) and the region of high power level changes to amorphous mark part). The above-mentioned recording waveform generating circuit is provided therein with a multi-pulse waveform table corresponding to a system (adaptive recording waveform control) wherein, in forming a series of high power pulse trains containing high power level for forming the mark part, the top end pulse width and the last end pulse width of the multi-pulse waveform are changed according to the length of space part of the front and the back of the mark part, and thereby the circuit generates a multi-pulse recording waveform which enables eliminating as much as possible the influence of thermal interference between marks which develops between marks. Further, the reflectivity of the medium is higher when it is crystalline state, and the reflectivity of the region which has been applied recording and has turned amorphous is lower. The recording waveform generated by the recording waveform generating circuit is transferred to a laser drive circuit. The laser drive circuit makes the semiconductor laser in the optical head emit light on the basis of the waveform. The optical head mounted on the present recording apparatus was irradiated by a laser beam of a wavelength of 660 nm as an energy beam for information recording, to effect information recording.

This recording apparatus corresponds to a system wherein information is recorded both in the groove and in the land (recorded both in the groove and in the land (region between grooves) (so-called land-groove (L/G) recording system). In this recording apparatus, tracking into the land or into the groove can be selected as desired by an L/G servo circuit.

Regeneration of recorded information was also conducted by using the above-mentioned optical head. A laser beam is irradiated onto the recorded mark, and reflected light from the mark and from a part other than the mark are detected, to obtain regeneration signals. The amplitude of the regeneration signal is increased by a preamplifying circuit, and the signal is converted, in an 8-16 demodulator, into information of 8 bits per every 16 bits. The regeneration of the recorded mark is completed through the above-mentioned operations.

When mark edge recording is conducted under the above-mentioned conditions, the mark length of 3T mark, the shortest mark, is about 0.41 µm and the mark length of 14T mark, the longest mark, is about 1.96 µm. The recording signal contains dummy data of repetition of the 4T mark and the 4T space at the beginning end part and the last end part of the information signal. The beginning end part contains also VFO.

In such a recording method, when new information is recorded by overwriting, without conducting erasing, in a part in which information has been already recorded, the part is rewritten into new information. Thus, overwriting with a single, approximately circular light spot can be achieved.

Though no problem arose in the above-mentioned disk, in a disk formed in exactly the same manner as described above except that the Ti film was formed at an Ar flow rate of 50 sccm, the positional relation in the disk radius direction between the pit which represents the address information of pre-formatted part and the recorded mark recorded in the user data part is not in a correct relation, namely a relation wherein they are shifted by ½ track pitch from each other; instead, in the range of about ¾ of the central part of each sector, they shift, in the part near the inner periphery of the radial direction zone, toward the outer periphery and, in the part near the outer periphery, toward the inner periphery. FIG. 3 shows the results of determination of the dimension of the shift. Therefore, when tracking is corrected at the position of the pit of pre-formatted part, is recorded, in the central part of the sector, shifted from the track center determined by the groove, and resultantly cross-erasing, a phenomenon wherein a part of the recording mark of the adjacent track is erased, occurs. Further, when one zone (about 1600 tracks) was overwritten repeatedly 1000 times, a phenomenon wherein the tracks bend toward the outer periphery which is near the center of the zone and near the center of the section, occurred, which likewise caused cross-erasing.

[Composition of Stress-Compensation Layer]

Materials which can be used for the stress compensation layer are those which readily develop tensile stress. It is known that, in the case of metal elements, the flow rate or pressure of Ar gas at which the stress changes from tensile to compressive one at the time of film formation by sputtering is determined almost by the atomic number. Sine a practically usable Ar gas flow rate and pressure are limited as to their ranges, materials which can produce tensile stress are naturally determined. They are elements having a usual proton/neutron ratio and having an atomic number in the range of 22 to 47, especially, transition metal elements. This means that a part or all of Ti can be replaced by these elements. Preferred materials were those which contain 60 atomic % or more of, among the above-mentioned elements, at least one element selected from the group consisting of Cr, Ti, V, Mn, Fe, Co, Ni, Cu, Zn, Zr, Nb and Mo. Materials which contain more than 70 atomic % of these materials were more preferable. When alloy or composite or compound material of Ti with other elements whose atomic number is out of the range from 22 to 47, for example, Al or Si was used, materials whose compositions contain more than 60 atomic % of Ti had stress compensation effect. Elements whose atomic number is between 22 and 28 has similar dependence of stress compensation effect on composition. When the main component of the stress compensation layer was Cr or elements whose atomic number is between 29 to 47, excluding Zn, Ga, As, Se, Br, Kr, Rb, Sr and Tc(because melting point or vaporizing points are too low or too easily oxidized or too expensive to use as an main component), they should be contained in the layer more than 70 atomic % to obtain stress compensation effect. Chromium is exceptionally required more than 70% because it easily make several kinds of compounds and changes film structure. More preferable range was more than 80 atomic %. If such a structural change is avoided by film making process, the range between 60% and 70% can also be used. When the above-mentioned layer containing 60 atomic % or more of at least one metal element having an atomic number of not less than 22 and not more than 47 is a layer of Ti—Cr or V—Cr alloy which contains not less than 30 atomic % and not more than 85 atomic % of Cr, and not less than 15 atomic % and not more than 70 atomic % of Ti or V, a suitable tensile stress was obtained in a wide range of Ar gas flow rate, and cracking of the film never occurred. Ni—Cr and Co—Cr and Fe—Cr compound of wide composition range had also good characteristics.

Further, with materials which contains elements having an atomic number in the range from 22 to 28 more than 60 atomic %, a suitable tensile stress was obtained in a wide range of Ar gas flow rate and other conditions.

In the case (for example, absorption compensation layer was eliminated) where both stress compensation effect and absorption compensation effect were expected for the stress compensation layer, the layer composition shown later in this embodiment as preferable composition for the absorption compensation layer was preferable. Of course, among them, those which contain 60 atomic % or more of at least one element selected from elements having an atomic number in the range from 22 to 47 were more preferable to obtain enough stress compensation effect. Those with elements having an atomic number in the range from 22 to 28 were most preferable.

[Structure and Optimum Film Thickness of Stress-Compensation Layer]

Figure 18A:
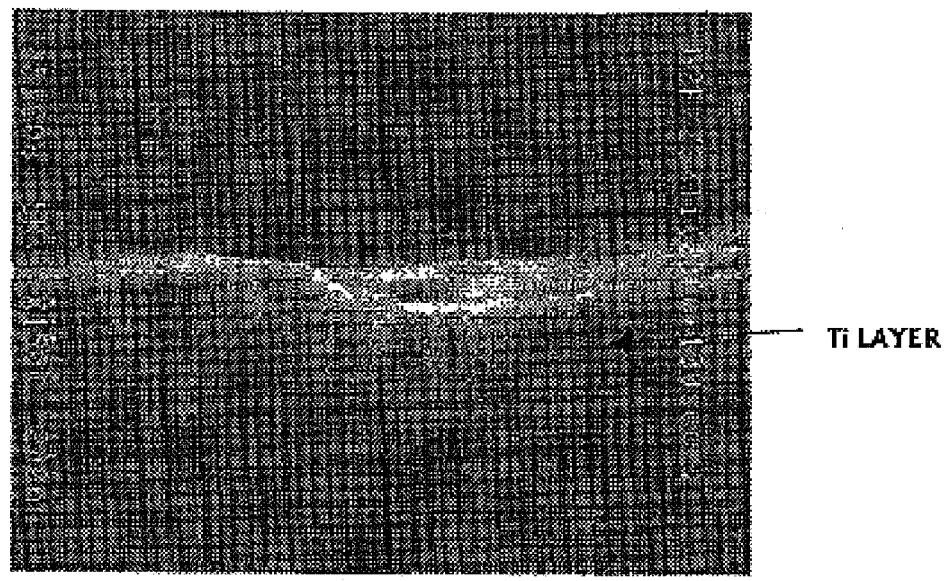
FIG. 18 shows a substrate which was folded in two, and the section was observed by SEM.
Figure 18B:
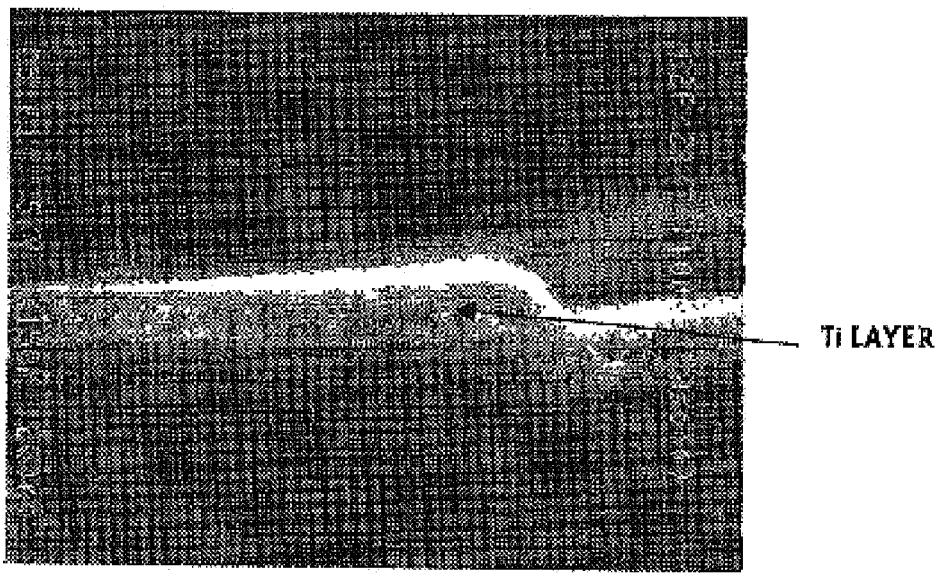

A cut was formed onto the polycarbonate substrate of the optical disk of the present Example, then the substrate was folded in two, and the section was observed by SEM to find that, as shown in FIG. 18, the Ti film of the stress-compensation layer had, in 90% or more of the section, a pillar-like structure of about 15 nm thickness starting from the interface with the $Al_{99}Ti_1$ film having a granular structure situated just thereunder, from which finding it was estimated that tensile stress had developed when, in the course of the Ti film formation, film began to deposit in the form of island, then grew in the form of pillar, and the pillars united with one another. In a film formed at an Ar gas pressure in sputtering of 50 sccm, in the observation of the section of the Ti film, in 30% or more of the section, about ¼ thereof near the interface with the $Al_{99}Ti_1$ film situated just thereunder was in a granular structure, from which it was estimated that for this reason tensile stress had not developed to a necessary extent. As the Ar gas pressure is decreased, the granular structure part increased at the root of the pillar structure, but when the ratio Y (%) of the part which is pillar-like from the root to the film thickness X(nm) of the Ti layer satisfies the following equation, $$XY/100 \geq 50 \text{ nm} \quad (1)$$

a groove bend amount of not more than 0.02 μm could be attained to make it possible to cope with the problem. When the film thickness was less than 50 nm, a bend of not more than 0.02 μm could not be obtained, and when the proportion of the part which was pillar-like from the root was not more than 80%, a bend of not more than 0.02 μm could not be obtained. When at least one of elements having an atomic number outside the range of not less than 22 and not more than 47, less than 40 atomic %, was added to Ti, a satisfactory tensile stress could hardly be obtained even when the Ar gas pressure was varied. When the film thickness exceeds 150 nm, there arises a problem of the film developing cracks in high temperature high humidity life tests and a problem of increase of necessary sputtering time.

Eventually, an information storage medium which has a film containing 70 atomic % or more of at least one element selected from the group consisting of Cr, Ti, V, Mn, Fe, Co, Ni, Cu, Zn, Zr, Nb and Mo, said film having a thickness of 30 nm or more and having a pillar-like structure continuing from the lower face to the upper face of the film in at least 80% of the section of the film was more preferable.

When Cr is compared with Ti, Cr develops stress more readily even with a small film thickness but has a problem of being apt to develop cracks and a problem of being apt to decrease stress compensation effect by making compound with at least one of elements whose atomic number is out of the range from 22 to 28. Therefore, the use of alloys of Ti with Cr is most preferable because then stress compensation can be achieved with a small film thickness and cracking can be avoided. Experiments conducted by varying the mixing ratio of Ti and Cr revealed that when the Ti content was not less than 15 atomic % and not more than 70 atomic % and the Cr content was not less than 30 atomic % and not more than 85 atomic %, stress compensation could be achieved when the film thickness of the stress-compensation layer was selected at 80 nm or less, a thickness free from problems with respect of tact time and flatness of film.

The stress compensation layer of Ti also effective to overcome another problem caused by the stress which acts between the stacked film and the substrate. The problem is that when many tracks are subjected to many times of rewriting by overwriting, the substrate surface is apt to expand and deform owing to heat evolved at the time of recording and the relaxation of the expansion takes long time and resultantly, the surface expansion is accumulated to become soft. Thus, owing to the stress exerted by the stacked film on the substrate, the grooves for tracking bend towards the direction of applied force by the stress. The bend is the larger as the position of the groove is the nearer to the center of the many-times recording region. So, this medium can be an information storage medium which can retain good and highly reliable write & read characteristics even when subjected to overwriting in a high recording density.

[Composition and Film Thickness of Recording Film]

Similar characteristic performances are obtained when, in place of the recording film of this invention, a recording film of a mixed composition of GeTe and $Sb_2Te_3$, such as $Ge_2Sb_2Te_5$, $Ge_7Sb_4Te_{13}$ and $Ge_4Sb_2Te_7$, $Ge_5Sb_2Te_8$ or a composition near thereto, such as $Ge_{20}Sb_{24}Te_{56}$, a recording film of the above mixed composition further incorporated with additive elements, such as $Sn_{1.3}Ge_{2.7}Sb_2Te_7$, and a recording film of a eutectic composition, such as $Ge_{10}Sb_{70}Te_{20}$ and $Ag_4In_8Sb_{70}Te_{18}$ or a composition near thereto are used. When the content of any of the constituent elements of recording film deviates 5% or more from the above-mentioned compositions, problems arose in that the crystallization velocity was too high and caused recrystallization during the cooling after melting of recording film at the time of recording, to cause distortion of the recording mark shape, or the crystallization velocity was too low and caused incomplete erasing.

The film thickness of recording film is preferably not less than 5 nm and not more than 20 nm, then a regeneration signal jitter of not more than 11% being obtained, and particularly preferably not less than 6 nm and not more than 9 nm, then a regeneration signal jitter of not more than 8% being obtained. When the film thickness is too small, crystal nucleation at the time of erasing is insufficient and the regeneration signal intensity also decreases, and resultantly the regeneration signal jitter increases beyond the allowable range. When the thickness is too large the jitter exceeds 12% in less than 1000 times of overwriting owing to recording film flow caused by many times of rewriting.

[Composition and Film Thickness of Reflectivity Improving Layer]

When the film thickness of the reflectivity improving layer is not less than 25 nm and not more than 40 nm, the optimum reflectivity and $10^5$ times or more of repeated rewriting could be attained. In place of $Al_2O_3$, $SiO_2$, mixed materials of $Al_2O_3$ and $SiO_2$ and mixed materials of $Al_2O_3$ and $Cr_2O_3$ and mixed materials of $SiO_2$ and $Cr_2O_3$ could be used as the material of the film.

[Thickness of Reflectivity Improving Layer]

When the film thickness of the reflectivity improving layer is not less than 25 nm and not more than 40 nm, the optimum reflectivity and $10^5$ times or more of repeated rewriting could be attained. In place of $Al_2O_3$, $SiO_2$, mixed materials of $Al_2O_3$ and $SiO_2$ and mixed materials of $Al_2O_3$ and $Cr_2O_3$ could be used as the material of the film.

[Elimination of Reflectivity Improving Layer]

When the reflectivity improving layer comprising $Al_2O_3$ of this Example was eliminated, the reflectivity of the resulting recording film decreased even when the thickness of the ZnS·$SiO_2$ layer was increased that much, but the disk was usable in practice when a low noise substrate was used so as to keep a necessary S/N ratio. Also in a disk of 7-layer structure obtained by eliminating another layer, the regeneration signal jitter increased about 1% and the recording sensitivity decreased owing to the loss of the effect of the eliminated layer, but the disk was usable in practice so long as its use was properly selected.

[Composition and Thickness of Interfacial Layer]

$Cr_2O_3$ in the upper interfacial layer and the lower interfacial layer is effective in preventing the diffusion of ZnS into recording film and in improving the crystallization velocity. It is further advantageous in that the film can be formed in an atmosphere of Ar alone and it has an excellent adhesiveness to other layers. When, in place of $Cr_2O_3$ or as a double layer with the $Cr_2O_3$ layer, nitrides, e.g., Ge—Cr—N type materials of a composition as $Ge_{50}Cr_{10}N_{40}$, Ti—N type materials as $Ti_{60}N_{40}$, Ta—N type materials as $Ta_{55}N_{45}$ and Sn—N type materials as $Sn_{70}N_{30}$ are used, though the crystallization velocity improving effect is high, the number of rewritable times decreases 10–20%.

The interfacial layer, in a film thickness of not less than 1 nm, is effective in preventing the appearance of adverse influence of the diffusion of ZnS into the recording film until $10^5$ times of overwriting. To obtain a sufficient crystallization velocity improving effect, a film thickness of not less than 3 nm is desirable. However, in the case of the light incident side interfacial layer, a film thickness exceeding 2 nm tends to cause a problem of reducing the reflectivity owing to the light absorption of the layer. In the case of the interfacial layer of the side opposite to the light incident side, when the material is $Cr_2O_3$, a film thickness of not more than 5 nm is desirable because of its light absorption; but in an interfacial layer of a material having a lower reflectivity than $Cr_2O_3$, for example Ge—Cr—N, no problem arose even when the film thickness was larger.

As a material usable in place of $Cr_2O_3$ of the upper interfacial layer and the lower interfacial layer, Ti and oxides of Ti are also preferable. As to the groove deformation which occurs when a large number, not less than 10, of tracks, for example one entire zone, are overwritten many times, since is considered that temperature increase due to laser light irradiation of recording power level causes the expansion of the substrate surface and resultant widening of intermolecular distance, it is effective, for preventing heat from going toward the substrate side, to provide between the recording film and the substrate, a layer having a thickness of not less than 10 nm, preferably not less than 25 nm and not more than 40 nm, of such a material as, a Si—N type material, such as $Si_3N_4$ and a Ge—N type material, and a Ge—Cr—N type(system) material such as $Ge_{45}N_{55}$, which has a higher thermal conductivity than ZnS type materials used for the recording film and light incident side protective layer. This layer may also double as the reflectivity improving layer. A larger effect can be obtained when the layer is provided between the recording film and the lower protective layer.

[Composition and Film Thickness of Other Layer Comprising Metal as Main Component (Reflecting Layer)]

The metal layer reflecting layer) having a high thermal conductivity of the opposite side to light incidence with respect to recording film is preferably a high thermal conductivity material which, in the case of Al or Al alloy, contains not more than 4 atomic % of additive elements such as Cr and Ti and, in the case of Ag alloy, contains not more than 8% of additive elements such as Pd and Cu, because of its good effect in preventing temperature increase of the substrate. Materials which comprise as the main component Al alloys, such as Al—Cr, Al—Ag and Al—Cu, are preferable as the material of reflecting layer usable in place of Al—Ti employed for the reflecting layer 20 in this Example because they make it possible to reduce jitter at the time of rewriting. When the content of metals other than Al or Ag in the Al alloy and Ag alloy is not less than 2 atomic % and not more than 30 atomic %, characteristic performance in many times of rewriting is improved. Al alloys other than those described above show similar characteristics although jitter of the reproduced signal was a little higher.

Those which have a high thermal conductivity, e.g., a simple substance of Al, Cu, Ag and Au, or Al alloys, Cu alloys, Ag alloys and Au alloys, are advantageous in that when a thick dielectric material layer is provided between the layer and the recording film, the recrystallized region formed in the neighborhood of the recording mark is narrowed to enlarge the regeneration signal and to suppress cross-erasing. Simple substance of Ag or alloys of Ag have a high reflectivity and hence give a high degree of modulation and a good regeneration characteristic. In this case, when the content of other elements than the main component is selected in the range of not less than 2 atomic % and not more than 30 atomic %, the rewrite characteristic is improved further. Alloys as Ag—Ti, Ag—Mn and Ag—Nd are also preferable. Besides Ag—Nd, Ag—Si alloys comprising Ag or Au and elements of Group III (including lanthanides and actinides) as the main component, e.g., Ag—Si, have a high light transmittance like Ag—Nd and hence are advantageous in making the light absorption of the crystalline state larger than that of the amorphous state. Since they form intermetallic compounds, they may be used in place of such a material of the stress-compensation layer as Ti. Other Ag alloys and Au alloys also have absorption compensation effect. Ag and Ag alloys has an advantage that noise in the reproduced signal is low because the film surface is smooth. Though the reflecting layer in this Example is a single layer, the effects of this invention do not change even when the reflecting layer comprises stacked two or more layers. Specifically, a preferred combination is Al—Ti and Al—Cr, Al—Ag and Ag, or Al—Cu and Al. Preferred materials usable for the reflecting layer 10 in place of Al—Ti are those which comprise as the main component Al alloys, e.g., Al—Ag, Al—Cu and Al—Cr. Al may also be used.

Next, layers may also be used which comprise a simple element of Ni, Fe, Co, Cr, Ti, Pd, Pt, W, Ta, Mo, Sb, Bi, Dy, Ca, Mn, Mg and V, or alloys comprising these elements as the main component or alloys of these elements with each other, such as Au alloys, Ag alloys, Cu alloys, Pd alloys and Pt alloys. Thus, the reflecting layer comprises a metal element, semimetal element, or the alloy or the mixture thereof. The film thickness of the reflecting layer was preferably not less than 10 nm and not more than 200 nm. When the film is too thin, the effects of reflection and thermal diffusion cannot be obtained sufficiently, whereas too thick film tends to develop cracks. The film thickness of the reflecting layer was not less than 20 nm, it was more preferable.

It was more preferable for the reflecting layer to contain not less than 60% of metallic element in order to obtain enough reflectivity(not lower than 15%). More preferable content of metallic element was not less than 70%.

[Composition and film thickness of absorption compensation layer]

When the above-mentioned absorption compensation layer is Cr—($Cr_2O_3$), the proportion of Cr to the whole components (sum of Cr and $Cr_2O_3$) is preferably not less than 42 mol %, more-preferably not less than 61 mol % and not more than 90 mol %, to obtain a low jitter value. As a material usable for replacing Cr in the Cr—($Cr_2O_3$) film used for the above-mentioned absorption compensation layer, Al, Mo, W, Ta, Ti, Fe, Co and Ni can be used to give similar results. Among them, Mo and W are favorable in point of their high melting point. When one of the elements Ni, Co and Ti is used, inexpensive targets can be used as compared with other materials, and the entire manufacturing cost can be reduced. Cr and Ti are particularly preferable in that they have a high corrosion resistance and give better results in life test than other materials.

As a material usable in place of Cr2O3 in the Cr—($Cr_2O_3$) film used for the above-mentioned absorption compensation layer, $siO_2$ and $Al_2O_3$ were tested. Owing also to the relatively small content, other light-transmittable compounds as other oxides and nitrides can be naturally used.

As a material for replacing the Cr—($Cr_2O_3$) film used for the absorption compensation layer in this Example, there could be used Ge—Cr, Ge incorporated with a metal element and, next, Si incorporated with a metal element. The amount of incorporation is preferably not less than 3 atomic % and not more than 85 atomic %, particularly not less than 5 atomic % and not more than 70 atomic %, because a low regeneration signal jitter value can be obtained. Such materials are, for example, $Ge_{95}Cr_5$, $Ge_{90}Cr_{10}$, $Ge_{80}Cr_{20}$, $Ge_{55}Cr_{45}$, $Ge_{30}Cr_{70}$, Ge—Ti, such as $Ge_{40}Ti_{60}$, Si—Ti such as $Si_{80}Ti_{20}$, $Si_{30}Ti_{70}$, Si—Cr such as $Si_{30}Cr_{70}$, and the nitrides of them.

It is also preferable that the absorption compensation layer comprises at least a nitride or oxide of Mo, Si, Ta, Ge, Cr, Al or W, or a compound or alloy thereof with a metallic element, for example, Cr, Ti, V, Mn, Fe, Co, Ni, Cu, Zn, Zr, Nb or Mo.

It was more preferable for the reflecting layer to contain not less than 60 atomic % of metallic element in order to obtain good optical constant (n and k). More preferable content of metallic element was not less than 70%.

The melting point of the absorption compensation layer is preferably not lower than 600° C. When a material having a melting point lower than 600° C. is used as the absorption compensation layer, in some cases the layer is deteriorated by the heat generated in the recording layer at the time of recording or by the heat generated by the absorption compensation layer itself, to cause the change of optical properties and the decrease of S/N. With respect of the film thickness and the materials of the above-mentioned respective layers, though the write & read characteristics can be improved by merely adopting the respective individual preferred ranges, the improving effects can be enhanced by appropriately combining the respective preferred ranges.

As to the film thickness of the absorption compensation layer, good effects were obtained in the range of thickness of not less than 20 nm and not more than 70 nm. Both when the layer was too thick and too thin, a sufficient absorption compensation effect was not obtained, and the cross-erasing and jitter increase by many times of reading exceeded the respective allowable values.

It was preferable for the absorption compensation layer to contain more than 40% of metallic element in order to obtain enough extinction coefficient to get absorption compensation effect. It was more preferable for the absorption compensation layer to contain more than 70% of metallic element.

[Composition and Film Thickness of Protective Layer]

There can be used for the protective layer ZnS·$SiO_2$, ZnO, ZnO·ZnS, or products obtained by replacing $SiO_2$ of ZnS $SiO_2$ with other oxide (e.g., $Ta_2O_5$) or nitride. Further, Ge—Cr—N type materials, such as $Ge_{50}Cr_{10}N_{40}$ and Si—Cr—N type materials, such as $Si_{50}Cr_{10}N_{40}$ can be used as the protective layer of the opposite side to the light incident side or as the protective and interfacial layer.

The preferred film thickness of the light incident side protective layer is in the range of not less than 85 nm and not more than 130 nm for improving the recording sensitivity by interference of light and obtaining a sufficient contrast ratio of crystalline state to amorphous state, and the preferred thickness of the protective layer of the opposite side to the light incident side is in the range of not less than 10 nm and not more than 50 nm.

[Substrate]

In this Example, a polycarbonate substrate 1 provided on the surface directly with grooves for tracking is used. The "substrate provided with grooves for tracking" refers to a substrate which has, on the whole or a part of its surface, grooves of a depth of not less than $\lambda/10'$ (n': refractive index of the substrate material), $\lambda$ representing the write & read wavelength. The groove may be formed either continuously through one round or divided midway in the round. A groove depth of $\lambda/6n'$ is preferable because then crosstalk is small. The groove width may vary depending on the place of the groove. When the width is the narrower as the groove is the nearer to inner periphery, problems tend more hardly to occur in many times of rewriting. Both a substrate having format wherein write & read can be conducted both in the groove part and in the land part and a substrate having a format wherein writing can be conducted in one of the two parts may be used. When ultraviolet-curable resin is coated in a thickness of about 10 μm on the respective reflecting layers of the first and the second disk member described above before the members are stuck together, then the resin is cured, and thereafter the disk members are stuck to each other, the error rate can be further decreased. In the present Example, two disk members are prepared, and the respective stress compensation layers 20 of the first and the second disk member prepared above are stuck to each other with an adhesive layer therebetween.

As other thickness of the substrate, 0.4 mm, 1.1 mm, 1.2 mm are possible. Thinner substrate requires more precise compensation of the stress (internal force).

[Method of Determination of Stress Groove Deformation Amount]

The method of determination of stress groove deformation amount is described below. Herein, as an example, detail description is given only with the case of determining stress groove deformation amount in grooves.

First, the disk to be examined is set on an evaluation apparatus and rotated. Then, the optical head is moved to the neighborhood of track in which the stress groove deformation amount is to be determined. Auto-focusing is applied at the place and the tracking error signal (difference signal) is monitored with an oscilloscope. The gain of auto-focus is controlled so as to give the maximum tracking error signal in the groove (AF offset compensation). Then, while auto-focusing is being applied, tracking is applied to the groove. Recording is conducted with laser power varied by random signals to determine the recording power at which the shift (asymmetry) of the center line of the envelope of signals corresponding to 3T (shortest) mark and space from the center line of the envelope of signals corresponding to long mark and space is 5%, which power is taken as the optimum recording power. Then, the relation between the radial (radial direction)-Tilt and the fitter value after 10 times of overwriting (the optimum power), to determine a radial-Tilt at which the fitter is minimum. That is, jitter is measured while varying radial-Tilt, to determine a radial-Tilt at which the jitter shows the minimum value, which is taken as the optimum radial-Tilt. Then, tracking offset control is conducted. First, over-writing is applied 10 times at the optimum power to the both sides of the groove. Then, crosstalk from the land in the groove is determined with a spectrum analyzer. Tracking gain is controlled so that the crosstalk comes to minimum. More preferably, thereafter the optimum radial-Tilt is determined once more, and further the tracking offset control is conducted.

Ultimately, after completion of AF offset compensation, tracking offset compensation and radial-Tilt compensation in the groove, the beam is moved to the track in which the stress groove deformation amount is to be determined. The regeneration signal (sum signal) of the ID part (part which represents address information, etc. with pits), arranged to shift by ½ track each to the left and right of the track, in the track is monitored to determine the respective voltage amplitudes, $V_1$ and $V_3$, of $ID_1$ and $ID_3$. The value of $|(V_1-V_3)/(V_1+V_3)|$, which represents the stress groove deformation amount, is calculated based on the value thus obtained.

The stress groove deformation amount in a land is determined in the same manner as above.

[Characteristic Feature of Stress-Compensated Disk]

The disk having been subjected to optimization by the stress-compensation layer as described above shows, in the above-mentioned method of determination, at least one of the three characteristic features described below. One of them is that the curve of $(V_1-V_3)/(V_1+V_3)$ is nearly horizontal as shown in FIG. 14, falls in the range of about 0.1 in the central 80% tracks exclusive of each 10% tracks of the both ends of a zone, and shows a steep change only in the 10% tracks of the both ends. In a comparative disk provided with no stress-compensation layer, as shown in Comparative Examples 1 and 2 of FIG. 14, even in the tracks of the central part of a zone, the value of $(V_1-V_3)/(V_1+V_3)$ varies from the inner peripheral side toward the outer peripheral side, and in a land-groove recording disk, the change in the land and in the groove are opposite in direction. The second feature is that the curve of $(V_1-V_3)/(V_1+V_3)$ of either a land or a groove does not monotonously increase or decrease from the inner periphery toward the outer periphery; instead, as shown in FIG. 14, the curve has a past which decreases after increase, or increases after decrease. Though it is not impossible to conduct stress compensation so that the occurrence of, the steeply changing part of the both ends or the part which does not monotonously increase or decrease may be avoided, then some strain develops in a part of the film and consequently the film tends to develop cracks when the disk temperature changes greatly.

The third feature of a substrate having been stress-compensated with a stress-compensation layer is that when the disk is peeled apart substantially to the state of inorganic material film alone by leaving behind at least one layer of the protective dielectric material layer between the stress-compensation layer and the recording film and without leaving the substrate, the film deforms such that the film curls toward the stress-compensation layer side, in other words, when the film is placed with the recording film side, or the side on which the recording film was present formerly, downside and with the stress compensation layer side upside, the both end parts rise upward relative to the central part of the stacked film and, under some conditions, the film rolls up round into the form of a cylinder. This indicates that the stress-compensation layer has developed tensile stress. When a thick metal reflecting layer is present on the stress-compensation layer and only a dielectric material layer of a thickness not more than 50 nm is present thereunder, deformation of reverse direction takes place in some cases, but when the recording film and the dielectric material layer (protective layer) of the more light incident side than the recording film side are peeled off together with the stress-compensation layer, the resultant film curls to the stress-compensation layer side.

In this embodiment, laser wavelength was 660 nm, and NA of the focusing lens was 0.6, situation is not much different but more severe in terms of stress compensation when the wave-length is around 400 nm or NA is larger.

EXAMPLE 5

[Structure, Method of Manufacture]

Figure 16:
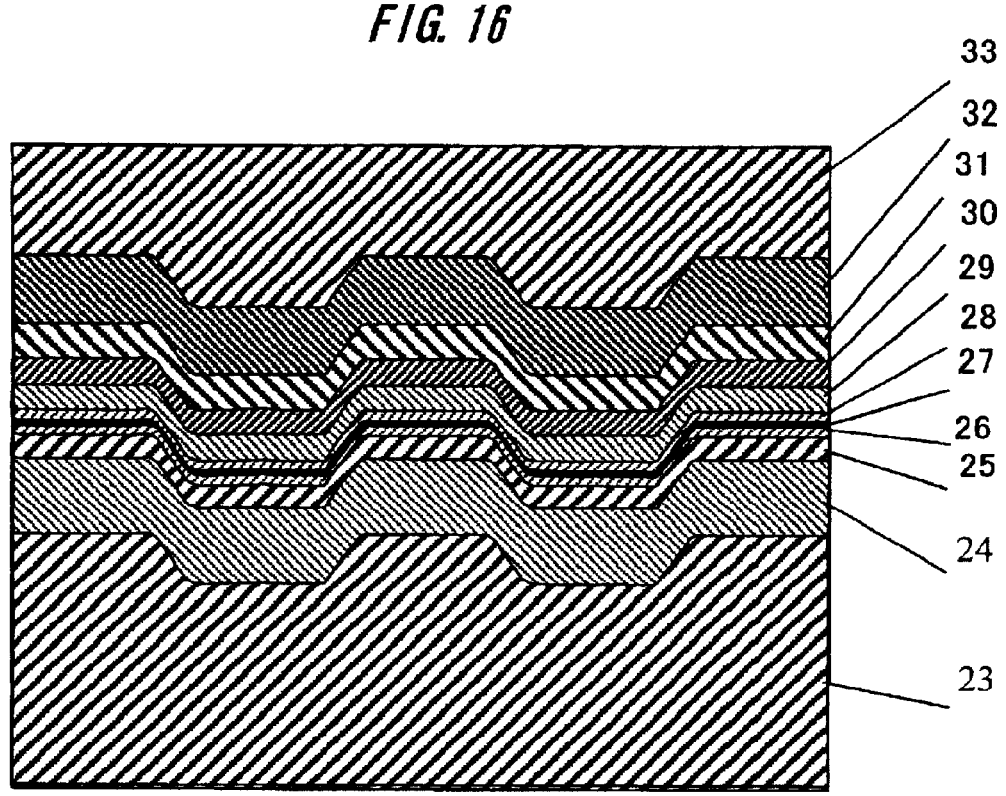
FIG. 16 shows a sectional view showing the structure of the disk-formed information storage medium of an example of this invention.

FIG. 16 is a sectional view showing the structure of the disk-formed information storage medium of an example of this invention. This medium was manufactured in the following manner.

First, on a polycarbonate substrate 23 12 cm in diameter and 0.6 mm in thickness which has on the surface grooves for tracking for land-groove tracking with a track pitch of 0.6 μm and pit trains for representing address information, etc. at positions shifted from the track center, was formed a protective layer 24 comprising ZnS—$SiO_2$ film in a film thickness of 110 nm. Then, thereon were successively formed a reflectivity improving layer 25 comprising $Al_2O_3$ film in a thickness of 25 nm, a lower interfacial layer 26 comprising $Cr_2O_3$ film in a film thickness of 1 nm, a Ge—Sb—Te recording layer 27 in an average film thickness of 9 nm, an upper interfacial layer 28 comprising $Cr_2O_3$ film in a film thickness of about 5 nm, an upper protective (thermal diffusion controlling) layer 29 comprising ZnS—$SiO_2$ film in a film thickness of 20 nm, an absorption compensation layer 30 of $Cr_{45}(Cr_2O_3)_{25}$ in a thickness of 40 nm, a stress-compensation layer 31 comprising Ti film at an Ar gas flow rate of 170 sccm in a film thickness of 120 nm, and a reflecting layer 32 comprising $Al_{99}Ti_1$ film in a film thickness of 30 nm. With respect to stress compensation, Mn is preferred next to Ti, but Fe, Co and Ni may also be used. The stacked film was formed with a magnetron sputtering apparatus. Thus, the first disk member was obtained.

Additionally, there were prepared a disk of 8-layer structure wherein the $Cr_{75}(Cr_{23})_{25}$ layer of the above-mentioned 9-layer structure, which has the role of compensating light absorption between the time when the recording film is amorphous and the time when it is crystalline and of directing thermal diffusion to the longitudinal direction thereby to prevent the recrystallization during cooling after formation of the recording film, had been eliminated, a disk of 8-layer structure wherein the $Al_{99}Ti_1$ layer of the 9-layer structure, which has the role of increasing thermal diffusion and directing it to the longitudinal direction, had been eliminated, a disk of 8-layer structure wherein the $Al_2O_3$ layer, which is a reflectivity improving layer between the lower protective layer and the lower interfacial layer, of the above-mentioned 9-layer structure had been eliminated, a disk of 8-layer structure wherein the lower interfacial layer, which has a function of promoting crystallization and preventing impurities from diffusion into the recording film, of the above-mentioned 9-layer structure had been eliminated, a disk of 8-layer structure wherein the upper interfacial layer, which has a function of promoting crystallization and preventing impurities from diffusion into recording film, of the above-mentioned 9-layer structure had been eliminated, and a disk of 8-layer structure wherein the upper protective layer, which has a role of increasing recording sensitivity and directing thermal diffusion toward the longitudinal direction, of the above-mentioned 9-layer structure had been eliminated. The decrease of optical film thickness caused by elimination of these layers other than the reflecting layer was compensated by increasing the film thickness of other layers.

The warp of the substrate underwent substantially no change before and after film formation, showing that stress compensation was achieved successfully. On the other hand, in a disk formed in exactly the same manner as above except that the Ti film was formed at an Ar flow rate of 50 sccm, the warp of the substrate changed in such a direction that when the surface having the film formed thereon was placed upward, the outer peripheral part of the substrate went downward, showing that compression stress was working from the substrate to the film. When the Ti layer was not present at all, the change of the substrate outer peripheral part going downward was still larger.

On the other hand, in exactly the same manner as above, the second disk member having an exactly the same structure as that of the first disk member was obtained. Thereafter, protective coating was applied with ultraviolet-curable resin 33 onto the film surface of the first disk member and the second disk member, and the respective reflecting layers of the respective disk members were stuck to each other with an adhesive layer therebetween to obtain a disk-formed information storage medium shown in FIG. 16.

A cut was formed onto the polycarbonate substrate of the optical disk of this Example, the substrate was folded in two, and the section was observed by SEM to find that the Ti film of the stress-compensation layer had, in 90% or more of the section, a pillar-like structure of about 10 nm thickness starting from the interface with the $Cr_{75}(Cr_2O_3)_{25}$ situated just thereunder, from which finding it was estimated that tensile stress had developed when, in the course of the Ti film formation, film began to deposit in the form of island, then grew in the form of pillar, and the pillars united with one another. In a film formed at an Ar gas pressure in sputtering of 50 sccm, in the observation of the section of the Ti film, in 30% or more of the section, about ¼ thereof near the interface with the $Cr_{75}(Cr_2O_3)_{25}$ film situated just thereunder was in a granular structure, from which it was estimated that for this reason tensile stress had not developed to a necessary extent. As the Ar gas pressure is decreased, the granular structure part increased at the root of the pillar-like structure, but when the ratio Y (%) of the part which is pillar-like from the root to the film thickness X (nm) of the Ti layer satisfies the following equation $$XY/100 \geq 50\ nm$$

a groove bend amount of not more than 0.02 μm could be attained, making it possible to cope with the problem. When the film thickness was less than 50 nm, a bend of not more than 0.02 μm could not be obtained, and when the proportion of the part which is pillar-like from the root was not more than 80%, a bend of not more than 0.02 μm could not be obtained. When at least one of elements having an atomic number outside the range of not less than 22 and not more than 47, less than 40 atomic % (for example, Al or Si), was added to Ti, a satisfactory tensile stress could hardly be obtained even when the Ar gas pressure was varied.

In the case of a disk member of a structure having no reflecting layer 32, the ultraviolet-curable resin may be coated on the uppermost stacked layer.

Even when the stacking order of the absorption compensation layer and the stress-compensation layer is reversed, though the tensile stress then decreases slightly, balance of stress could be attained by properly adjusting the film thickness of the stress-compensation layer. In the case where the absorption compensation layer was a Cr—Cr—O layer, however, better results were obtained both in the ease of developing tensile strength and in adhesiveness when the stress-compensation layer was provided just next to the absorption compensation layer.

EXAMPLE 6
[Structure, Method of Manufacture]

Figure 17:
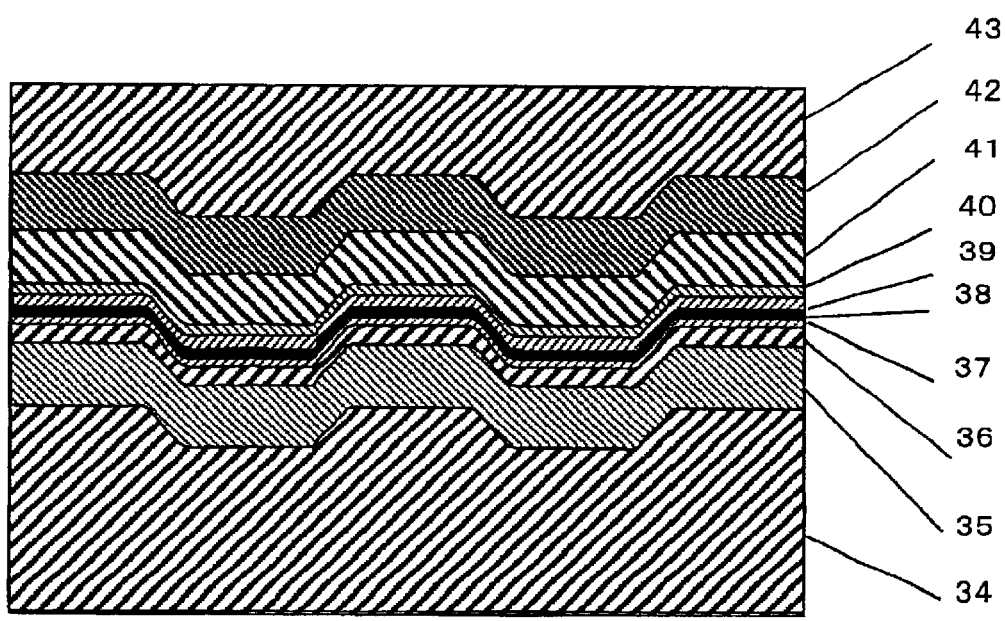
FIG. 17 shows a sectional view showing the structure of the disk-formed information storage medium of an example of this invention.

FIG. 17 is a sectional view showing the structure of the disk-formed information storage medium of an example of this invention. This medium was manufactured in the following manner.

First, on a polycarbonate substrate 34 12 cm in diameter and 0.6 mm in thickness which has on the surface grooves for tracking for land-groove tracking with a track pitch of 0.6 μm and pit trains for representing address information, etc. at portions shifted from track center, was formed a protective layer 35 comprising $(ZnS)_{80}(SiO_2)_{20}$ film in a thickness of 110 nm. Then, thereon were successively formed a reflectivity improving layer 36 comprising $Al_2O_3$ in a thickness of 25 nm, a lower interfacial layer 37 comprising $Cr_2O_3$ film in a film thickness of about 5 nm, then $Ge_7Sb_4Te_{13}$ recording layer 38 in an average film thickness of 9 nm, an upper interfacial layer 39 comprising $Cr_2O_3$ film in a film thickness of about 5 nm, an upper protective (thermal diffusion controlling) layer 40 in a film thickness of 20 nm, an absorption compensating and stress-compensating Ti layer 41 at an Ar gas flow rate of 150 sccm in a film thickness of 60 nm and a reflecting layer 42 comprising $Al_{99}Ti_1$ film in a film thickness of 30 nm. The stacked film was formed with a magnetron sputtering apparatus. Thus, the first disk member was obtained.

Figure 19:
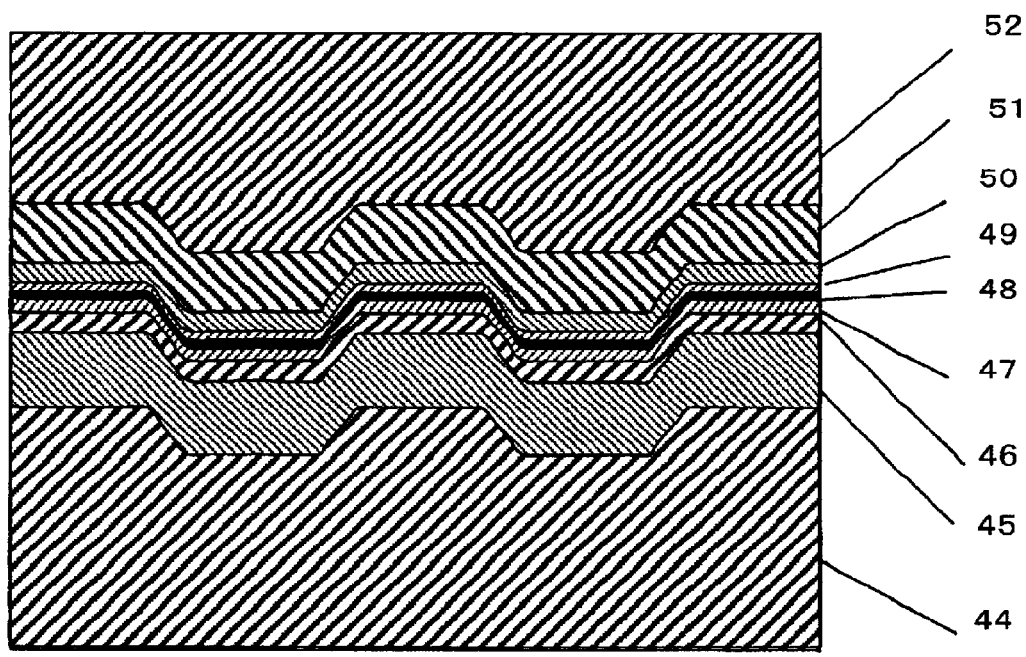
FIG. 19 shows a sectional view showing the structure of the disk-formed information storage medium of an example of this invention.
Figure 20:
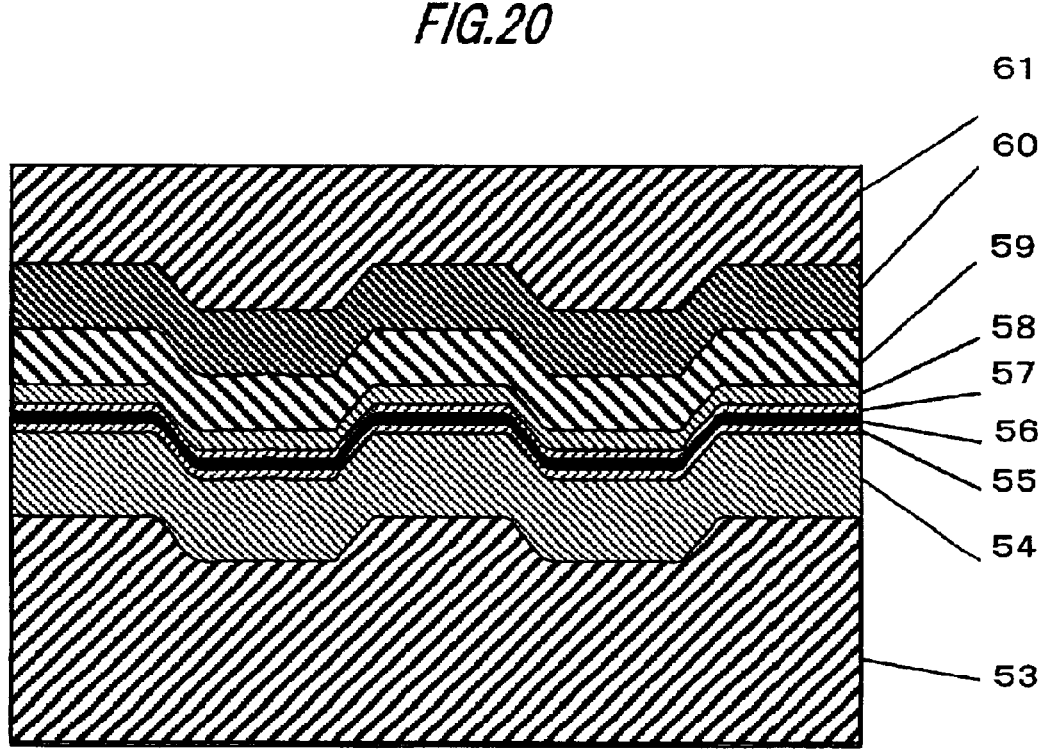
FIG. 20 shows a sectional view showing the structure of the disk-formed information storage medium of an example of this invention.
Figure 21:
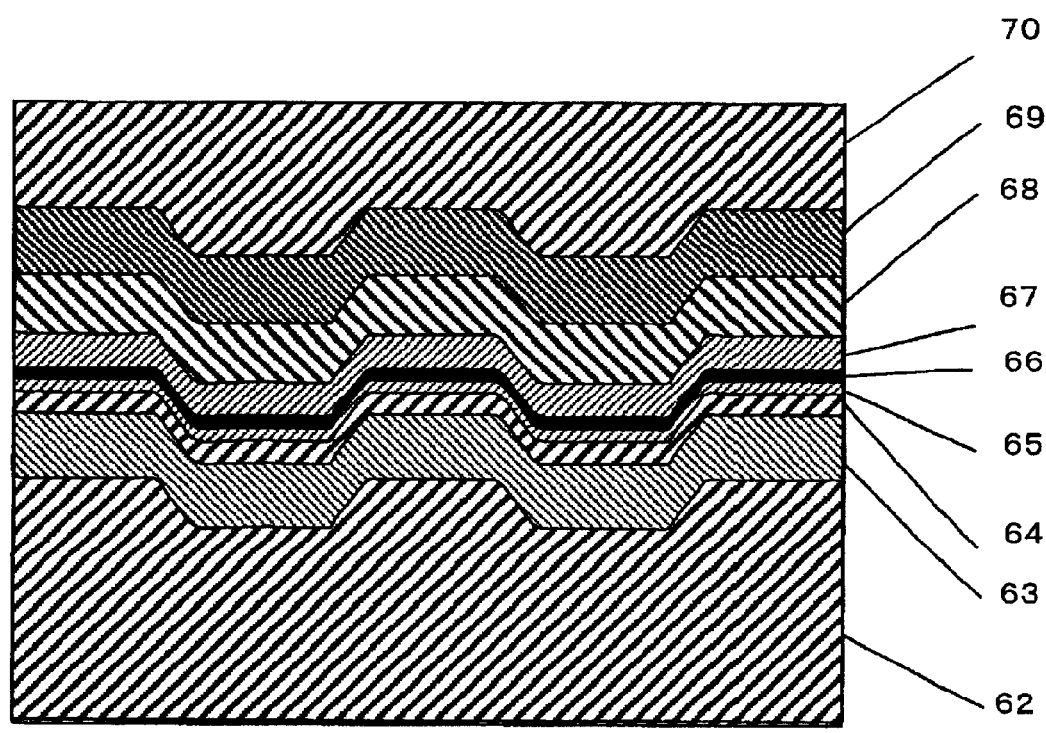
FIG. 21 shows a sectional view showing the structure of the disk-formed information storage medium of an example of this invention.
Figure 22:
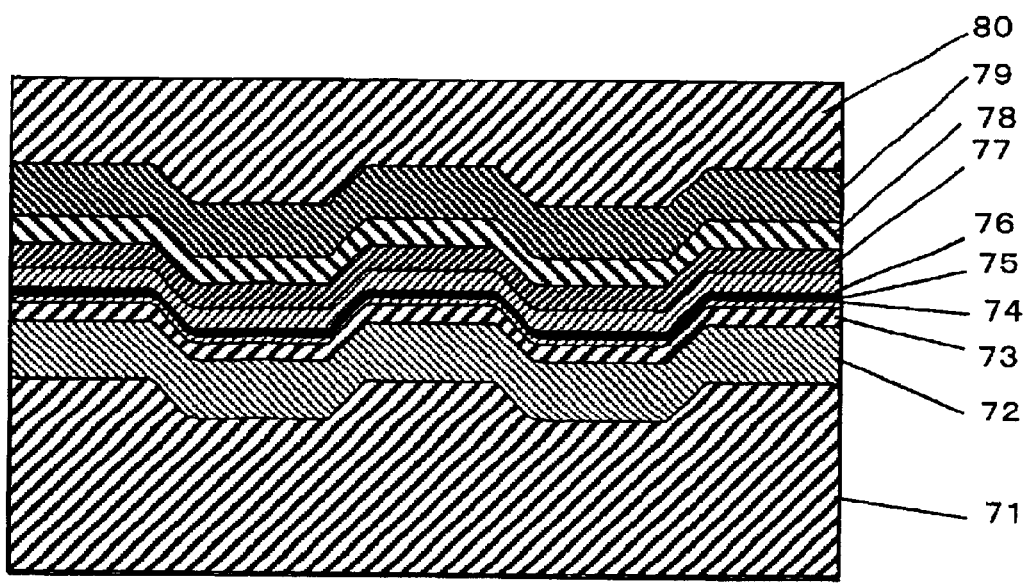
FIG. 22 shows a sectional view showing the structure of the disk-formed information storage medium of an example of this invention.
Figure 23:
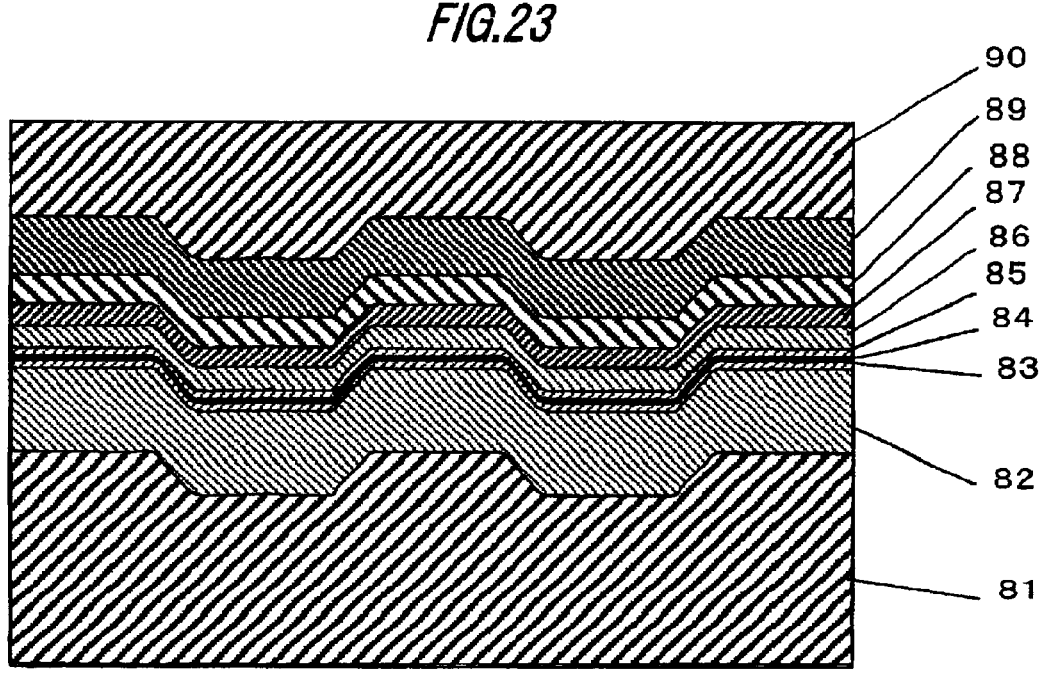
FIG. 23 shows a sectional view showing the structure of the disk-formed information storage medium of an example of this invention.

There were also prepared a 7-layer structure disk as shown in FIG. 19, wherein the $Al_{99}Ti_1$ layer, which has a function of increasing thermal diffusion and directing it in the longitudinal direction, of the above-mentioned 8-layer structure had been eliminated, a 7-layer structure disk as shown in FIG. 20, wherein the $Al_2O_3$ layer, which is a reflectivity improving layer between the lower protective layer and the lower interfacial layer, of the above-mentioned 8-layer structure had been eliminated, a 7-layer structure disk wherein the lower interfacial layer, which has the function of promoting crystallization and preventing impurities from diffusing into recording film, of the above-mentioned 8-layer structure had been eliminated, a 7-layer structure disk wherein the upper interfacial layer, which has the function of promoting crystallization and preventing impurities from diffusing into recording film, of the above-mentioned 8-layer structure had been eliminated, and a 7-layer structure disk as shown in FIG. 21 wherein the upper protective layer, which has the role of increasing recording density and directing thermal diffusion to the longitudinal direction, of the above-mentioned 8-layer structure had been eliminated, and an 8-layer structure disk as shown in FIG. 22 wherein the upper protective layer had been eliminated and an absorption adjustment layer 77 had been added, and an 8-layer structure disk as shown in FIG. 23 wherein the reflectivity enhancing Al2O3 layer is eliminated and an absorption adjustment layer 77 had been added 87 had been added. The decrease of optical film thickness caused by elimination of these layers other than the reflecting layer was compensated by increasing the film thickness of other layers.

The warp of the substrate did not change substantially before and after film formation, showing that stress compensation was achieved successfully. On the other hand, in a disk formed in exactly the same manner as above except that the Ti film was formed at an Ar flow rate of 50 sccm, the warp of the substrate changed in such a direction that when the surface having the film formed thereon was placed upward, the outer peripheral part of the substrate went downward, showing that compression stress was working from the substrate to the film. When the Ti layer was not present at all, the change of the substrate outer peripheral part going downward was still larger.

A cut was formed onto the polycarbonate substrate of the optical disk of this Example, the substrate was folded in two, and the section was observed by SEM as shown in FIG. 18 to find that the Ti film of the stress-compensation layer had, in 90% or more of the section, a pillar-like structure of about 10 nm thickness starting from the interface with the (ZnS)—(ZnO) situated just thereunder, from which finding it was estimated that tensile stress had developed when, in the course of the Ti film formation, film began to deposit in the form of island, then grew in the form of pillar, and the pillars united with one another. In a film formed at an Ar gas pressure in sputtering of 50 sccm, in the observation of the section of the Ti film, in 30% or more of the section, about ¼ thereof near the interface with the (ZnS)—(ZnO) film situated just thereunder was in a granular structure, from which it was estimated that for this reason tensile stress had not developed to a necessary extent. As the Ar gas pressure is decreased, the granular structure part increased at the root of the pillar-like structure, but when the ratio Y (%) of the part which is pillar-like from the root to the film thickness X (nm) of the Ti layer satisfies the following equation $XY/100 \geq 50$ nm a groove bend amount of not more than 0.02 μm could be attained, making it possible to cope with the problem. When the film thickness was less than 50 nm, a bend of not more than 0.02 μm could not be obtained, and when the proportion of the part which is pillar-like from the root was not more than 80%, a bend of not more than 0.02 μm could not be obtained. When at least one of the elements having an atomic number outside the range of not less than 22 and not more than 47, less than 40 atomic % (for example, Al or Si), was added to Ti, a satisfactory tensile stress could hardly be obtained even when the Ar gas pressure was varied.

On the other hand, in exactly the same manner as above, the second disk member having an exactly the same structure as that of the first member was obtained. Thereafter, protective coating 101 was applied with ultraviolet-curable resin onto the film surface of the first disk member and the second disk member, and the respective reflecting layers were stuck to each other with an adhesive layer therebetween the obtain a disk-formed information storage medium shown in FIGS. 18–23.

Approximately the same results as above were also obtained when the stacking order of the absorption compensating and stress-compensating layer comprising Ti film and the reflecting layer comprising $Al_{99}Ti_1$ film was reversed.

When the reflectivity improving layer comprising $Al_2O_3$ is eliminated in the disk of this Example, the reflectivity decreases even when the thickness of the ZnS·SiO$_2$ layer is increased that much, but the resulting disk could be used in practice when S/N was kept at a necessary value by using a low noise substrate. In other 7-layer structure disk wherein another layer had been eliminated, also, though the jitter of regeneration signal increased about 1% and recording sensitivity decreased owing to loss of the effect of the eliminated layer, the disk was usable in practice so long as its use was properly selected.

[Initial crystallization method]
[Recording, Erasing and Regenerating Method]
[Composition of Stress-Compensation Layer]
[Structure and Optimum Film Thickness of Stress Compensation Layer]
[Recording Film Composition and Optimum Film Thickness]
[Composition and Optimum Film Thickness of Reflectivity Improving]
[Elimination of Reflectivity Improving Layer]
[Composition and Optimum Film Thickness of Interfacial Layer]
[Composition and Optimum Film Thickness of Other Layer Comprising Metal as Main Component (Reflecting Layer)]
[Composition and Optimum Film Thickness of Protective Layer]
[Substrate]
[Method of Determination of Stress Groove Deformation Amount]
[Characteristic Features of Stress-Compensated Disk]
   Respectively the same as in Example 4.

EXAMPLE 7

[Structure, Method of Manufacture]

Figure 24:
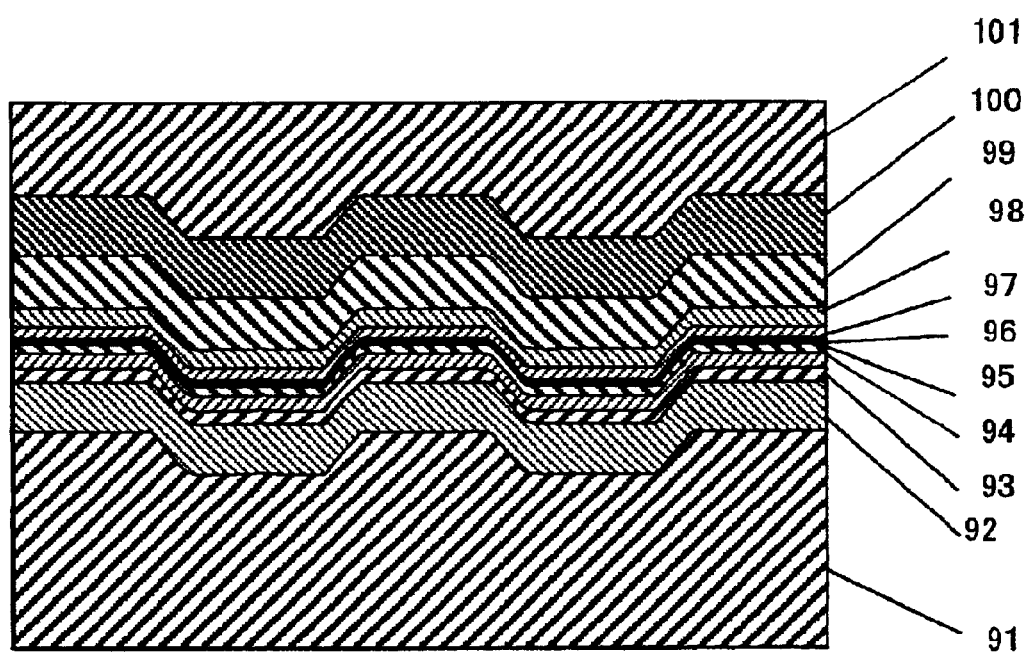
FIG. 24 shows a sectional view showing the structure of the disk-formed information storage medium of an example of this invention.

FIG. 24 is a sectional view showing the structure of the disk-formed information storage medium of an example of this invention. This medium was manufactured in the following manner.

First, on a polycarbonate substrate 91 12 cm in diameter and 0.6 mm in thickness which has on the surface grooves for tracking for land-groove tracking with a track pitch of 0.6 μm and pit trains for representing address information, etc. at positions shifted from the track center, was formed a protective layer 92 comprising ZnS—SiO$_2$ film in a film thickness of 110 nm. Then, thereon were successively formed a reflectivity improving layer 93 comprising Al$_2$O$_3$ film in a thickness of 25 nm, an adhesive layer 94 comprising Cr$_2$O$_3$ in a thickness of 1 nm, a lower interfacial layer 95 comprising Sn-N film in a film thickness of 1 nm, a Ge—Sb—Te recording layer 96 in an average film thickness of 9 nm, an upper interfacial layer 97 comprising Cr$_2$O$_3$ film in a film thickness of about 5 nm, an upper protective (thermal diffusion controlling) layer 98 comprising ZnS—SiO$_2$ film in a film thickness of 20 nm, an absorption compensating and stress-compensating layer 99 comprising $Ti_{30}Cr_{70}$ film at an Ar gas flow rate of 170 sccm in a film thickness of 120 nm and a reflecting layer 100 comprising Al$_{99}$Ti$_1$ film in a film thickness of 30 nm. The stacked film was formed with a magnetron sputtering apparatus. Thus, the first disk member was obtained. Additionally, a disk was manufactured wherein, conversely, the upper interfacial layer was double layer of Sn—N and Cr$_2$O$_3$, and the lower interfacial layer was Cr$_2$O$_3$.

The warp of the substrate did not change substantially before and after film formation, showing that stress compensation was achieved successfully. On the other hand, in a disk formed in exactly the same manner as above except that the Cr—Ti film was formed at an Ar flow rate of 50 sccm, the warp of the substrate changed in such a direction that when the surface having the film formed thereon was placed upward, the outer peripheral part of the substrate went downward, showing that compression stress was working from the substrate to the film. When the Cr—Ti layer was not present at all, the change of the outer peripheral part of the substrate going downward was still larger.

On the other hand, in exactly the same manner as above, the second disk member having an exactly the same structure as that of the first disk member was obtained. Thereafter, protective coating was applied with ultraviolet-curable resin onto the film surface of the first disk member and the second disk member, and the respective reflecting layers of the respective disk members were stuck to each other with an adhesive layer 10 therebetween, to obtain a disk-formed information storage medium shown in FIG. 24.

A cut was formed onto the polycarbonate substrate of the optical disk of this Example, the substrate was folded in two, and the section was observed by SEM to find that the Cr—Ti film of the stress-compensation layer had, in 90% or more of the section, a pillar-like structure of about 15 nm thickness starting from the interface with the ZnS/SiO$_2$ film situated just thereunder and having a granular structure, from which finding it was estimated that tensile stress had developed when, in the course of the Cr—Ti film formation, film began to deposit in the form of island, then grew in the form of pillar, and the pillars united with one another. In a film formed at an Ar gas pressure of 50 sccm, in the observation of the section of the Cr—Ti film, in 30% or more of the section, about ¼ thereof near the interface with the ZnS/SiO$_2$ film situated just thereunder was in a granular structure, from which it was estimated that for this reason the tensile stress had not developed to a necessary extent. As the Ar gas pressure is decreased, the granular structure past increased at the root of the pillar-like structure, but when the ratio Y (%) of the part which is pillar-like from the root to the film thickness X (nm) of the Cr—Ti layer satisfies the following equation $$XY/100 \geq 50 \text{ nm}$$

a groove bend amount of not more than 0.02 μm could be attained, making it possible to cope with the problem. When the film thickness was less than 50 nm, a bend of not more than 0.02 μm could not be obtained, and when the proportion of the part which is pillar-like from the root was not more than 80%, a bend of not more than 0.02 μm could not be obtained. When at least one of the elements having an atomic number outside the range of not less than 22 and not more than 47, less than 40 atomic %, was added to Ti—Cr not less than 40%, a satisfactory tensile stress could hardly be obtained even when the Ar gas pressure was varied.

When ultraviolet-curable resin 101 is coated in a thickness of about 10 μm on the respective reflecting layers of the first and the second disk member described above before the members are stuck together, the resin is cured, and thereafter the disk members are stuck to each other, the error rate can be further decreased. Though, in the present Example, two disk members are prepared and the reflecting layers 100 of the first and the second disk member are stuck to each other with an adhesive layer therebetween, it is also allowable to coat ultraviolet-curable resin on the second reflecting layer 100 of the above-mentioned first disk member in a thickness of not less than 10 μm without conducting the above-mentioned sticking together. In the case of a disk member of a structure having no reflecting layer 100, the ultraviolet-curable resin may be coated on the uppermost stacked layer.

[Initial Crystallization Method]
[Recording, Erasing and Regenerating Method]
[Composition of Stress-Compensation Layer]
[Structure and Film Thickness of Stress-Compensation Layer]
[Recording Film Composition and Optimum Film Thickness]
[Composition and Optimum Film Thickness of Reflectivity Improving Layer]
[Elimination of Reflectivity Improving Layer]
[Composition and Optimum Film Thickness of Interfacial Layer]
[Composition of Other Layer Comprising Metal as Main Component (Reflecting Layer)]
[Composition and Optimum Film Thickness of Protective Layer]
[Substrate]
[Method of Determination of Stress Groove Deformation Amount]
[Characteristic Features of Stress-Compensated Disk]

Respectively the same as in Example 4.

When the adhesion layer Cr$_2$O$_3$ of this Example is eliminated, the resulting disk tends to generate defects caused by interface separation by many times of rewriting, but it can be used without problem so long as the use is of a small number of repeated rewriting.

Even when the stacking order of the absorption compensating and stress compensating layer comprising Ti$_{30}$Cr$_{70}$ film and the reflecting layer comprising Al$_{99}$Ti$_1$ of this invention was reversed, approximately the same results were obtained.

EXAMPLE 8

[Structure, Method of Manufacture]

Figure 25:
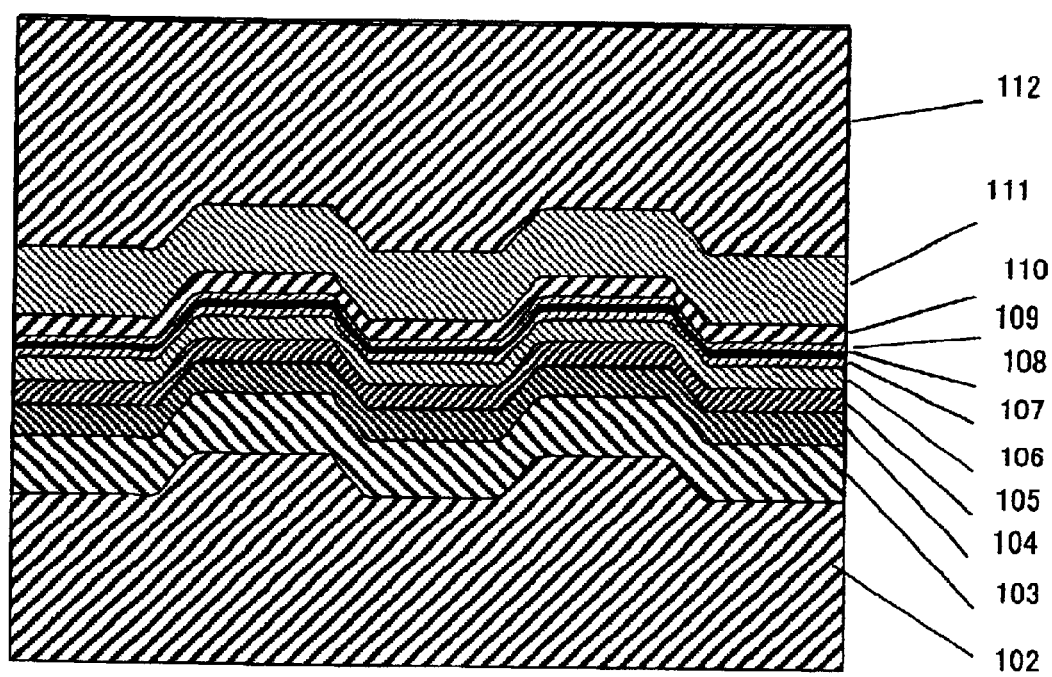
FIG. 25 shows a sectional view showing the structure of the disk-formed information storage medium of an example of this invention.

FIG. 25 is a sectional view showing the structure of the disk-formed information storage medium of an example of this invention.

First, on a polycarbonate substrate 102 12 cm in diameter and 0.6 mm in thickness which has on the surface grooves for tracking for land-groove recording with a track pitch of 0.6 μm and pit trains for representing address information, etc. at positions shifted from the track center, were formed successively a reflecting layer 103 comprising Ag$_{94}$Pd$_4$Cu$_2$ film in a film thickness of 30 nm, a stress-compensation layer 104 comprising Ti film at an Ar gas flow rate of 170 sccm in a film thickness of 120 nm, an absorption compensation layer 105 of Cr$_{75}$(Cr$_2$O$_3$)$_{24}$ in a thickness of 40 nm, a reflecting layer side protective (thermal diffusion control) layer 106 comprising ZnS—SiO$_2$ film in a film thickness of 20 nm, a lower interfacial layer 107 comprising Cr$_2$O$_3$ film in a film thickness of about 5 nm, a Ge$_7$Sb$_4$Te$_{13}$ recording layer 108 in an average film thickness of 9 nm, an upper interfacial layer 109 comprising Cr$_2$O$_3$ film in a film thickness of 1 nm, then a reflectivity improving layer 110 comprising Al$_2$O$_3$ film in a thickness of 25 nm and a protective layer 111 comprising ZnS-SiO$_2$ film in a film thickness of 110 nm. Though, with respect to stress compensation, Mn is favorable next to Ti, Fe, Co and Mi can also be used. The stacked film was formed with a magnetron sputtering apparatus. Thus, the first disk member was obtained.

The warp of the substrate did not change substantially before and after film formation, showing that stress compensation was achieved successfully. On the other hand, in a disk formed in exactly the same manner as above except that the Ti film was formed at an Ar flow rate of 50 sccm, the warp of the substrate changed in such a direction that when the surface having the film formed thereon was placed upward, the outer peripheral part of the substrate went downward, showing that compensation stress was working from the substrate to the film. When the Ti layer was not present at all, the change of the substrate outer peripheral part going downward was still larger.

On the other hand, in exactly the same manner as above, the second disk member having the same structure as that of the first disk member was obtained. Thereafter, a polycarbonate sheet 0.1 mm in thickness was adhered to the film surface of the first disk member and the second disk member described above with ultraviolet-curable resin 101, and the respective substrates were stuck to each other with an adhesive layer therebetween, to obtain a disk formed information storage medium.

The use, in place of the Ag—Pd—Cu reflecting layer of this Example, of Cr—Ag type materials containing 10–50 atomic % of Cr, such as $Cr_{30}Ag_{70}$, or $Au_{30}Ag_{60}Cu_{10}$ or $Ag_{80}Si_{20}$ are preferable in that since they have a moderate thermal conductivity, they can prevent the recrystallization from the peripheral part in forming the recording mark and cross-erasing, a phenomenon wherein a part of the recording mark of the adjacent track is erased at the time of recording. Materials obtained by replacing at least a past of Ag of these materials with Au have, though they are expensive, an advantage of excellent corrosion resistance. These reflecting layer materials may be used, besides for optical disks having a stress-compensation layer as in optical disks having a stress-compensation layer as in this invention, also for optical disks from which the stress-compensation layer has been eliminated, to give similar effects to those described above.

[Initial Crystallization Method]
[Recording, Erasing and Regenerating Method]
[Composition of Stress-Compensation Layer]
[Structure and Optimum Film Thickness of Stress-Compensation Layer]
[Recording Film Composition and Optimum Film Thickness]
[Composition and Optimum Film Thickness of Reflectivity Improving Layer]
[Elimination of Reflectivity Improving Layer]
[Composition and Optimum Film Thickness of Interfacial Layer]
[Composition and Optimum Film Thickness of Other Layer Comprising Metal as Main Component (Reflecting Layer)]
[Composition and Optimum Film Thickness of Absorption Compensation Layer]
[Composition and Optimum Film Thickness of Protective Layer]
[Substrate]
[Method of Determination of Stress Groove Deformation Amount]
[Characteristic Features of Stress-Compensated Disk]
    Respectively the same as in Example 4.
    Also, as in other Examples of this invention, even when the number of stacked layers was decreased to give disks of the 4, 5, 6, 7 and 8-layer structure, the same good write & read characteristics were obtained as in the case wherein the reflecting layer came to the side farther than the substrate.

EXAMPLE 9

[Structure, Method of Manufacture]

Figure 26:
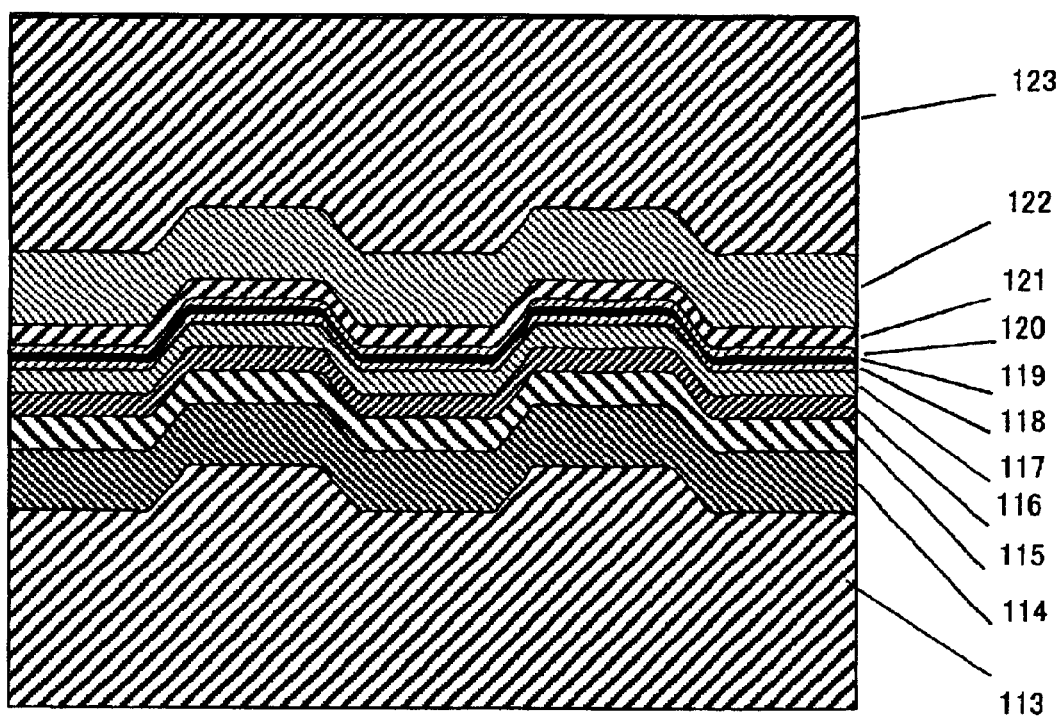
FIG. 26 shows a sectional view showing the structure of the disk-formed information storage medium of an example of this invention.

FIG. 26 is a sectional view showing the structure of a disk-formed information storage medium of an example of this invention. The medium was manufactured in the following manner.

First, on a polycarbonate substrate 113 12 cm in diameter and 0.6 mm in thickness which has on the surface grooves for tracking for land-groove tracking with a tracking pitch of 0.6 $\mu$m and pit trains for representing address information, etc. at positions shifted from the track center, were successively formed a stress-compensation layer 114 comprising $Ti_{60}Cr_{40}$ film at an Ar gas flow rate of 170 sccm in a film thickness of 120 nm, a reflecting layer 115 comprising $Ag_{94}Pd_4Cu_2$ film in a film thickness of 30 nm, an absorption compensation layer 116 comprising $Cr_{75}(Cr_2O_3)_{25}$ in a thickness of 40 nm, a reflecting layer 117 in a film thickness of 20 nm, a lower interfacial layer 118 comprising $Cr_2O_3$ film in a film thickness of about 5 nm, a Ge—Sb—Te recording layer 119 in an average film thickness of 9 mm, an upper interfacial layer 120 comprising $Cr_2O_3$ film in a film thickness of 1 nm, then a reflectivity improving layer 121 comprising $Al_2O_3$ film in a thickness of 25 nm and a protective layer 122 comprising $ZnS$—$SiO_2$ film in a film thickness of 110 nm. With respect to stress compensation, though Mn is favorable next to Ti, Fe, Co and Ni are also usable. The stacked film was formed with a magnetron sputtering apparatus. Thus, the first disk member was obtained.

The warp of the substrate did not change substantially before and after film formation, showing that stress compensation was achieved successfully. On the other hand, in a disk formed in exactly the same manner as above except that the Ti—Cr film was formed at an Ar flow rate of 50 sccm, the warp of the substrate changed in such a direction that when the surface having the film formed thereon was placed upward, the outer peripheral part of the substrate went downward, showing that compression stress was working from the substrate to the film. When the Ti—Cr layer was not present at all, the change of the substrate outer peripheral part going downward was still larger.

On the other hand, in exactly the same manner as above, the second disk member having an exactly the same structure as that of the first disk member was obtained. Thereafter, a polycarbonate sheet 0.1 nm in thickness was adhered to the respective film surfaces of the first disk member and the second disk member described above with ultraviolet-curable resin 112, and the respective substrates were stuck to each other with an adhesive layer therebetween, to obtain a disk-formed information storage medium.

[Initial Crystallization Method]
[Recording, Erasing and Regenerating Method]
[Composition of Stress-Compensation Layer]
[Structure and Optimum Film Thickness of Stress-Compensation Layer]
[Recording Film Composition and Optimum Film Thickness]
[Composition and Optimum Film Thickness of Reflectivity Improving Layer]
[Elimination of Reflectivity Improving Layer]
[Composition and Optimum Film Thickness of Interfacial Layer]
[Composition and Optimum Film Thickness of Other Layer Comprising Metal as Main Component (Reflecting Layer)]

[Composition and Optimum Film Thickness of Absorption Compensation Layer]
[Composition and Optimum Film Thickness of Protective Layer]
[Substrate]
[Method of Determination of Stress Groove Distortion Amount]
[Characteristic Feature of Stress-Compensated Disk]

Respectively the same as in Example 4, provided that recording and regeneration was conducted through the 0.1 mm sheet.

The $Cr_{75}(CrO_3)_{25}$ layer of this Example has also a role of preventing the chemical reaction of the reflecting layer comprising Ag as the main component with the protective layer comprising ZnS as the main component; as in other Examples of the present invention, even when the number of stacked layers is decreased to give disks of 5, 6, 7 or 8-layer structure, good write & read characteristics can be obtained similarly to the case wherein the reflecting layer comes to a side far from the substrate; however, when the $Cr_{75}(Cr_2O_3)_{25}$ layer is eliminated and a layer comprising ZnS as the main component is also used, it is necessary to form a layer of other oxide or nitride, for example Cr—O and Ge—Cr—N layer, therebetween. Chromium content of Ge—Cr—N layer should be more than 20% to obtain enough strength against cracking. In this case, $ZnS/SiO_2$ layer can be eliminated.

EXAMPLE 10

[Structure, Method of Manufacture]

Figure 27:
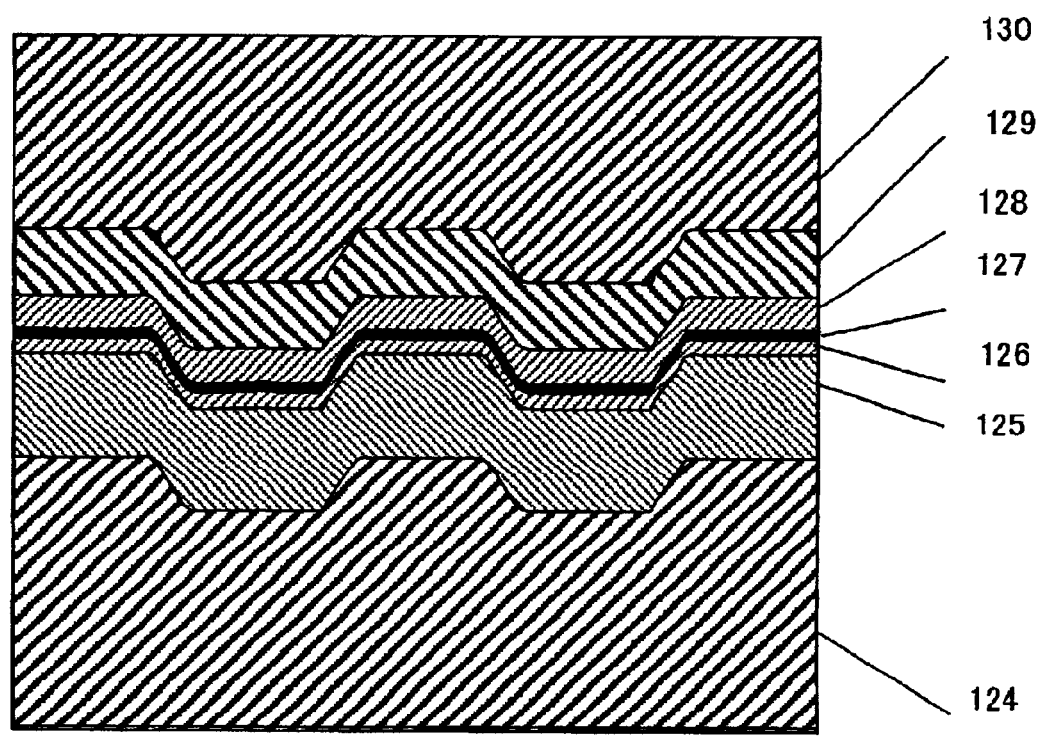
FIG. 27 shows a sectional view showing the structure of the disk-formed information storage medium of an example of this invention.

FIG. 27 is a sectional view showing the structure of the disk-formed information storage medium of an example of this invention. This medium was manufactured in the following manner.

First, on a polycarbonate substrate 124 12 cm in diameter and 0.6 mm in thickness which has on the surface grooves for tracking for land-groove recording with a track pitch of 0.6 μm and pit trains for representing address information, etc. at positions shifted from the track center, was formed a lower protective layer 125 comprising $(ZnS)_{80}(SiO_2)_{20}$ in a film thickness of 110 nm. Then, thereon were successively formed the first interfacial layer 126 comprising $Cr_2O_3$ film in a thickness of 5 nm, a Ge—Sb—Te recording layer 127 in an average film thickness of 9 nm, an upper protective (thermal diffusion control) layer 128 in a film thickness of 20 nm and an absorption compensating and stress compensating and reflecting layer 129 comprising $Ti_{30}Cr_{70}$ film at an Ar gas flow rate of 170 sccm in a film thickness of 50 nm. The stacked film was formed with a magnetron sputtering apparatus. Thus, the first disk member was obtained.

Figure 28:
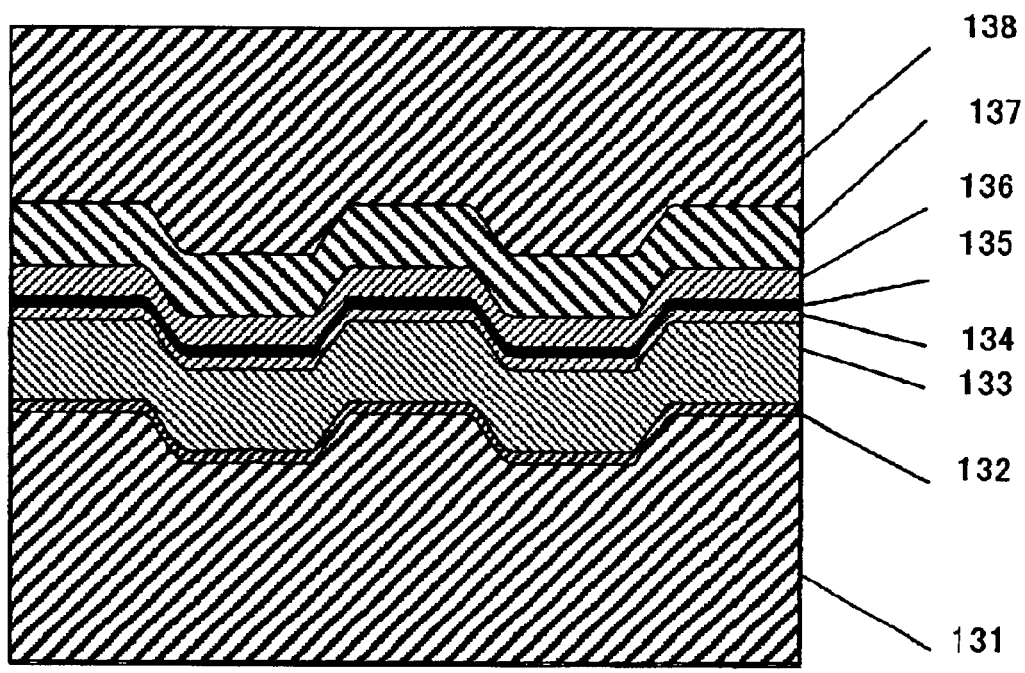
FIG. 28 shows a sectional view showing the structure of the disk-formed information storage medium of an example of this invention.
Figure 29:
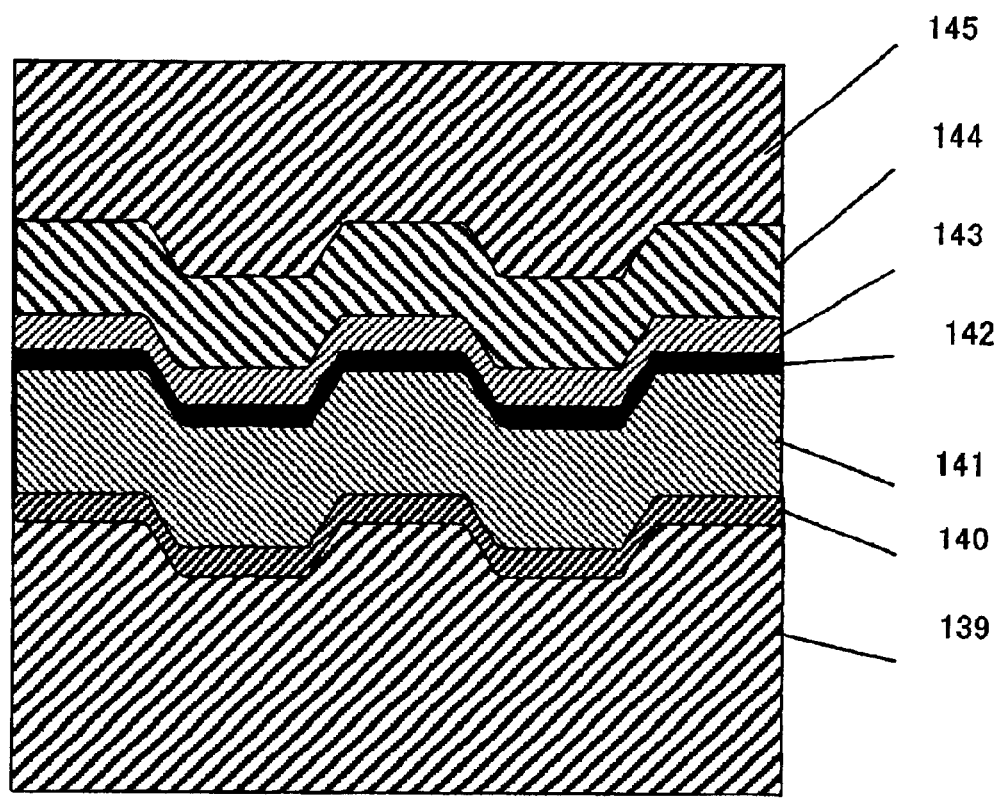
FIG. 29 shows a sectional view showing the structure of the disk-formed information storage medium of an example of this invention.
Figure 30:
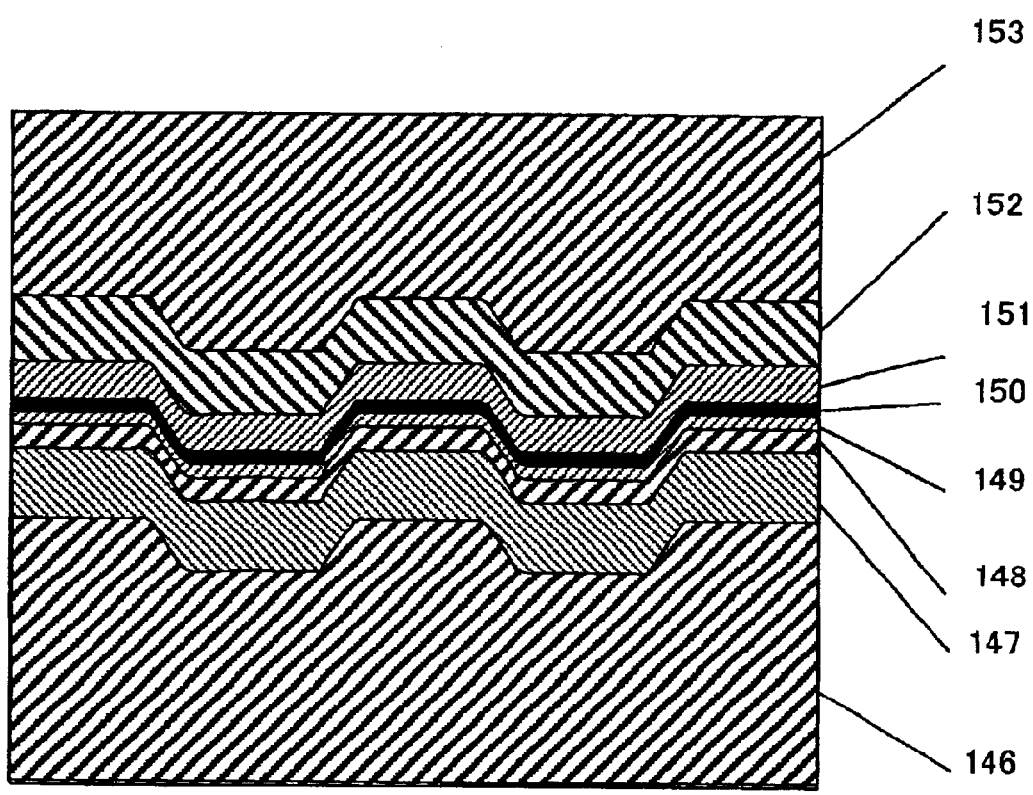
FIG. 30 shows a sectional view showing the structure of the disk-formed information storage medium of an example of this invention.
Figure 31:
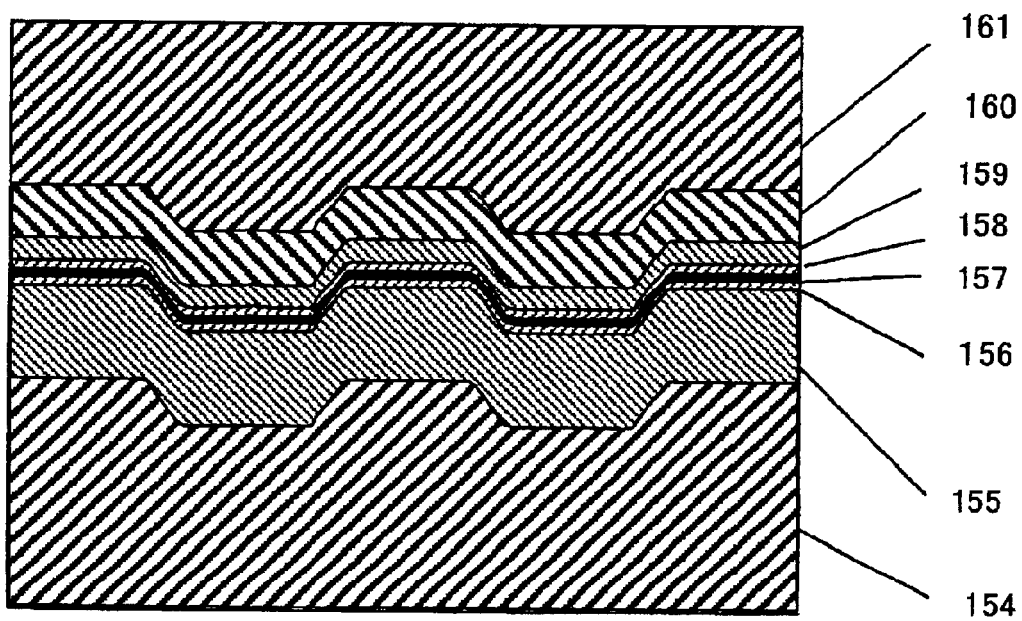
FIG. 31 shows a sectional view showing the structure of the disk-formed information storage medium of an example of this invention.
Figure 32:
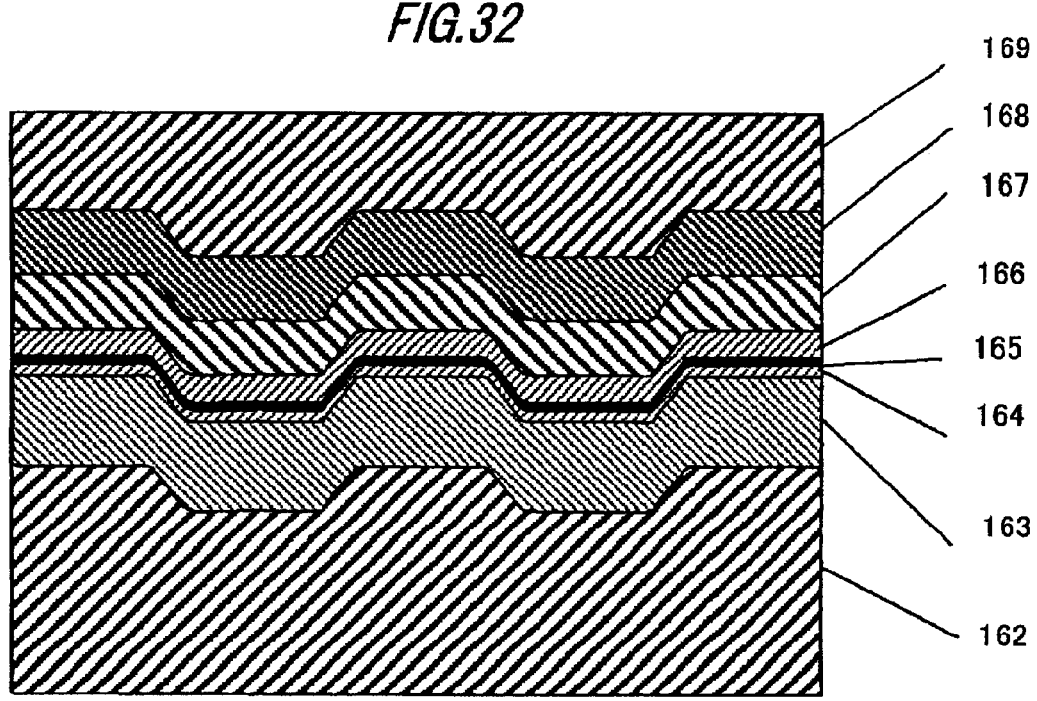
FIG. 32 shows a sectional view showing the structure of the disk-formed information storage medium of an example of this invention.

Additionally, there were also prepared a 6 layer structure disk as shown in FIG. 28 wherein an light-incident-side reflective layer 132 had been added, and a 5 layer structure disk as shown in FIG. 29 wherein the light-incident side interface layer of the disk shown in FIG. 28 had been eliminated, and a disk of 6-layer structure as shown in FIG. 30 obtainable by forming an $Al_2O_3$ layer of the reflectivity improving layer between the lower protective layer and the lower interfacial layer of the above-mentioned 5-layer structure shown in FIG. 27, and a disk of 6-layer structure as shown in FIG. 31 obtainable by forming a $(ZnS)_{80}(SiO_2)_{20}$ layer 159 for directing thermal diffusion toward the longitudinal direction between the $Cr_{10}(Cr_2O_3)_{90}$ film and the $Ti_{30}Cr_{70}$ of the above-mentioned 5-layer structure, and a disk of 6-layer structure as shown in FIG. 32 obtainable by forming further on the uppermost part of the 5-layer structure disk shown in FIG. 27 an $Al_{99}Ti_1$ layer for increasing the cooling velocity thereby to prevent re-crystallization at the time of recording mark formation and directing thermal diffusion toward the longitudinal direction. $Cr_{10}(Cr_2O_3)_{90}$ can be changed into $Ge_{40}Cr_{20}N_{40}$.

The warp of the substrate did not change substantially before and after film formation, showing that stress compensation was achieved successfully. On the other hand, in a disk formed in exactly the same manner as above except that the Ti—Cr film was formed at an Ar flow rate of 50 sccm, the warp of the substrate changed in such a direction that when the surface having the film formed thereon was placed upward, the outer peripheral part of the substrate went downward, showing that compression stress was working from the substrate to the film. When the Ti—Cr layer was not present at all, the change of the substrate outer peripheral part going downward was still larger.

On the other hand, in exactly the same manner as above, the second disk member having an exactly the same structure as the first disk member was obtained. Thereafter, protective coating was applied with ultraviolet-curable resin onto the film surface of the first disk member and the second disk member, and the respective reflecting layers of the respective disk members were stuck to each other with an adhesive layer therebetween, to obtain a disk-formed information storage medium shown in FIGS. 26–32.

[Initial Crystallization Method]
[Recording, Erasing and Regenerating Method]
[Composition of Stress-Compensation Layer]
[Structure and Optimum Thickness of Stress Compensation Layer]
[Recording Film Composition and Optimum Film Thickness]
[Composition and Optimum Film Thickness of Reflectivity Improving Layer]
[Elimination of Reflectivity Improving Layer]
[Composition and Optimum Film Thickness of Interfacial Layer]
[Composition and Optimum Film Thickness of Other Layer Comprising Metal as Main Component (Reflecting Layer)]
[Composition and Optimum Film Thickness of Protective Layer]
[Substrate]
[Method of Determination of Stress Groove Deformation Amount]
[Characteristic Feature of Stress-Compensated Disk]

Respectively the same as in Example 4.

In the above-mentioned 3 kinds of 6-layer structure disks, 1% lower jitter of regeneration signals than that of the 5-layer structure disk was obtained by virtue of the effect of the respective additional layers.

EXAMPLE 11

[Structure, Method of Manufacture]

Figure 33:
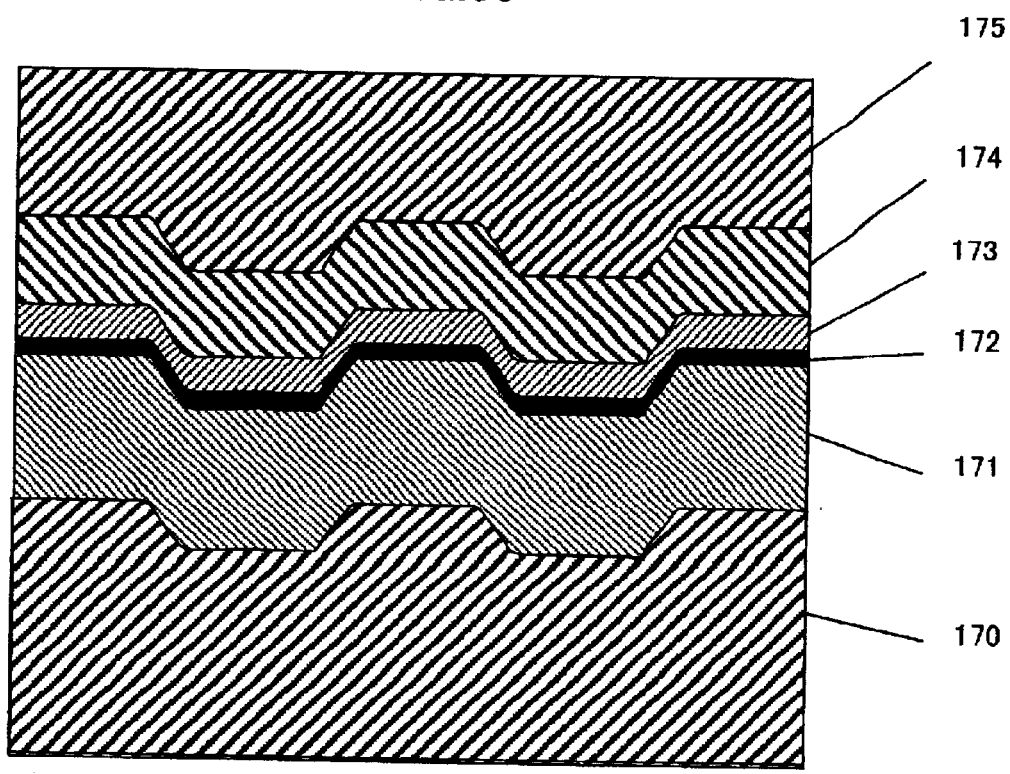
FIG. 33 shows a sectional view showing the structure of the disk-formed information storage medium of an example of this invention.

FIG. 33 is a sectional view showing the structure of the disk-formed information storage medium of an example of this invention. This medium was manufactured in the following manner.

First, on a polycarbonate substrate 170 12 cm in diameter and 0.6 mm in thickness which has on the surface grooves for tracking for land-groove recording with a track pitch of 0.6 μm and pit trains for representing address information, etc. at positions shifted from the track center, was formed a protective layer 171 comprising $Zn_{50}O_{40}N_{10}$ film in a film thickness of 110 nm. Then, thereon were successively formed a Ge—Sb—Te recording layer 172 in an average film thickness of 9 nm, an upper protective (thermal diffusion control) layer 173 comprising $(ZnO)_{80}(ZnS)_{20}$ film in a film thickness of 20 nm and an absorption compensating and stress-compensating and reflecting layer 174 comprising $Ti_{60}Cr_{40}$ film at an Ar gas flow rate of 170 sccm in a film thickness of 60 nm. The stacked film was formed with a magnetron sputtering apparatus. Thus, the first disk member was obtained.

The warp of the substrate did not change substantially before and after film formation, showing that stress compensation was achieved successfully. On the other hand, in a disk formed in exactly the same manner as above except that the Ti—Cr film was formed at an Ar flow rate of 50 sccm, the warp of the substrate changed in such a direction that when the surface having the film formed thereon was placed upward, the outer peripheral part of the substrate went downward, showing that compression stress was working from the substrate to the film. When the Ti—Cr layer was not present at all, the change of the substrate outer peripheral part going downward was still larger.

As to the composition ratio of the Zn—O—N film used in this Example for decreasing the number of stacked layers, it has been found that the film is usable when the composition is in the range of 20–65% of oxygen and 0–40% of nitrogen in terms of atomic %, and is more preferably used when the nitrogen content is in the range of 10–30%. The material has features in that it has a low thermal conductivity, can be sputtered with a low energy, hardly reacts with Ag, which may possibly be used for the reflecting layer, diffuses into recording film with difficulty and is effective in improving the crystallization velocity, and hence it has an effect of giving excellent characteristics even when used in disks other than the disks having a stress-compensation layer as in the present invention.

In place of $(ZnO)_{80}(SiO_2)_{20}$ used in the upper protective layer, there may be used Zn—Si—N of other composition or Zn—O—N and also Ge—Gr—N having such a composition as $Ge_{50}Cr_{10}N_{40}$ On the other hand, in exactly the same manner as above, the second disk member having the same structure as that of the first disk member was obtained. Thereafter, protective coating with ultraviolet-curable resin 175 was applied to the film surface of the first disk member and the second member described above, and the respective reflecting layers were stuck to each other with an adhesive layer therebetween, to obtain a disk-formed information storage medium shown in FIG. 33.

A cut was formed onto the polycarbonate substrate of the optical disk of this Example, the substrate was folded in two, and the section was observed by SEM to find that the Ti—Cr film of the stress-compensation layer had, in 90% or more of the section, a pillar-like structure of about 10 nm thickness starting from the interface with the (ZnS)—(ZnO) film situated just thereunder, from which finding it was estimated that tensile stress had developed when, in the course of the Ti—Cr film formation, film began to deposit in the form of island, then grew in the form of pillar, and the pillars united with one another. In a film formed at a Ar gas pressure in sputtering of 50 sccm, in the observation of the section of the Ti film, in 30% or more of the section, about ¼ thereof near the interface with (ZnS)—(ZnO) film situated just thereunder was in a granular structure, from which observation it was estimated that for this reason tensile stress had not developed to a necessary extent. As the Ar gas pressure is decreased, the granular structure part increased at the root of the pillar-like structure, but when the ratio Y (%) of the part which is pillar-like from the root to the film thickness X (mm) of the Ti layer satisfies the following equation $$XY/100 \geq 50 \text{ nm}$$

a groove bend amount of not more than 0.02 μm could be attained, making it possible to cope with the problem. When the film thickness less than 50 nm, a bend of not more than 0.02 μm could be attained, making it possible to cope with the problem. When the film thickness was not more than 50 nm, a bend of not more than 0.02 μm could not be obtained, and when the proportion of the part which is pillar-like from the root was not more than 80%, a bend of not more than 0.02 μm could not be obtained. When at least one of the elements having an atomic number outside the range of not lass than 22 and not more than 47, less than 40 atomic %, was added to Ti—Cr, a satisfactory tensile stress could hardly be obtained even when the Ar gar pressure was varied.

The disk of this Example has format wherein write & read can be conducted both in the groove part and in the land part. When ultraviolet-curable resin is coated in a thickness of about 10 μm on the respective reflecting layers of the first and the second disk member described above before the members are stuck together, then the resin is cured, and thereafter the disk members are stuck to each other, the error rate can be further decreased. Though in the present Example two disk members are prepared and the reflecting layers 174 of the first and the second members are stuck to each other with an adhesive layer therebetween, it is also allowable to coat ultraviolet-curable resin on the second reflecting layer 174 of the above-mentioned first disk member in a thickness of not less than 10 μm without conducting the above-mentioned sticking together. In the case of a disk member of a structure having no reflecting layer 174, the ultraviolet-curable resin may be coated on the uppermost stacked layer.

In the storage medium of this Example, when it is subjected to many times of rewriting, ZnS in the protective layer diffuses into the recording film to reduce reflectivity and to change crystallization velocity, yet about 100 times of rewriting could be attained. When an interfacial layer of $Cr_2O_3$ film Ge—N film, or $Ge_{60}Cr_5N_{35}$ film having an effect similar to the former is formed between the recording film and the ZnS—$SiO_2$ layer, the number of rewritable times reaches 10,000 or more. Further, when an $Al_2O_3$ layer, which is a reflectivity improving layer, was interposed between the ZnS·$SiO_2$ layer and the interfacial layer, nearly equal characteristic properties were obtained even when a Ge—Cr—N film having a composition near $Ge_{60}Cr_5N_{35}$ was formed in place of the $(ZnO)_{80}(ZnS)_{20}$ film.

[Initial Crystallization Method]
[Recording, Erasing and Regenerating Method]
[Composition of Stress-Compensation Layer]
[Structure and Optimum Film Thickness of Stress-Compensation Layer]
[Recording Film Composition and Optimum Film Thickness]
[Elimination of Reflectivity Improving Layer]
[Composition and Optimum Film Thickness of Protective Layer]
[Substrate]
[Method of Determination of Stress Groove Deformation Amount]
[Characteristic Feature of Stress-Compensated Disk]

Respectively the same as in Example 4.

As set forth above, in the information storage medium of this invention, internal stress between the entire stacked film and the substrate can be reduced and resultantly the deformation of the disk surface can be suppressed to a low extent and thee address reading error, crosstalk and adjacent track erasing can be avoided. Furthermore, a large number times of rewriting is possible in high density recording and the storage life is long. Thus, a quite useful information storage medium is obtained.

Effects

Accordingly, a phase-change optical disk can be realized wherein the track pitch is narrowed almost to a permissible limit relative to the predetermined light spot diameter on the premise that 10,000 times or more, preferably 100,000 times or more of information rewriting should be attained. The problems of cross-erasing and reading error of ID information, such as address, caused by groove deformation, which are apt to occur when the track pitch is narrowed, can be prevented completely.

What is claimed is:

1. An information storage medium which comprises a substrate and, stacked thereon in the following successive order, at least a first protective layer, a first interfacial layer, a recording layer, a second interfacial layer, a stress-compensation layer having a pillar-like structure and containing not less than 30 atomic % and not more than 85 atomic % of CR, and a reflecting layer.

2. The information storage medium according to claim 1, wherein the stress-compensation layer having the pillar-like structure contains 60 atomic % or more of at least one metal element having an atomic number of not less than 22 and not more than 47.

3. The information storage medium according to claim 1, further comprising a second protective layer stacked between the second interfacial layer and the stress-compensation layer having the pillar-like structure.

4. The information storage medium according to claim 1, wherein the recording layer effects recording by phase change.

5. The information storage medium according to claim 1, wherein the substrate of the medium has a recording track pitch of not less than 0.3 $\mu$m and not more than 0.7 $\mu$m and has pit trains which represent at lest address information at positions shifted from the track center.

6. The information storage medium according to claim 1, wherein the stress-compensation layer having the pillar-like structure is formed at an Ar flow rate of 120 sccm or more.

7. The information storage medium according to claim 1, wherein the second interfacial layer is comprised of oxide or nitride.

8. The information storage medium according to claim 1, wherein the first interfacial layer is comprised of oxide or nitride of at least one element selected from the group comprising of Cr, Ge, Si, Al, Ta, Zr, B, Hf, and Ti.

9. A method of manufacturing an information storage medium which effects writing and reading by laser light, which method comprises forming a layer containing 60 atomic % or more of at least one metal element having an atomic number of not less than 22 and not more than 47 at an Ar flow rate of 120 sccm or more.

* * * * *